United States Patent
Golbig et al.

(10) Patent No.: US 7,241,423 B2
(45) Date of Patent: Jul. 10, 2007

(54) ENHANCING FLUID FLOW IN A STACKED PLATE MICROREACTOR

(75) Inventors: Klaus Golbig, Harxheim (DE); Volker Autze, Frankfurt am Main (DE); Peter Born, Idstein (DE); Christian Drescher, Bielefeld (DE)

(73) Assignee: Cellular Process Chemistry, Inc., Richland, WA (US)

( * ) Notice: Subject to any disclaimer, the term of this patent is extended or adjusted under 35 U.S.C. 154(b) by 632 days.

(21) Appl. No.: 09/991,377

(22) Filed: Nov. 15, 2001

(65) Prior Publication Data

US 2002/0106311 A1    Aug. 8, 2002

Related U.S. Application Data

(63) Continuation-in-part of application No. 09/496,999, filed on Feb. 3, 2000, now Pat. No. 6,537,506.

(51) Int. Cl.
    *B01J 19/00* (2006.01)
(52) U.S. Cl. .................. 422/130; 422/99; 422/100; 422/129; 422/131; 422/138
(58) Field of Classification Search .............. 422/99, 422/100, 102, 129, 130, 131, 138, 224; 436/164, 436/174; 435/287.1, 287.8, 288.3, 288.4
See application file for complete search history.

(56) References Cited

U.S. PATENT DOCUMENTS

| | | | |
|---|---|---|---|
| 3,881,701 A | 5/1975 | Schoenman et al. ........... 259/4 |
| 4,222,671 A | 9/1980 | Gilmore ..................... 366/337 |
| 4,728,502 A | 3/1988 | Hamill ....................... 422/116 |
| 4,894,146 A * | 1/1990 | Giddings .................... 209/12.2 |
| 5,209,906 A | 5/1993 | Watkins et al. .............. 422/200 |
| 5,250,263 A | 10/1993 | Manz .......................... 422/81 |
| 5,399,317 A | 3/1995 | Stolowitz ..................... 422/99 |
| 5,499,650 A | 3/1996 | McArthur et al. ............ 137/85 |
| 5,534,328 A | 7/1996 | Ashmead et al. ........... 428/166 |
| 5,580,523 A | 12/1996 | Bard ............................ 422/50 |

(Continued)

FOREIGN PATENT DOCUMENTS

DE    WO 00/62914    10/2000

(Continued)

*Primary Examiner*—Jill Warden
*Assistant Examiner*—Dwayne K. Handy
(74) *Attorney, Agent, or Firm*—Ronald M. Anderson

(57) ABSTRACT

A stacked plate chemical reactor in which simple plates are stacked together to form the reactor. When openings in adjacent plates are properly aligned, fluid pathways and processing volumes are defined for chemical reactants, heat transfer medium, and a product. In one embodiment of the invention, an n-fold internal array is achieved by providing a first group of simple plates defining a reaction unit that includes bypass fluid channels and reaction fluid channels for each reactant, such that a portion of each reactant is directed to subsequent groups of simple plates defining additional reaction units. A chemical reactor with variable output is obtained in a preferred embodiment by reversibly joining reactor stacks comprising irreversibly joined reaction units, these reaction units consisting of a plurality of simple plates. Other embodiments employ at least one of an array of parallel fluid channels having different widths, bifurcated fluid distribution channels to achieve a substantially even flow equipartition for fluids with varying viscosities flowing within the fluid channels of each reaction unit.

99 Claims, 43 Drawing Sheets

U.S. PATENT DOCUMENTS

| | | | |
|---|---|---|---|
| 5,595,712 A | 1/1997 | Harbster et al. | 422/129 |
| 5,641,400 A | 6/1997 | Kaltenbach et al. | 210/198 |
| 5,690,763 A | 11/1997 | Ashmead et al. | 156/60 |
| 5,698,485 A | 12/1997 | Bruck et al. | 501/87 |
| 5,741,466 A | 4/1998 | Bodnaras | 422/228 |
| 5,803,600 A | 9/1998 | Schubert et al. | 366/144 |
| 5,811,062 A | 9/1998 | Wegeng et al. | 422/129 |
| 5,928,880 A | 7/1999 | Wilding et al. | 435/7.21 |
| 5,939,024 A | 8/1999 | Robertson | 422/101 |
| 5,961,932 A | 10/1999 | Ghosh et al. | 422/193 |
| 5,976,472 A | 11/1999 | Chatterjee et al. | 422/130 |
| 6,036,927 A | 3/2000 | Chatterjee et al. | 422/211 |
| 6,126,723 A | 10/2000 | Drost et al. | 96/4 |
| 6,149,882 A | 11/2000 | Guan et al. | 422/211 |
| 6,171,865 B1 | 1/2001 | Weigl et al. | 436/52 |
| 6,180,081 B1 | 1/2001 | Poschmann et al. | 423/648.1 |
| 6,190,034 B1 | 2/2001 | Nielsen et al. | 366/336 |
| 6,192,596 B1 | 2/2001 | Bennett et al. | 34/76 |
| 6,221,226 B1 | 4/2001 | Kopf-Sill | 204/602 |
| 6,264,900 B1 | 7/2001 | Schubert et al. | 422/224 |
| 6,494,614 B1 | 12/2002 | Bennett et al. | 366/36 |
| 6,537,506 B1 * | 3/2003 | Schwalbe et al. | 422/130 |
| 6,656,423 B1 | 12/2003 | Joslyn | 422/1 |
| 6,701,774 B2 | 3/2004 | Srinivasan et al. | 73/23.42 |
| 6,827,095 B2 | 12/2004 | O'Connor et al. | 137/15.01 |
| 2002/0080563 A1 | 6/2002 | Pence et al. | 361/676 |
| 2002/0170976 A1 | 11/2002 | Bergh et al. | 236/49.1 |

FOREIGN PATENT DOCUMENTS

| | | |
|---|---|---|
| GB | WO 00/34728 | 6/2000 |
| WO | WO 01/43857 A1 | 6/2001 |

* cited by examiner

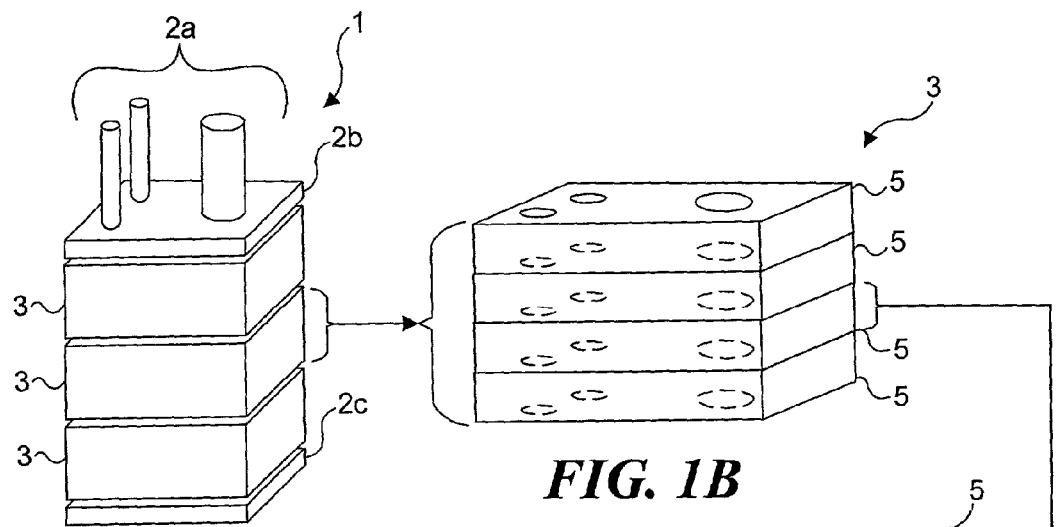
FIG. 1A
FIG. 1B
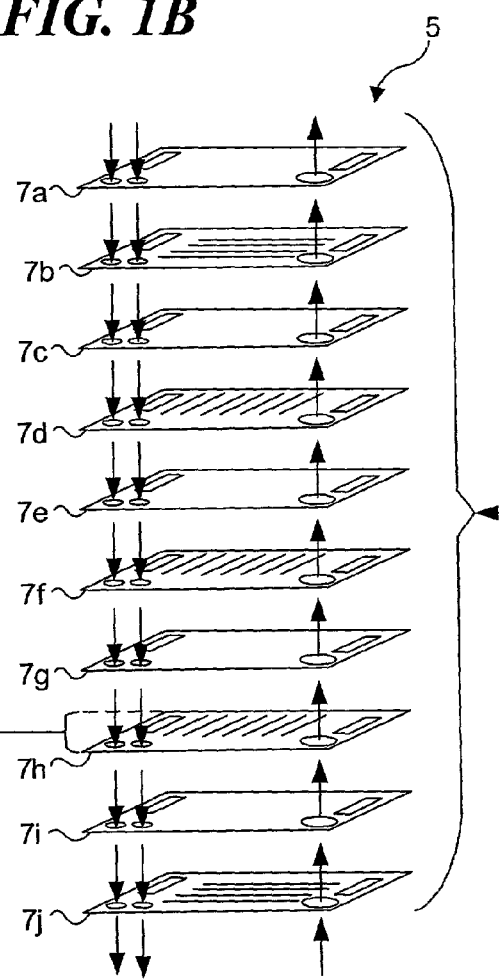
FIG. 1C
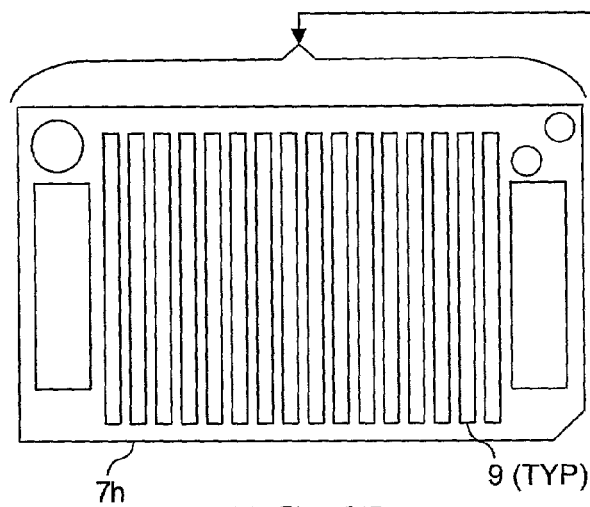
FIG. 1D

ENHANCING FLUID FLOW IN A STACKED PLATE MICROREACTOR

RELATED APPLICATIONS

This application is a continuation-in-part of prior U.S. patent application Ser. No. 09/496,999, filed Feb. 3, 2000 now U.S. Pat. No. 6,537,506, priority in the filing date of which is hereby claimed under 35 U.S.C. § 120.

FIELD OF THE INVENTION

This invention generally relates to a miniaturized chemical processing apparatus, and more specifically, to a miniaturized chemical processing apparatus assembled from stacked plates that cooperate to provide fluid channels for conveying reactants and other fluids.

BACKGROUND OF THE INVENTION

Methods of controlling and optimizing processes for producing chemical compounds are well known. The control of parameters such as temperature, pressure, mixing conditions, relative volumes of reactants, and uses of catalysts are generally well understood. Traditionally, newly discovered chemical compounds and processes involving either the production of such compounds, or processes involving the use of such compounds, have been initially carried out by researchers in "benchscale" environments. Particularly promising chemicals or processes may ultimately be produced in quantity by application to industrial-scale processes. Often, problems are encountered in scaling up a process from the laboratory to industrial-scale production.

Problems associated with moving from benchscale production to industrial-scale production often involve changes in process conditions between the benchscale environment and the industrial environment. For example, the temperature of the reactants in a small beaker or flask in a laboratory is much easier to keep constant than the temperature in a production tank having a capacity of hundreds of liters, as is often the case in a chemical processing plant. Variations in other process conditions within a large tank are also more difficult to control, and frequently affect the quality and yield of the desired product.

Another aspect of laboratory development of processes to produce chemical compounds is that often potentially dangerous chemicals are used to create the desired product. Fires and explosions in research laboratories and concomitant injury to personnel and property are well known risks in the chemical research industry. The risks are not limited only to research, since industrial chemical production facilities also may experience fires and explosions related to chemical production using dangerous chemicals. Often, due to the quantities of chemicals used in industrial-scale processes, such accidents are significantly more devastating in an industrial setting than similar accidents in a research setting.

Recently, much attention has been directed to the use of microscale reactors for both development and production of chemical processes. These types of reactors offer several advantages. As noted above, the control of chemical processes within very small reactors is much simpler than control in a large-scale production tank. Once a reaction process has been developed and optimized in a microscale reactor, it can be scaled up to industrial production level by replicating the microscale reactors in sufficient quantity to achieve the required production output of the process. If such reactors can be fabricated in quantity, and for a modest cost, industrial quantities of a desired product can be manufactured with a capital expenditure equal to or even less than that of a traditional chemical production facility. An additional benefit is that because the volume of material in each individual reactor is small, the effect of an explosion or fire is minimized, and with proper design, an accident in one reactor can be prevented from propagating to other reactors.

Safety in the research setting is also improved as such reactors generally require less exposure to hazardous substances and conditions by research personnel than traditional "batch chemistry," which typically requires that the researcher physically handle chemicals in a variety of glass containers, often in the presence of a heat source. Any accident in such an environment is likely to increase the risk of exposure to hazardous chemicals, and cause significant damage to the laboratory. In contrast, small-scale or microreactors can be designed as self-contained units that minimize the researcher's potential exposure to chemical substances. When using a microreactor, the researcher is not required to physically manipulate containers of chemical materials to carry out a desired reaction, the reactor can be located in an area so that if an accident should occur, any resulting fire or explosion can be relatively easily contained.

Another area in which microreactors offer an advantage over conventional chemical process development and production is in the mixing of reactants. A mixing channel of the proper scale encourages a laminar flow of the reactants within the channel and is readily achievable in a microreactor. A laminar flow enhances mixing by diffusion, which eliminates the need to expend energy to physically stir or agitate the reactants and is an extremely fast and efficient mixing technique.

Microreactors are particularly applicable to the pharmaceutical industry, which engages in chemical research on many new chemical compounds every year, in the effort to find drugs or chemical compounds with desirable and commercially valuable properties. Enhancing the safety and efficiency of such research is valuable. When coupled with the potential that microreactors offer for eliminating the problems of moving from benchscale production to industrial production, it will be apparent that a microreactor suitable for use in carrying out a variety of chemical processes, and having an efficient and low cost design, will be in high demand.

Several different designs for microreactors have been developed. For example, such reactors are described in U.S. Pat. No. 5,534,328 and U.S. Pat. No. 5,690,763 (both listing Ashmead et al. as the inventors). These patents describe reactor structures for chemical manufacturing and production, fabricated from a plurality of interconnected layers. Generally, each layer has at least one channel or groove formed in it and most include orifices that serve to connect one layer in fluid communication with another. These layers are preferably made from silicon wafers, because silicon is relatively inert to the chemicals that may be processed in the reactor, and because the techniques required to mass produce silicon wafers that have had the required channels and other features etched into their surfaces are well known.

A disadvantage of the reactors described by Ashmead stems from the rather expensive and complicated process required for manufacturing the devices. While silicon wafer technology has advanced to the state that wafers having desired surface features can readily be mass produced, the equipment required is capital intensive, and unless unit production is extremely high, the substantial costs are difficult to offset. While Ashmead suggests that other materials can be used to fabricate the layers, such as metal, glass, or plastic, the surface features required (grooves, channels, etc.) must still be formed in the selected material. The specific surface features taught by Ashmead require significant manufacturing steps to fabricate. For instance, while forming an opening through a material is relatively easy, forming a groove or channel that penetrates only part way through the material comprising a layer is more difficult, as the manufacturing process must not only control the size of the surface feature, but the depth, as well. When forming an opening that completely penetrates through a material comprising a layer, depth control does not need to be so precisely controlled. Ashmead teaches that both openings, which completely penetrate the layers, and surface features (grooves/channels) that do not completely penetrate the individual layers are required. Hence, multiple processing steps must be employed in the fabrication of each layer, regardless of the material selected. Accordingly, it would be desirable to develop a microreactor comprising layers that do not require such detailed fabrication.

U.S. Pat. No. 5,580,523 (Bard) describes a modular microreactor that includes a series of modules connected in fluid communication, each module having a particular function (fluid flow handling and control, mixing, chemical processing, chemical separation, etc.). Bard specifically teaches that the plurality of modules are mounted laterally on a support structure, and not stacked, as disclosed by Ashmead. In a preferred embodiment of Bard, silicon wafer technology is again used to etch channels and/or other features into the surface of a silicon wafer. Other disclosed fabrication techniques include injection molding, casting, and micromachining of metals and semiconductor substrates. Again, the processing required to fabricate the individual modules goes beyond merely forming a plurality of openings into each component. Furthermore, the lateral layout of the reactor described by Bard requires a larger footprint (Basis Area) than a stacked plate reactor. In Bard's reactor, the more modules added, the larger the footprint of the entire reactor. In contrast, when additional plates are added to a stacked plate reactor, the footprint of the reactor does not change, which can be a distinct advantage, as in many work environments, the area an apparatus occupies on a workbench or floor is more valuable than the vertical height of the apparatus. It would be desirable to provide a reactor design that has a minimal footprint, while still providing the flexibility to add components to customize the reactor for a particular process or application.

In U.S. Pat. No. 5,961,932 (Ghosh et al.), a reactor is described that is formed from a plurality of ceramic layers, which are connected in fluid communication, at least one layer including a permeable partition. In particular, Ghosh describes the desirability of sizing fluid channels appropriately to provide for laminar flow and mixing via diffusion, rather than mixing via turbulence. In his preferred embodiment, Ghosh describes that channels and passageways are formed in each layer. The particular process Ghosh describes to accomplish this task involves fabricating the layers from "green" or uncured ceramic, which once shaped as desired, must be sintered. Significantly, the sintering process changes the size of the ceramic layer, so that the sizes of the features formed into the ceramic layer in the initial stages of production are different than in the finished product. It would be desirable to provide a reactor design in which the dimensions of the individual components can be rigidly controlled during fabrication, and are not subject to shrinkage, which can negatively effect the dimensions of the finished reactor. This object is particularly important when a reactor design focuses on achieving a laminar flow, because precise dimensional control of fluid pathways in the reactor must be maintained to achieve a consistent laminar flow, precisely controlled pressure drops, and precisely controlled fluidic resistance.

In all of these prior art reactors, relatively complicated manufacturing techniques are required. The manufacture of layers of silicon material requires a large capital investment. Sintering of a ceramic material requires the precise control of the shrinkage process, or individual components of a desired size cannot be achieved. In all cases, the prior art teaches that complicated structures (for example, fluid channels and reaction channels) must be etched or otherwise fabricated in each layer. Additionally, orifices or passages also need to be formed in each layer, so that fluids can move between adjacent layers of the reactor. Thus, a series of different manufacturing steps typically must be performed for each layer. It would be desirable to provide a reactor design offering the advantages described above, which is relatively simple to manufacture, so as to minimize capital investment in scaling up production from the laboratory to the industrial production levels.

As indicated above, while a single microreactor can produce only a limited volume of product, additional microreactors can be added in parallel to increase production capacity. When additional modular microreactor units are added, additional systems for reactant supply, heat transfer media supply, and product collection are typically required, which not only increases the complexity of the system, but also requires more space for duplicative fluid systems. Furthermore, even minor differences in feed rates for some of the duplicate reactor modules can negatively effect product quality. Finally, more sophisticated control and monitoring are required to manage additional reaction modules and feed systems. It would therefore be desirable to provide a microreactor capable of n-fold parallelization without requiring that additional fluid and control systems be provided.

In an array of identical fluid channels having a single common reactant distribution channel and a single common product collection channel, with the reactant inlet and the product outlet located at opposite ends, where the common reactant distribution and the common product collection channel have the same cross sectional area, if the viscosity of the product relative to the reactants is substantially the same, then the pressure drop through the array can be considered the same, and the resulting flow distribution is fairly even, with only slightly lower flow rates in the central fluid channels.

However, the flow distribution through such an array is not even if the viscosity of the product is significantly different than the viscosities of the reactants. When such an array is employed to process a reaction whose product has a significantly different viscosity compared to the viscosity of the mixture of the unreacted reactants, broad residence time distributions result in the array due to the fact that the pressure drop in the common reactant distribution channel no longer balances with the pressure drop in the common product collection channel. The flow rates within each individual fluid channel in the array are no longer identical. If the viscosity of the product is significantly greater than the viscosity of the mixed but unreacted reactants, then the flow rates in the individual fluid channels in the array tend to increase across the array for channels closest to the common product outlet. Thus the highest flow rate is experienced in the fluid channel in the array that is closest to the common product outlet, while the lowest flow rate is experienced in the fluid channel in the array that is located furthest from the common product outlet. This phenomenon is different if the viscosity of the product is less than the viscosity of the mixed but unreacted reactants. Thus for lower viscosity products the highest flow rate is experienced in the fluid channel in the array that is closest to the common reactant inlet, while the lowest flow rate is experienced in the fluid channel in the array that is located furthest from the common reactant inlet. The greater the relative change in viscosity, the greater the variation in flow rates across the array.

This imbalance leads to different residence times being associated with different fluid channels, resulting in an undesirable residence time distribution within the whole reaction unit. In certain cases, the additional residence time can lead to undesired cross reactions, and even clogging of the "slowest" fluid channels. It would be desirable to provide a microreactor including a plurality of fluid channels that is capable of processing reactant mixtures undergoing a significant viscosity change without the above-described residence time distributions and related problems.

It should further be noted that for the specific residence time distributions discussed above, relative to reactant mixtures produced in fluid channels in which a plurality of different reactants are mixed, only one type of undesirable residence time distribution is of concern. Residence time distribution problems of this type can also arise in fluid channels used to direct reactants before mixing, as well as products for collection. It would be desirable to provide a microreactor that includes a plurality of fluid channels adapted to provide substantially equal residence time distributions for fluid flow within the microreactor.

In summary, it is desirable to provide a microscale reaction apparatus that can be economically manufactured, can maintain a desired relatively narrow temperature range for a process, has a relatively modest footprint, can provide efficient diffusion mixing using a precisely controlled laminar flow, is capable of n-fold parallelization without requiring additional fluid supply, removal and control systems, can process reaction mixtures that form a product with a significantly different viscosity, and can provide substantially equal residence time distributions for fluid flow within the microreactor. Currently, the prior art does not include such apparatus.

SUMMARY OF THE INVENTION

In accord with the present invention, a stacked plate reactor is defined for reacting one chemical with at least one other chemical, for the purpose of forming a chemical product. Stacked plate reactors in accord with the present invention include means for manipulating a flow of fluid in a reactor to achieve a desired result.

Each stacked plate reactor includes a plurality of simple plates, each simple plate having at least one opening formed therein, the simple plates being stacked together to form a plurality of layers and arranged so that at least one opening in each simple plate overlaps at least one other opening in an adjacent simple plate, thereby forming a fluid inlet for each different chemical reactant, a fluid outlet for a chemical product, a fluid inlet for a heat transfer media, a fluid outlet for a heat transfer media, a plurality of heat exchangers, and a plurality of mixing and reaction channels.

Each heat exchanger is defined by an opening in a different simple plate. The opening is in fluid communication with the heat transfer media inlet and outlet ports and is disposed between adjacent simple plates. Preferably, each heat exchanger is used to modify the temperature of at least one of the reactants and/or the chemical product. The heat exchangers can also be used to modify a temperature of one of two reactants such that they are at different temperatures.

Preferably fluid channels in each of the plurality of heat exchangers are disposed substantially orthogonal to fluid channels for directing a flow of at least one of a chemical reactant and a chemical product whose temperature is to be manipulated by one of the plurality of heat exchangers (preferably oriented in a cross-flow arrangement). A material from which the simple plates are fabricated is selected for compatibility with the chemical process. In one embodiment, the simple plates are formed from a material selected from the group consisting of crystalline wafers, ceramics, glasses, polymers, composite materials, and metals. Most preferably, the simple plates are fabricated from a stainless steel or nickel alloy.

It is also preferable that the reactor accommodates a plurality of operations, including temperature control, control of chemical residence time, chemical mixing, and chemical reacting. Temperature control is achieved by using a combination of one or more temperature sensors and one or more heat exchangers. Preferably, chemical mixing is carried out by employing pathways sized and oriented so that a reactant achieves a stacked laminar flow with respect to at least one other reactant.

In one embodiment, the simple plates are removably held together in the stack by an applied compressive force. In this embodiment, a housing provides the compressive force, producing a pressure acting on the outer simple plates. The mean surface roughness of the plates is preferably less than about one (1) micrometer, and the simple plates are substantially free of scratches. The pressure is preferably greater than or equal to 300 Newtons per square millimeter, preferably in conjunction with the use of gaskets or O-rings. In another embodiment, the simple plates are permanently joined. When permanently joined, the mean surface roughness of the plates is preferably less than about 5 micrometers. Permanent joining can be achieved using diffusion welding or vacuum soldering. It should be noted that if compressive forces are employed to join the simple plates, the reactor could be readily reconfigured by removing the compressive force, and replacing or adding additional simple plates.

Preferably the openings in the plurality of intermediate simple plates share common shapes and sizes to the extent possible, to minimize fabrication costs. Preferably, all the simple plates are chamfered at one corner to provide a reference when assembling the simple plates to form the chemical reactor.

One preferred group of embodiments of the present invention is directed to stacked plate reactors in which means for manipulating a flow of fluid in a reactor to achieve a desired result are specifically employed to enable the stacked plate reactor to achieve internal parallelization for increased throughput. The reactor includes a top plate, a plurality of individual reaction units, and a bottom plate. Each reaction unit includes reactant fluid paths, reactant mixing and reaction channels, product fluid paths, heat exchangers, and comprises a set of simple plates. The number of reaction units employed is a function of the volume of product desired. In this internally parallelized path reactor, the means include openings in the simple plates defining each reaction unit so that all reaction units include two types of reactant fluid channels. A first type of reactant fluid channel enables reactants to be combined to achieve the desired product. A second type of reactant fluid channel bypasses the operation of an instant (current) reaction unit, so that the reactant is delivered to and processed by a subsequent reaction unit.

Such stacked plate reactors include a first simple plate comprising a fluid inlet for each different chemical reactant, a fluid outlet for a chemical product, a fluid inlet for a heat transfer media, a fluid outlet for a heat transfer media, a plurality of serially-connected reaction units, and a bottom plate. Each reaction unit is in fluid communication with the first simple plate and comprises a stack of simple plates, each simple plate having at least one opening that extends therethrough, an opening in each simple plate overlapping at least one other opening in an adjacent simple plate thereby forming a plurality of heat exchangers for modifying a temperature of at least one of a chemical reactant and a chemical product, and at least one mixing and reaction channel. Most preferably, each mixing and reaction channel is sandwiched between an upper and a lower heat exchanger to maximize the ability to control a reaction temperature.

Preferably, each serially-connected reaction unit includes a first heat exchanger for modifying a temperature of a first chemical reactant, and a second heat exchanger for modifying a temperature of a second chemical reactant and for modifying a temperature of a mixing and reaction channel. Also included are at least one mixing and reaction channel that establishes a laminar flow relationship between a first chemical reactant and a second chemical reactant in order to mix a first chemical reactant and a second chemical reactant together via diffusion mixing, and to provide sufficient residence time for initiation of a chemical reaction between a first chemical reactant and a second chemical reactant. In addition, a third heat exchanger is included for modifying a temperature of the mixing and reaction channel.

To couple a subsequent reaction unit to a preceding reaction unit, the first heat exchanger of a subsequent reaction unit also comprises the third heat exchanger of the preceding reaction unit. Thus, a first reaction unit is preferably fabricated from a stack of twelve simple plates (not including a top plate), each subsequent reaction unit is preferably fabricated from a stack of ten simple plates, and the first simple plate in a subsequent reaction unit is stacked upon a last simple plate of the preceding reaction unit. To enable a single reactor to produce more product using the same top plate with fluid inlets and outlets, additional sets of stacked plates representing additional reaction units, are added to the stack between the first reaction unit and the bottom plate.

It should be noted that stacked plate reactors capable of n-fold internal parallelization could be fabricated using simple plates of as few as twelve different configurations, including top plate and bottom plate, stacked together. Only these twelve different configurations are required to produce a plurality of fluid channels, mixing and reaction channels, and multiple heat exchangers. If plugs are used to seal all openings in a bottom plate, then simple plates having only eleven different configurations are required to fabricate reactors capable of n-fold internal parallelization. Further, if a dead volume associated with a product fluid passage is acceptable, simple plates of only ten different configurations are required to fabricate reactors capable of n-fold internal parallelization. In some embodiments, longer plugs are employed to fill the dead volume associated with non-required openings in some of the simple plates.

Other preferred embodiments in accord with the present invention are directed to stacked plate reactors in which the means for manipulating a flow of fluid in a reactor to achieve a desired result is specifically employed to enable viscous fluids to be processed, while maintaining a substantially equivalent residence time distribution for processing product fluid that has a substantially different viscosity compared to the viscosity of the reactants flowing through parallel fluid paths. In one group of such embodiments, the means comprises an opening having a bifurcated shape formed in at least one simple plate, the bifurcated shape enhancing the residence time distribution for a fluid flowing in at least one bifurcated fluid channel associated with the bifurcated shape.

In this set of embodiments, a stacked plate reactor comprises a plurality of simple plates, stacked in layers, each simple plate having at least one opening that extends therethrough, an opening in each simple plate overlapping at least one other opening in an adjacent simple plate thereby forming a fluid inlet for each different chemical reactant, a fluid outlet for a chemical product, a fluid inlet and outlet for a heat transfer media, a plurality of parallel mixing and reaction channels, and a plurality of heat exchangers. In at least one embodiment, a bifurcated fluid channel is provided for each chemical reactant. A stem of each bifurcated fluid channel is in fluid communication with a corresponding chemical reactant inlet, and branches of each bifurcated fluid channel are in fluid communication with one of the parallel mixing and reaction channels.

Also in at least one embodiment, the bifurcated fluid channel is employed for product collection and is thus referred to as a bifurcated product collection channel. In such an embodiment, a stem of the bifurcated product collection channel is in fluid communication with the chemical product outlet, and branches of the bifurcated product collection channel are in fluid communication with one of the parallel mixing and reaction channels.

Preferably, a bifurcated fluid channel and a bifurcated product collection channel are provided for each chemical reactant or the product mixture, respectively. In such an embodiment, the plurality of heat exchangers preferably comprises a first heat exchanger for modifying a temperature of a first chemical reactant, a second heat exchanger for modifying a temperature of a second chemical reactant and for modifying a temperature of the parallel mixing and reaction channels, a third heat exchanger for modifying a temperature of the parallel mixing and reaction channels, and a fourth heat exchanger for modifying a temperature of the product collection channel. A top simple plate suitable for such an embodiment has openings defining each fluid inlet for each different chemical reactant, a fluid inlet for a heat transfer media, and a single fluid outlet for a heat transfer media. A bottom plate comprises an opening defining the chemical product outlet. Preferably, such an embodiment comprises a stack of eighteen simple plates. Most preferably, simple plates of sixteen different configurations are employed.

In yet another group of embodiments, the means for manipulating a flow of fluid in a reactor to achieve a desired result is, like the embodiment with bifurcated channels as described above, also employed to enable product fluid with a different viscosity compared to the viscosity of the reactants to be processed while maintaining a substantially equivalent residence time distribution for fluids flowing through parallel fluid paths. In this group of embodiments, the control of fluid distribution within the reactor to ensure equivalent residence times is achieved by employing a plurality of elongate openings having different widths in at least one simple plate. These elongate openings form fluid channels when covered by solid portions of an upper and a lower simple plate.

Preferably, each of the plurality of openings having different widths in a single simple plate form a parallel array of different width fluid channels, preferably of substantially equal length. The width of the openings increases from a fluid channel having the narrowest opening disposed at one edge of the parallel array, to a fluid channel having the widest opening disposed at an opposite edge of the parallel array. Thus, the openings in the parallel array are ordered from narrowest to widest.

To enable substantial equipartition of a flow of a reaction mixture flowing through a plurality of parallel fluid channels, provided a common reactant distribution and a common product collection channel, in which the product fluid has a significantly higher viscosity as compared to a viscosity of the reactant mixture fluid, the widest fluid channel in the parallel array of different width fluid channels is disposed further from a fluid outlet opening than any other fluid channel in the parallel array, in order to equalize of the velocity of fluid flow through the different width fluid channels. If, however, the reaction mixture in which the product fluid has a significantly lower viscosity as compared to the viscosity of the reactant mixture, the widest fluid channel in the parallel array of different width fluid channels is to be disposed further from a fluid inlet opening than any other fluid channel in the parallel array.

In one embodiment employing parallel arrays of fluid channels, each chemical reactant is directed into a different parallel array of different width fluid channels, each different parallel array being defined by a different simple plate. Note that the plurality of parallel mixing and reaction channels can also comprise a parallel array of different width fluid channels.

In one preferred embodiment employing a parallel array, the plurality of heat exchangers comprises a first heat exchanger for modifying a temperature of a first chemical reactant, and a second heat exchanger for modifying a temperature of a second chemical reactant and for modifying a temperature of the parallel mixing and reaction channels. A top simple plate for use in such an embodiment has openings defining each fluid inlet for each different chemical reactant, the fluid inlet and outlet for a heat transfer media, and the chemical product outlet. A bottom plate has no openings that define a fluid inlet, and no openings that define a fluid outlet. Such a reactor can be fabricated from thirteen simple plates of at least eleven different configurations.

Another aspect of the present invention is directed to a method for producing stacked plate reactors that are capable of n-fold internal parallelization, and a method for producing stacked plate reactors in which substantially equal residence times for flow through parallel fluid channels is achieved. The method includes steps generally consistent with the functions of the elements comprising the apparatus described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1A is a schematic view of a chemical plant including a plurality of reversibly joined reactor stacks, in accord with the present invention;

FIG. 1B is a schematic view of a reactor stack including a plurality of irreversibly joined reaction units;

FIG. 1C is a schematic view of a reaction unit including a plurality of irreversibly joined simple plates;

FIG. 1D is a plan view of a simple plate including a parallel array of reaction channels;

Figure 51:
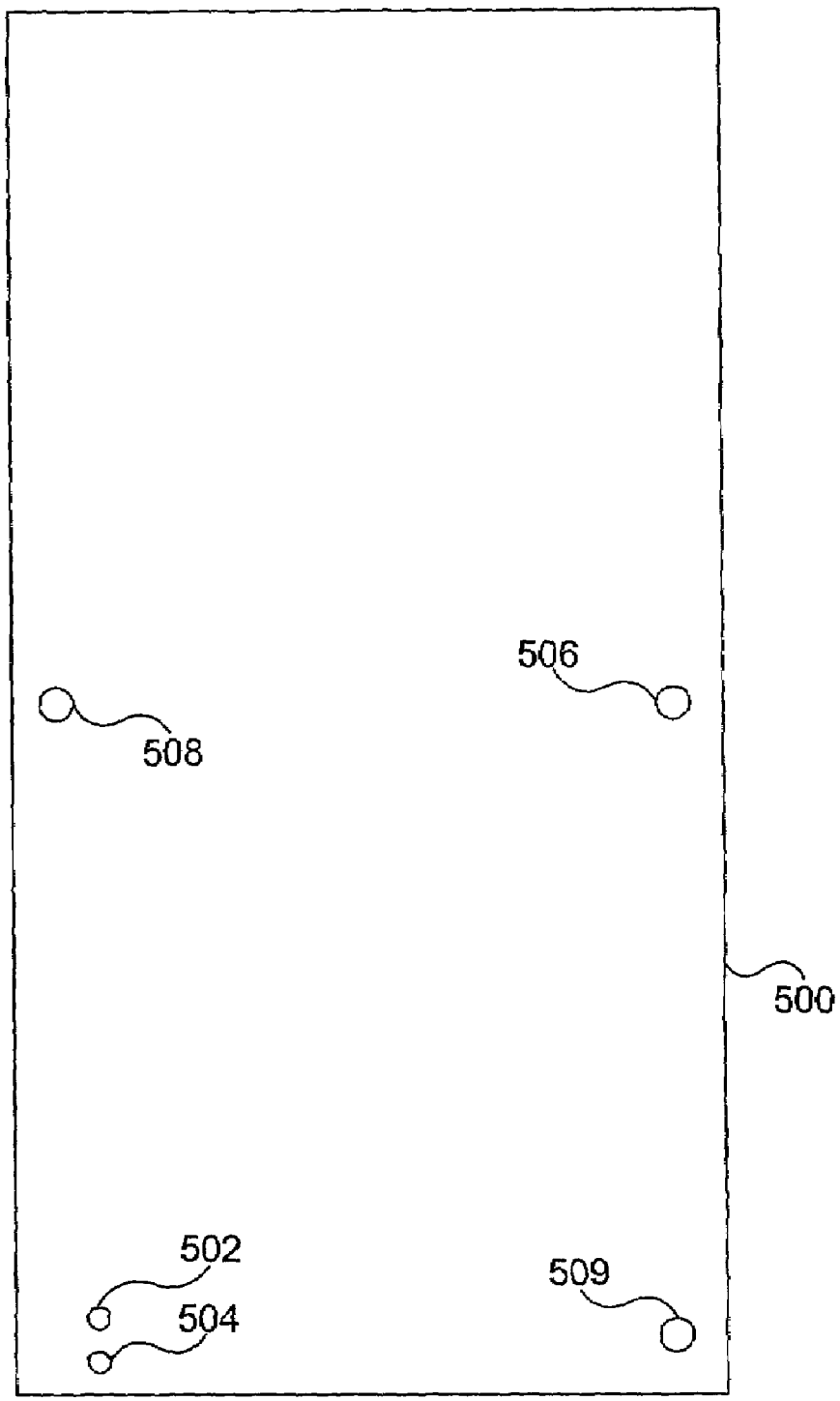
FIG. 51 is a plan view of a top simple plate of an embodiment for a stacked plate chemical reactor that incorporates a parallel array of different width fluid channels, including openings for reactants, a product outlet, and heat transfer media inlets and outlets.
Figure 57:
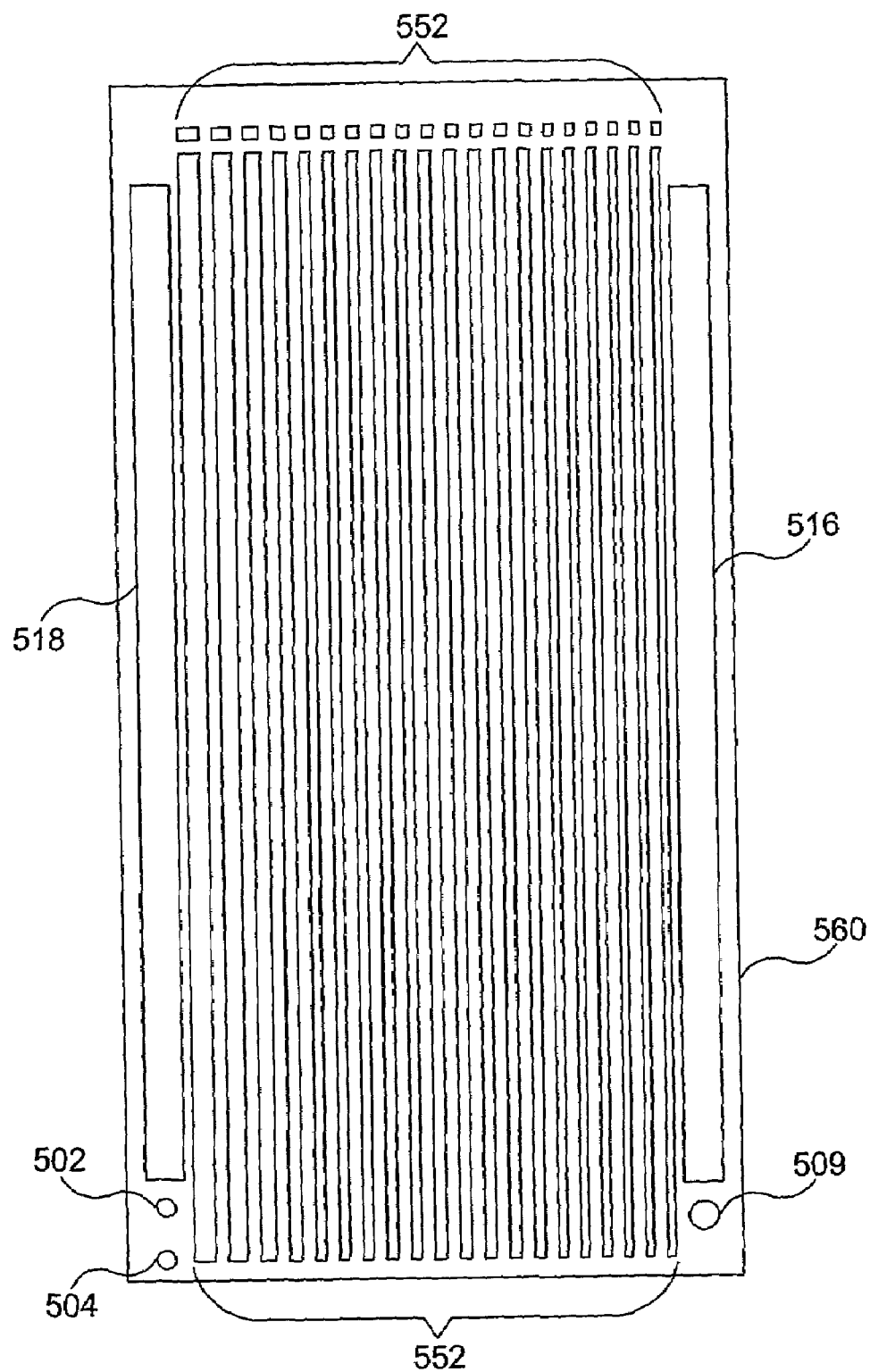
Figure 58:
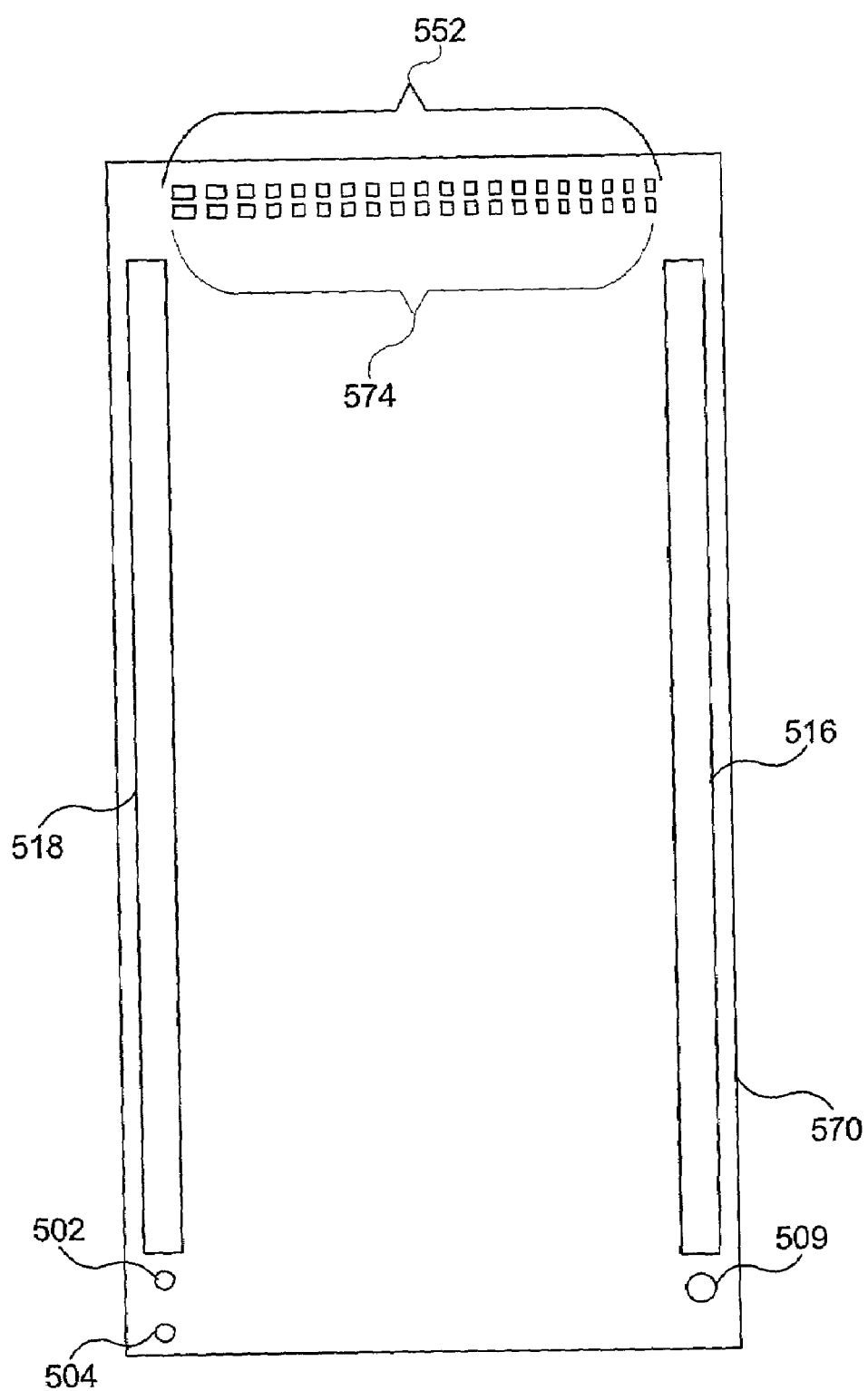
Figure 59:
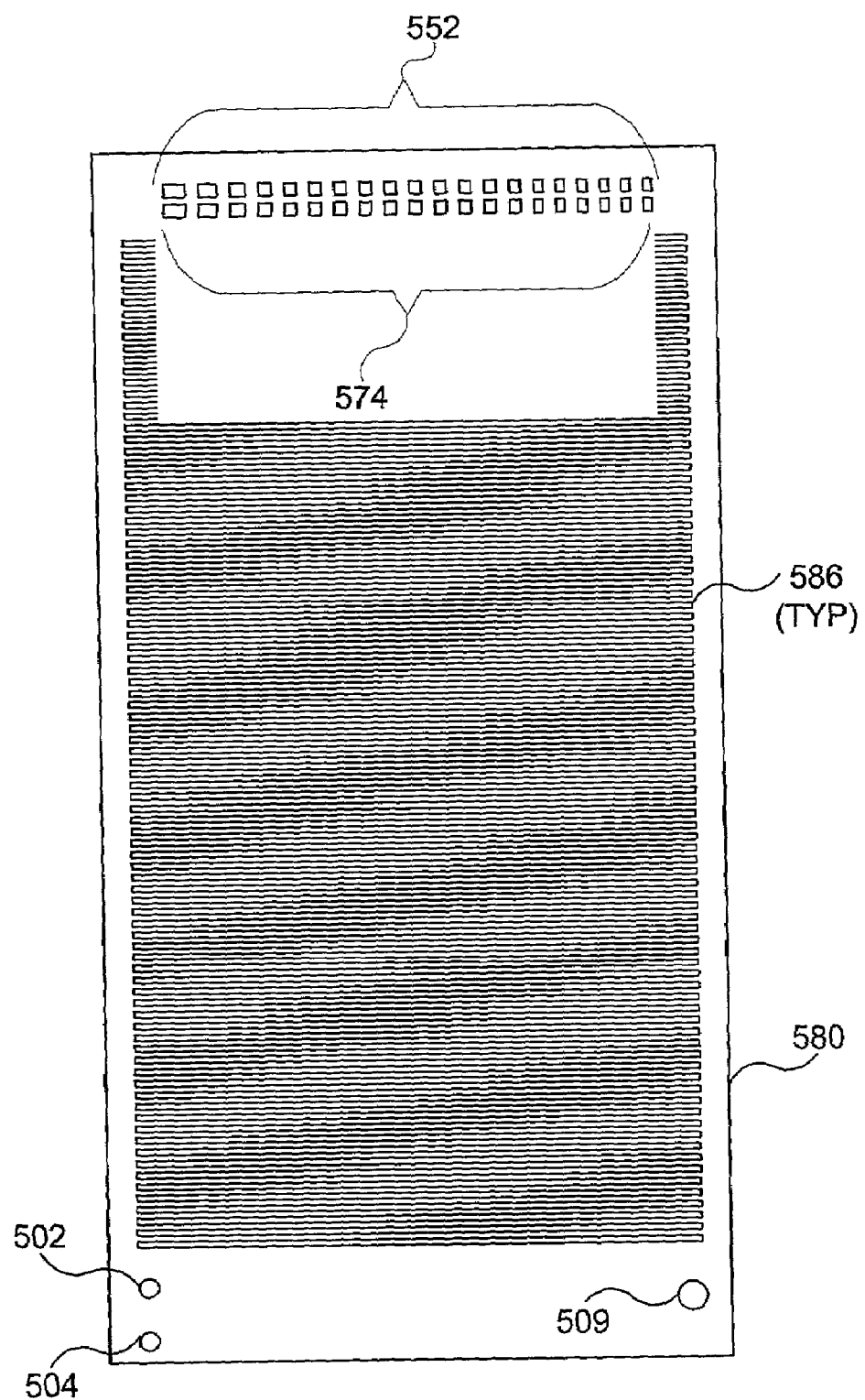
Figure 60:
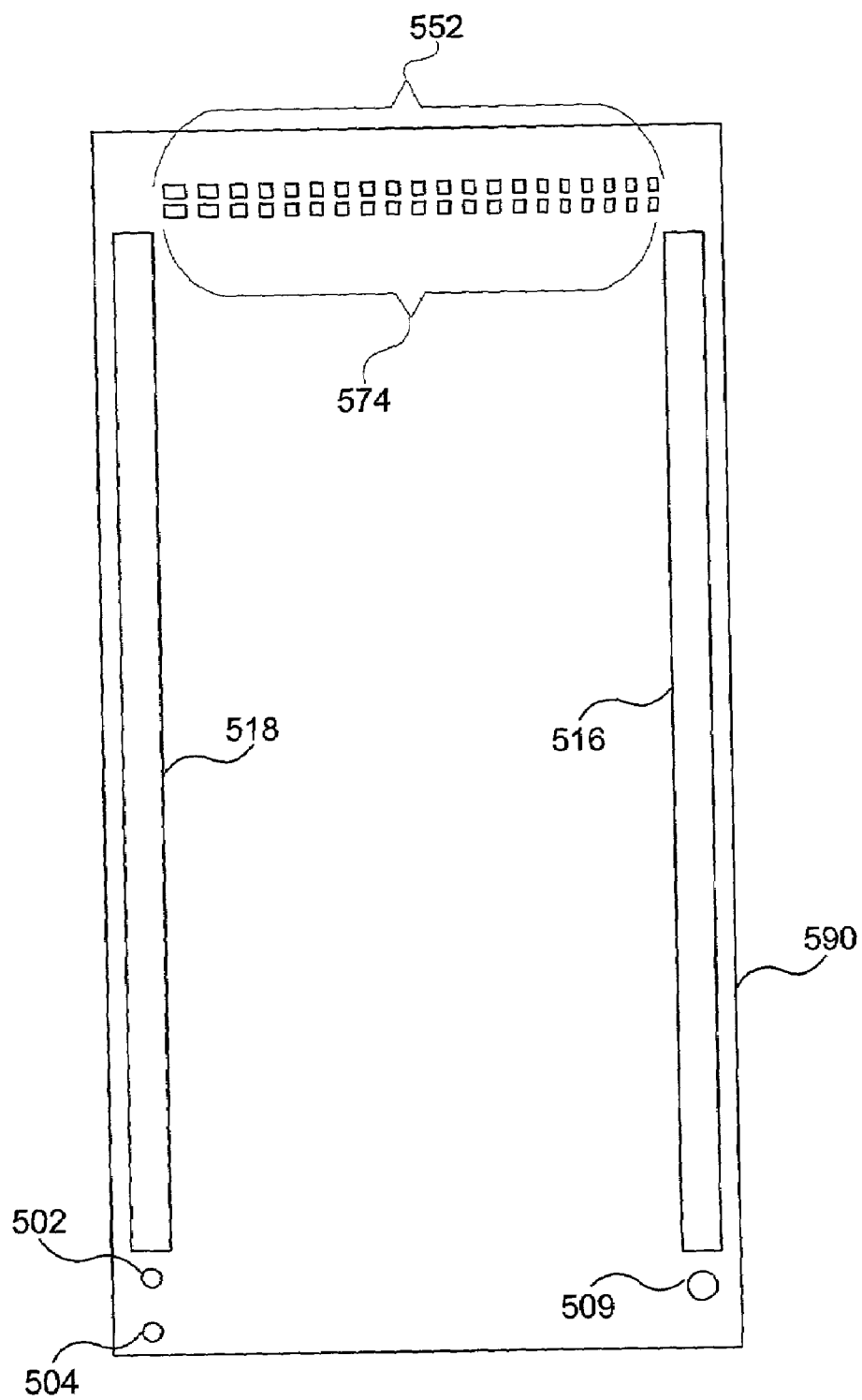
Figure 61:
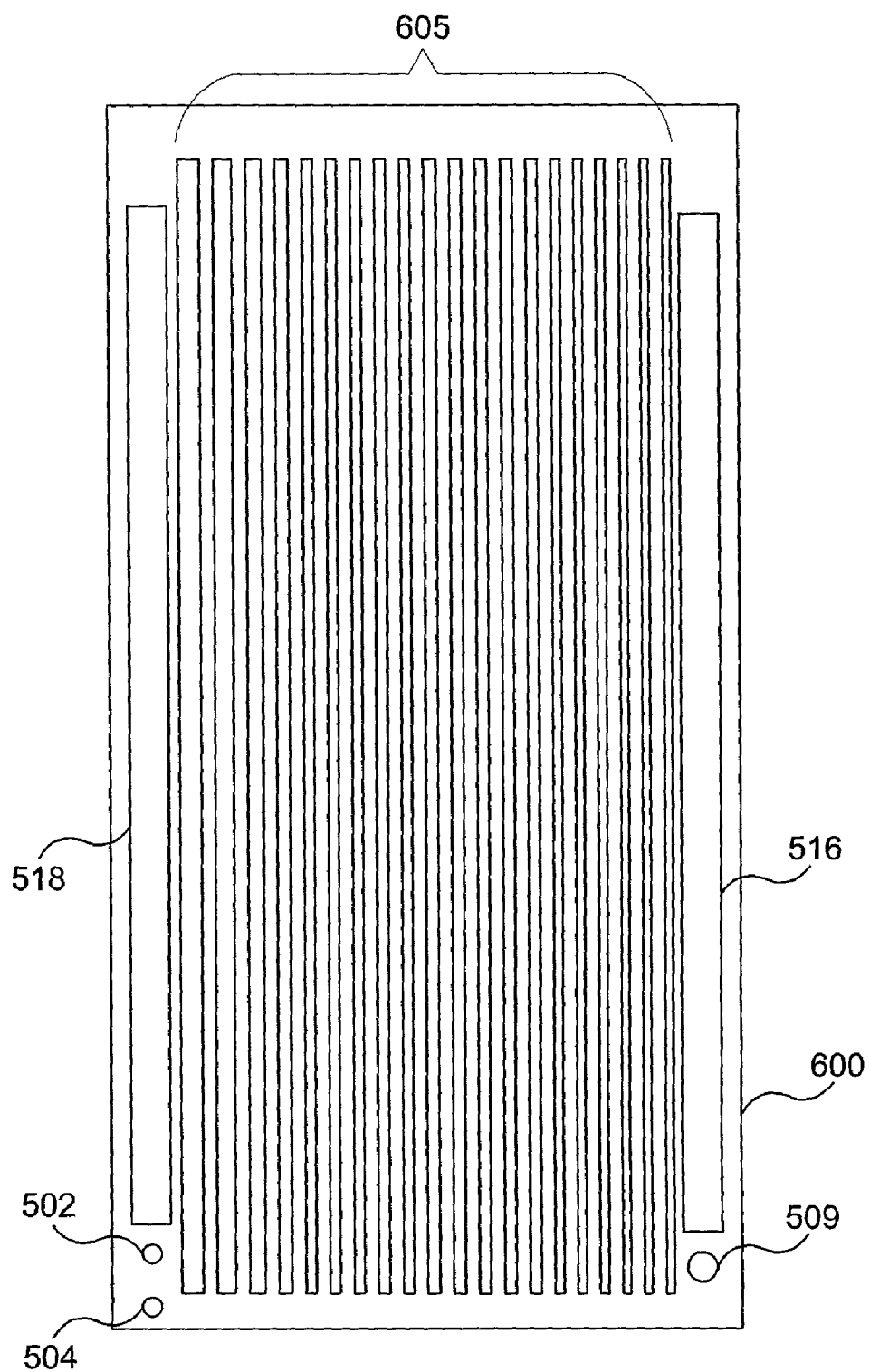
Figure 62:
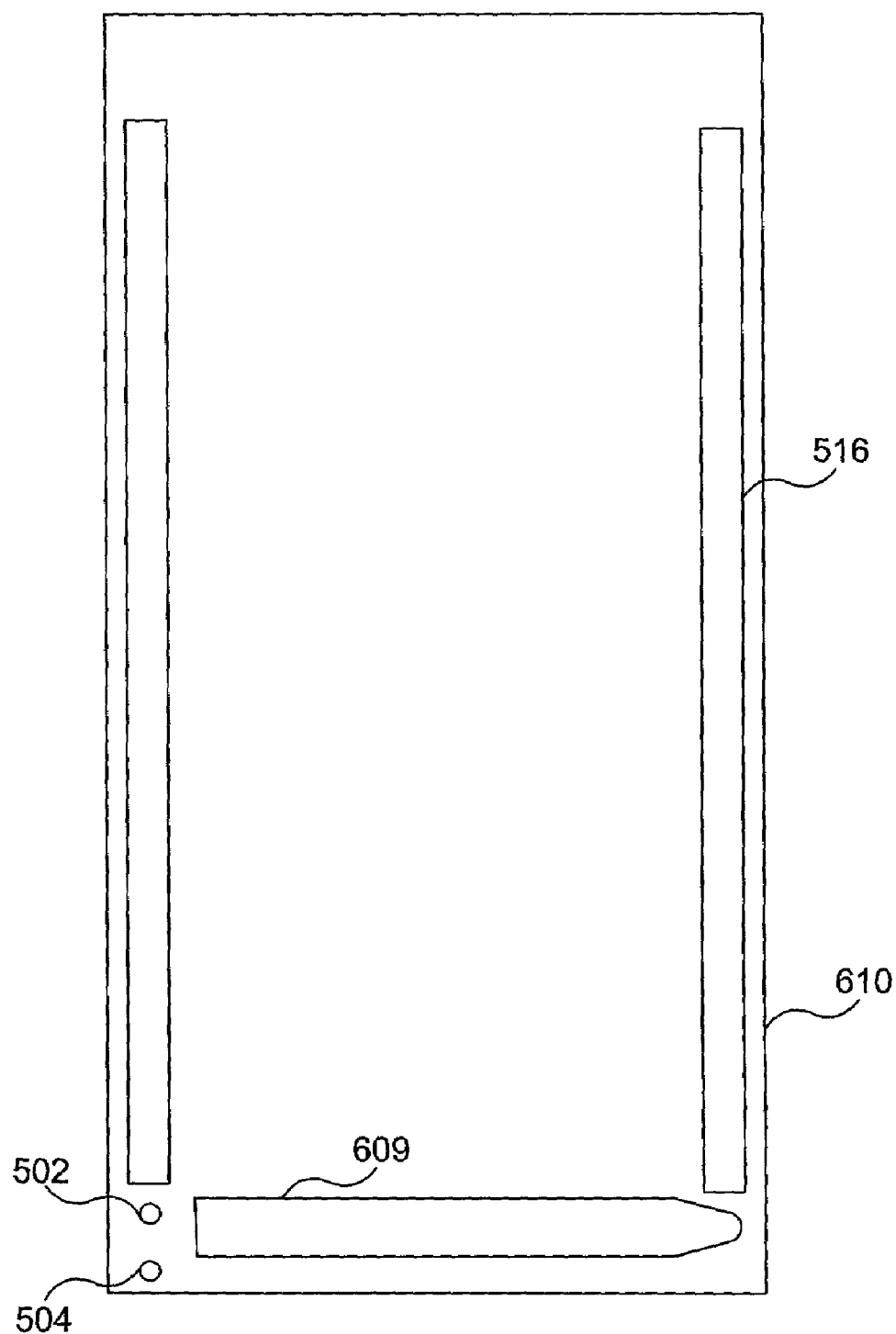
Figure 63:
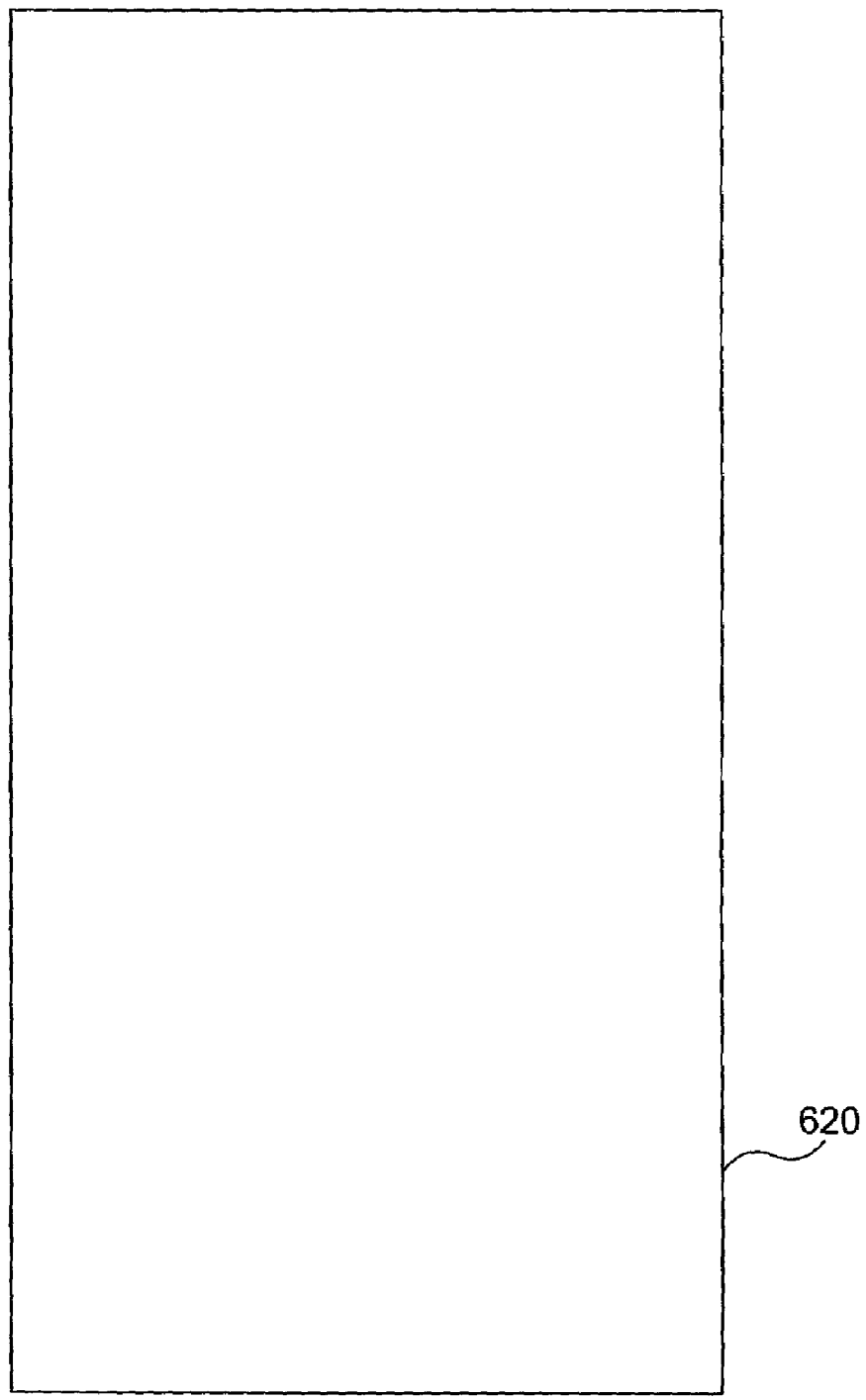
Figure 64:
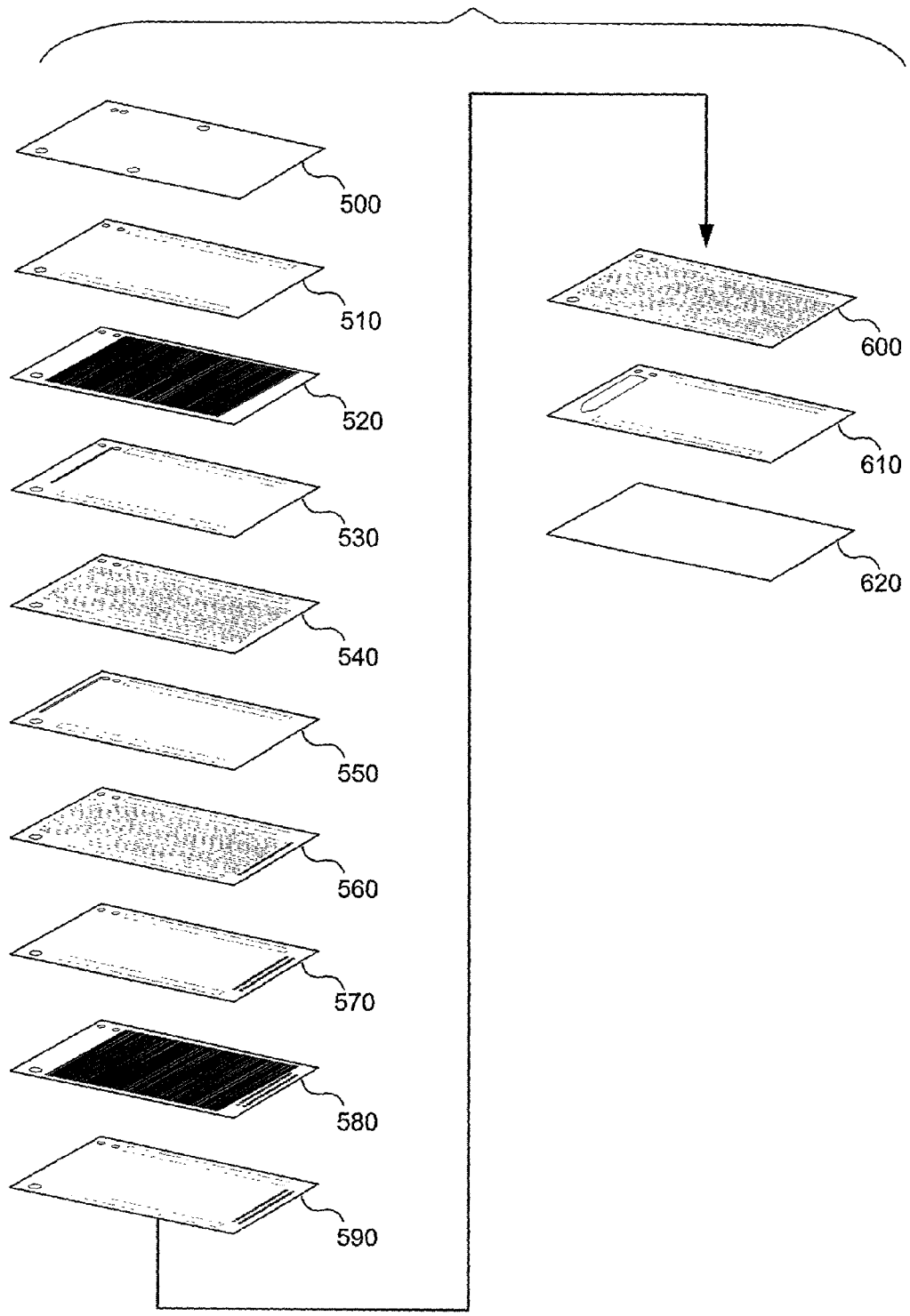
Figure 65:
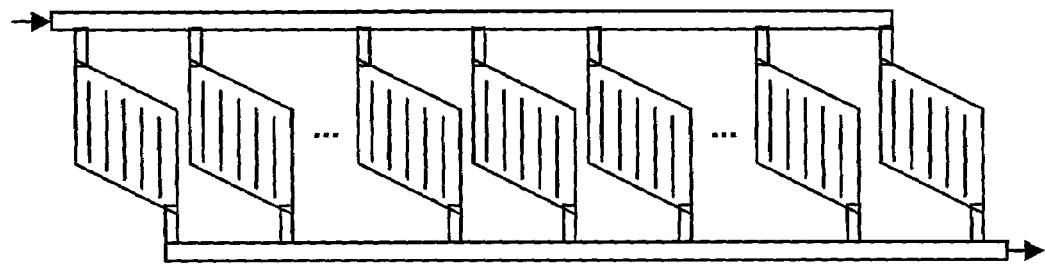

FIG. 57 is a plan view of the seventh simple plate of the embodiment for a stacked plate chemical reactor that incorporates a parallel array of different width fluid channels illustrating a first reactant opening, a plurality of first reactant bores, a second reactant opening, a second reactant distributor comprising a parallel array of different width openings, a product opening, and two heat exchanger manifold openings;

FIG. 58 is a plan view of the eighth simple plate of the embodiment for a stacked plate chemical reactor that incorporates a parallel array of different width fluid channels illustrating a first reactant opening, a plurality of first reactant bores, a second reactant opening, a plurality of second reactant bores, a product opening, and two heat exchanger manifold openings;

FIG. 59 is a plan view of the ninth simple plate of the embodiment for a stacked plate chemical reactor that incorporates a parallel array of different width fluid channels illustrating a first reactant opening, a plurality of first reactant bores, a second reactant opening, a plurality of second reactant bores, a product opening, and a second heat exchanger;

FIG. 60 is a plan view of the tenth simple plate of the embodiment for a stacked plate chemical reactor that incorporates a parallel array of different width fluid channels illustrating a first reactant opening, a plurality of first reactant bores, a second reactant opening, a plurality of second reactant bores, a product opening, and two heat exchanger manifold openings;

FIG. 61 is a plan view of the eleventh simple plate of the embodiment for a stacked plate chemical reactor that incorporates a parallel array of different width fluid channels illustrating a first reactant opening, a second reactant opening, a product opening, a plurality of mixing and reaction channels comprising a parallel array of different width openings, and two heat exchanger manifold openings;

FIG. 62 is a plan view of the twelfth simple plate of the embodiment for a stacked plate chemical reactor that incorporates a parallel array of different width fluid channels illustrating a first reactant opening, a second reactant opening, a product collector, and two heat exchanger manifold openings;

FIG. 63 is a plan view of the thirteenth plate of the embodiment for a stacked plate chemical reactor that incorporates a parallel array of different width fluid channels;

FIG. 64 is an exploded isometric view of the stacked plate chemical reactor of FIG. 51 illustrating how all thirteen simple plates are stacked;

FIG. 65 is a schematic diagram of a system of parallelized reactors; and

Figure 66:
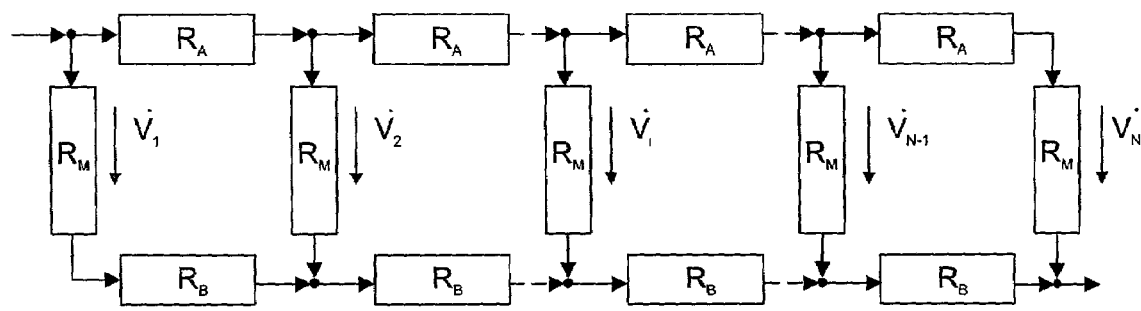

FIG. 66 is a schematic diagram of a network of electrical resistors, wired in parallel, illustrating the similarity between such a network and a system of parallelized reactors.

DESCRIPTION OF THE PREFERRED EMBODIMENT

Overview

The present invention relates to internal parallelization in stacked plate reactors employed to produce a chemical product. The term internal parallelization, as applied both to this disclosure and to the claims that follow, should be understood to mean simultaneously addressing a plurality of substantially identical micro-scale processing elements using only a single fluid inlet and a single fluid outlet for each fluid type (i.e., reactant, product, and heat transfer media). These processing elements can include micro-reactor units, fluid processing channels (i.e., channels utilized for thermal treatment and reactant mixing; but not fluid channels utilized for reactant distribution and product collection), heat exchangers and workup units. Workup units (i.e., post processing units) can be employed for quenching a reaction, purification of a product (such as by extraction, distillation, filtration, phase separation, crystallization, or adsorption), and/or for providing additional residence time to a reaction mixture before product collection.

One embodiment of the present invention is directed to an internally parallelized chemical reaction plant, that incorporates a plurality of reversibly joined reactor stacks. The reactor stacks in turn incorporate a plurality of irreversibly joined reaction units, each reaction unit being made up of a plurality of irreversibly joined simple plates. The individual simple plates include openings that when aligned form fluid channels enabling reactants bypass a first reaction plate to provide reactants to a subsequent reaction plate, enabling parallel processing of the reactants within a reaction unit. These reaction units represent a first type of internal parallelization. Some of the simple plates within a reaction unit include an array of openings that when aligned with adjacent simple plates form a plurality of parallel fluid channels, representing a second type of internal parallelization. It is anticipated that graphite seals can be beneficially employed in reversibly sealing reactor units together to produce a chemical plant.

A key feature of the present invention is the plurality of simple plates. For example, manner in which the openings in the simple plates are configured, oriented relative to other openings, and dimensioned, and the manner in which the simple plates are joined together are important aspects of the present invention. The openings in simple plates in accord with the present invention are configured and oriented to manipulate a flow of fluid in a reactor to achieve a desired result. Preferably the manipulation will result in an enhancement of a quantity or a quality of a chemical product produced in such a reactor. Additional product can be generated by a single simple plate by including on a single simple plate a plurality of openings that define internally parallelized reaction channels. Higher levels of product can be produced by including more such single simple plates (each of which define a plurality of reaction channels) into a stack of simple plates comprising a reaction unit. Multiple reaction units can then be joined together to achieve a reactor stack, capable of producing higher levels of product. Even higher levels of production can be achieved by adding additional reactor stacks together to achieve a chemical production plant. Note that regardless of the number of reactor stacks (or reactor units, or single plates defining a plurality of reaction channels) that are joined to produce a chemical plant (or reactor stack, or reaction unit), only a single separate fluid inlet is required for each reactant and each heat transfer media, and only a single separate fluid outlet is required for the product and for the spent heat transfer media.

It should be noted that to enable a chemical plant to scale production up or down by adding or removing reactor stacks, careful attention needs to be paid to the dimensions of the fluid paths defined by the openings in the simple plates making up each reaction unit. The sizes of the openings in each simple plate, particularly the openings enabling reactants and product to bypass the reaction and mixing channels of individual reactant units, must be large enough to support the volume of flow required in the largest anticipated chemical plant. Preferably, the sizes of the openings are selected to support a useful minimum and maximum throughput. It is anticipated that openings optimized for a flow rate of "X" will be useful for flow rates of 0.1X as well as 10X. Thus, "X" should be selected to support the anticipated minimum and maximum production rates.

In other embodiments explained in greater detail below, the dimensions of individual fluid channels within a reaction unit are manipulated to enable a product having a substantially different viscosity to be processed in parallel fluid channels with substantially equivalent residence time distributions.

Preferred Properties of Simple Plate Reactors

Unlike prior art stacked layer chemical reactors that require relatively complicated surface features, such as grooves or channels that do not penetrate the component to be formed into each layer, the simple plates employed in the present invention require that no more than an opening be formed through each plate. Machining or stamping openings into a flat plate is significantly less complicated and expensive than the silicon etching, injection molding, and ceramic molding/sintering processes described in the prior art for producing the surface features that the prior art stacked layer chemical reactors require to channel fluid flow. Yet the relatively simple technique of forming openings in a flat plate can be used to achieve a very useful chemical reactor if the openings are properly placed and the plates are properly configured and stacked so that the openings in the plates cooperate to convey fluids through the apparatus.

It should also be noted that while in one preferred embodiment the reactors of the present invention are microreactors, a non-microscale reactor could alternatively be used in conjunction with the present invention. Microreactors are generally characterized as incorporating fluidic structures of less than one (1) mm in size, especially with respect to reactant fluid pathways. Thus, it should be understood that the present invention is not limited only to stacked plate reactors in which fluidic channels are less than one (1) mm in size, as stacked plate reactors in accord with the present invention can incorporate fluidic structures that are larger in size than the microscale fluidic structures generally associated with microreactors. While stacked plate reactors having fluidic channels significantly larger than one (1) mm in size can be fabricated, it should be noted that fluid channels approaching microreactor scale in size generally have favorable fluid flow, heat transfer, and pressure drop characteristics that make microscale fluidic channels an attractive choice. Accordingly, at least one preferred embodiment of the present invention includes fluidic channels that range from 0.1–10 mm in size.

In the following description and the claims that follow, it will be understood that the term "simple plate" means a plate that has substantially planar opposed surfaces; e.g., a flat sheet of material. The simple plates used in the embodiments of the present invention disclosed herein are all generally rectangular and are characterized by having one or more openings that pass completely through the simple plate. Thus, the term "simple plate" as used herein and in the claims should be understood to mean a plate that does not include any etchings, grooves, or channels that do not completely penetrate the plate.

The term "groove," as used herein, should be understood to mean a surface feature that has been formed into the surface of an object, that does not penetrate completely through the object, and applies to components of prior art chemical reactors. The term "crystalline wafer," as used herein and in the claims that follow, means a material that has a crystalline structure and has been sliced into wafer-like components. Silicon and germanium are examples of materials employed for producing such crystalline wafers; however, it is not necessary for the material to be a semiconductor to comprise a crystalline wafer. Also, it is not necessary for the material to be a single element such as silicon or germanium, but rather such a material can be a mixture of several elements that together form a material that can be fabricated into crystalline wafers. The fabrication techniques commonly used in the semiconductor industry to form substrate wafers can be employed to produce crystalline wafers.

The term "processing volume" as used herein, should be understood to mean a volume in which a process is facilitated. Preferably, the process will be the mixing and reacting of two chemical reactants to form a chemical product. However, other potential processes include the moderation of the temperature of a fluid flowing through the processing volume.

In a preferred embodiment, the simple plates are formed of a high quality stainless steel, and standard metal working techniques such as stamping and/or milling are used to fabricate the simple plates. It should be understood that a variety of other materials and techniques could be used to fabricate simple plates. Metals other than stainless steel can alternatively be used, as well as other materials such as glass, plastic, or a combination of these materials. Crystalline wafers are another alternative material from which the simple plates can be formed. The material chosen to fabricate the simple plates will determine the fabrication techniques that are employed. For example, if the simple plates are made of plastic, injection molding can be used to form the simple plates.

The material used to fabricate the plates must be considered in light of the chemical properties of the reactants used in a particular reaction. Stainless steel is a relatively chemically inert material and is an appropriate material for many chemical reactants. Titanium, tantalum, silver, and their alloys are also expected to be useful. Hydrofluoric acid is a chemical that is extremely corrosive to metals and glass. Special plastic materials are appropriate when the desired reaction involves hydrofluoric acid. Those of ordinary skill in the art of chemical processing will readily understand how the choice of reactants necessitates an appropriate material be selected for fabricating the simple plates of the reactor.

The preferred embodiments of the present invention, as described below, represent designs that have been optimized for a liquid/liquid phase reaction involving two reactants. It should be understood that the underlying concept of the present invention (i.e., a reactor having desirable fluid flow characteristics, formed of a stack of plates incorporating only openings) could be applied to many other types of reactions such as liquid/gas, gas/gas, liquid/solid, and gas/solid. As will be described in detail below, the preferred embodiments include multiple heat exchangers, a heat transfer media pathway, two reactant fluid pathways, and a product fluid pathway. However, it should be understood that similar stacked plate reactors can be easily designed to include more or fewer heat exchangers, more or fewer heat transfer media pathways, and more reactant pathways.

Note also that the disclosed preferred reactors have been optimized for processing two component liquid/liquid reactions that generally require only temperature control. However, it should be understood that other types of reactions, requiring additional processing controls, can be processed in a stacked simple plate reactor in accord with the present invention, if the reactor is optimized for that control parameter. For example, reactors can readily be designed to incorporate magnetic, piezoresistive, piezoelectric, shape memory, radioactive, catalytic, and electrostatic control elements/parameters.

A plurality of stacked simple plates enable a reactor to be constructed that performs one or more of the following functions: reactant conditioning, control of reactant supply, thermal pretreatment, combination and mixing of reactants under controlled thermal conditions, intermediate thermal treatment, post-procedural isothermal containment, post-procedural thermal treatment of reactant products, product separation, internal parallelization of additional reaction units, and fluid flow enhancement. Preferred simple plates are designed and fabricated such that the dimensional and positional characteristics of the reactant fluid passages formed by the interconnected openings of the simple plates enable a stacked laminar flow of the reactants in mixing and reactant channels. Such a stacked laminar flow ensures that a particularly efficient type of mixing, referred to as diffusion mixing, can occur.

The quality of the interconnections between the simple plates is of great importance, since the interconnections must be free of gaseous and liquid leakage. This requirement is achieved through a combination of specially prepared surfaces and use of simple plates that are fabricated to close tolerances. The individual simple plates can be assembled by pressure fitting (using clamps or a housing that encloses the simple plates and applies a compressive force to the outer plates), or individual simple plates can be permanently assembled using diffusion welding, vacuum soldering, or other suitable techniques for joining the simple plates.

The pressure fitting technique has the advantage of enabling a reactor to be built using specific simple plates that can readily be disassembled so that the reactor design can be changed by adding or removing simple plates. In this manner, the same simple plates can be used in more than one reactor to effect different chemical processes. However, if the simple plates are assembled using pressure fitting, very good control of the surface finishes is required to avoid scratches on the surface of the simple plates, and ensure that a mean surface roughness less than one (1) μm is achieved. The pressure that should be applied to maintain a stack of simple plates that have been fabricated from a metal in sufficient compression to prevent gas or liquid leakage is preferably several hundred Newtons/mm$^2$. Alternatively, gaskets can be used in the case of lower surface quality.

Successful diffusion welding to join metallic simple plates also requires a substantially scratch free surface, although the acceptable mean surface roughness can be increased up to about 5 μm. In diffusion welding, the simple plates are pressed together and heated to about 1000° C. in a vacuum or inert atmosphere. At such temperatures, ions from each surface diffuse across the surface boundary layer, thus joining the surfaces.

Vacuum soldering is a technique that requires a mean surface roughness of less than 5 μm, although more scratches can be tolerated than in diffusion welding. The simple plates are first coated with a thin film (3–5 μm) of silver either by sputtering, vapor deposition, or electrical deposition. Other metallic films, such as gold or copper, can also be used. The simple plates are then heated in a vacuum to about 900° C. The silver liquefies, filling any voids due to scratches or surface irregularities, and bonds the simple plates together to form a reactor.

It should be noted that when the reactor is assembled using diffusion welding or vacuum soldering, a superior bond can be obtained by minimizing the surface area that is to be bonded. Thus, simple plates that incorporate one or more openings occupying a significant portion of the surface area of the simple plates can be more efficiently bonded with either of these two techniques than simple plates with few or small openings that comprise only a small portion of their total area.

It has been empirically determined that limiting openings to a maximum of 2 mm in width enhances the bonding process. In at least one embodiment, a majority of the openings in the simple plates comprising a reactor are approximately 2 mm or less in width.

Preferably, any stacked simple plate reactor should have the ability to maintain a desired narrow temperature range within the reactor so that reaction kinetics can be closely controlled. In a preferred embodiment, the reactant and heat transfer media enter the stacked simple plate reactor via vertically oriented fluidic channels. Reacted products and spent heat transfer media exit the reactor via similarly disposed vertically oriented fluidic channels. The chemical processing operations occur in horizontally disposed channels within the reactor. It should be noted that the use of the term "channel," when used herein in conjunction with a stacked simple plate reactor, should not be construed to mean a groove formed into the surface of (but not extending through) a single simple plate. While each individual simple plate only has openings and no grooves, channels or other fluid pathways are easily obtained in a stacked simple plate reactor. To form a channel, an elongate opening is formed in one simple plate that is sandwiched between two other simple plates that do not have any aligned corresponding elongate opening. The top of the channel is defined by the lower surface of the upper simple plate, the sides of the channel are defined by the sides of the opening formed in the middle simple plate, and the bottom of the channel is defined by the upper surface of the bottom simple plate. Thus, the depth of the channel is substantially equal to the thickness of the middle simple plate. Fluid pathways between adjacent simple plates within a stacked simple plate reactor are created when openings through the stacked simple plates are aligned.

To achieve precise control of the desired reactions, the stacked simple plate reactor preferably includes a control circuit with several temperature sensors, as well as flow controls for a heat transfer medium that is circulated through the reactor. The sensors may be disposed outside of the stacked simple plate reactor, but are preferably disposed either within the stacked simple plate reactor, or in the reactor housing, if such housing is provided. Note that if the simple plates are permanently joined or clamps are used to compress the simple plates together in a stack, then a reactor housing is not required. The control circuit may similarly be mounted externally, or disposed within the stacked simple plate reactor, or within the reactor housing (if such a housing is provided).

The fluidic system of the stacked simple plate reactor is preferably characterized by having excellent flow equipartition across the entire system. Furthermore, potential clogging problems are minimized by having few constrictions within the reactor, by introducing as few sharp directional flow changes as possible, by maintaining a small inner volume (about 1 ml unless internal parallelization is desired, in which case additional volume is required to meet a desired production volume), and by enabling rapid diffusion mixing in the mixing portion of the reactor. Preferably, fluidic channel dimensions range from about 100 µm to about 500 µm, especially with respect to reactant fluid pathways (the dimensions of any heat transfer media pathways are less critical, although the majority of openings should be approximately 2 mm or less, as noted above), and the walls separating the heat transfer medium from the reactants or product should be of similar scale, to enable rapid heat transfer. As discussed above, a number of different materials can be used to fabricate a stacked simple plate reactor; however, simple plates that are adjacent to openings in those simple plates comprising heat exchangers are preferably fabricated from a material that has good thermal conductivity. However, if the dimensional thickness of each plate adjacent to a heat exchanger is small (e.g., on the order of about 0.3 mm), the effect of the thermal conductivity of different materials is negligible.

In general, the opening in a simple plate of a stacked simple plate reactor can correspond to a portion of a fluid pathway formed by stacking a plurality of simple plates such that openings in the simple plates above and below overlap, thereby allowing fluids to move through the reactor between the simple plates. Openings may also be employed as receptacles for sensors, particularly temperature sensors. Preferably, to maximize heat transfer efficiency, the directions of fluid flow of the heat transfer medium within openings defining a heat exchanger are opposite to the direction of reactant flow.

Internal Parallelization between a Plurality of Stacked Plates

For increasing the quantity of a chemical to be produced by using microreactors, external parallelization is a known technique in the art. Externally parallelized reactors utilize external fluid lines to connect a plurality of individual reactors. To achieve flow equipartition in externally parallelized systems, manifolds, valves and control devices are required, in an active network unless a bifurcational approach is employed (a passive network). Such bifurcation suffers from a major disadvantage—scaling must be effected in multiples of two (2=>2, 4, 8, 16, 32, etc.).

A key concept of the present invention is an internally parallelized chemical production plant, capable of producing significant amounts of a chemical product as compared to a microreactor consisting of reaction channels defined by a single plate. In accord with the present invention, chemical plant 1 of FIG. 1A comprises a plurality of reversibly connected reactor stacks 3. While three such reactor stacks are illustrated in FIG. 1A, it should be understood that either fewer or more stacks could be used in chemical plant 1 to control the production rate. It is anticipated that up to about 100 such stacks could be included in a single chemical plant. Note that even 100 reactor stacks would not occupy a very large volume, because the smallest unit, a single simple plate, is generally less than one square foot in size. A single fluidic system 2a is employed to provide reactants (and heat transfer media if required) and to collect product from chemical plant 1. Chemical plant 1 requires at least one solid bottom plate 2c for sealing the chemical plant, as well as a top plate 2b (with appropriate openings for fluidic system 2a).

FIG. 1B is an enlarged view of one of the plurality of identical reactor stacks 3 that comprise chemical plant 1. Each reactor stack 3 itself comprises a plurality of internally parallelized, irreversibly bonded reaction units 5. While FIG. 1B shows only four reaction units 5, it should be understood that considerably more reaction units or fewer could be joined to form a reactor stack. It is anticipated that up to about 10 reaction units can be beneficially joined to provide a reactor stack. It must be noted that 10 reaction units per reactor stack does not necessarily represent a maximum necessitated by a technology limitation. That number relates to what is considered to be a reasonable cost per each reactor stack. It is anticipated that up to 100 reactor stacks can be reversibly joined to produce a chemical plant. Because the individual reaction units comprising a reactor stack are irreversibly joined, should a leak or blockage occur within any of the simple plates comprising the reaction units and reactor stacks, then the entire reactor stack would need to be replaced. If each reactor stack included 100 reaction units, and only one reaction unit leaked, 99 other reaction units would need to be discarded to replace the corresponding defective reactor stack. It is expected that up to about 10 reaction units per reactor stack represents a reasonable balance between convenience and economy. Each reactor stack is internally parallelized, in that each reactor stack simultaneously addresses a plurality of substantially identical micro-scale processing elements (i.e., reaction units) using only a single separate fluid inlet and a single separate fluid outlet for each fluid type (i.e., for each different reactant, product, and heat transfer media). At a certain point, irreversibly joining a larger number of reaction units into a reactor stack is technically challenging.

FIG. 1C is an exploded view of one of the plurality of reaction units 5 that comprise each reactor stack 3. Each reaction unit 5 comprises a plurality of simple plates 7a–7j that are irreversibly bonded together. While FIG. 1C illustrates 10 different simple plates per each reaction unit, it should be understood that more (or fewer) simple plates could be used to fabricate each reaction unit. One embodiment of a reactor stack comprising two reaction units is described in more detail below.

While each reaction unit comprises a plurality of individual simple plates, each simple plate is not identical. Generally speaking, each reaction unit is required to perform more than one process to facilitate a chemical reaction used to produce a desired product. Individual reactants need to be properly distributed in the reaction unit, and in most cases heat transfer media must be routed through the reaction unit to thermally condition the reactants and/or the product. These processes are enabled by the use of simple plates having different configurations. For each reaction unit, the desired chemical reaction substantially occurs in openings defined on a single simple plate. Each reaction unit is internally parallelized, in that each reaction unit includes means simultaneously addressing a plurality of substantially identical micro-scale processing elements using only a single separate fluid inlet and a single separate fluid outlet for each fluid type (i.e., each reactant, product, and heat transfer media). The plurality of substantially identical micro-scale processing elements is a set of reaction fluid channels defined by openings in one of the simple plates of the reactor stack. FIG. 1D illustrates an enlarged view of a simple plate 7h, which has a plurality of openings, including a parallel array of openings 9 that define reaction channels in which reactants are mixed to generate the desired chemical product.

Because multiple reaction units are joined together, reactants, product and heat transfer media must be able to flow from one reaction unit to another. Each reaction unit must therefore include a bypass that enables reactants to pass, unmixed, from one reaction unit to a subsequent reaction unit. While product and heat transfer media can mix as they pass from one reaction unit to a next, the reactants cannot be mixed together until they are in the reaction channels designed to facilitate the desired chemical reaction. Thus, each simple plate in the reaction unit must include openings that define a bypass for each reactant. These bypass openings are discussed in greater detail below.

Bonding between the various elements in a chemical plant is quite important. Leaks can allow contaminants to enter, product to be lost, and the idealized equipartition of fluid flow within the chemical plant to be disrupted. Under ideal circumstances, from a leak prevention standpoint, all components would be irreversibly bonded together, but such a configuration is not practical. For example, if each reaction unit is fabricated from 10 simple plates, 10 reaction units are joined to generate a reactor stack, and 100 reactor stacks are joined together to produce a chemical plant, that chemical plant will include 10,000 simple plates. If a leak occurs in any one of those approximately 10,000 joints between adjacent simple plates, the performance of the chemical plant will be compromised. Not only is it uneconomical to replace a 10,000 plate chemical plant because one or more joints leak, it is also very difficult to irreversibly join that many plates together at one time. The component architecture of a chemical plant in accord with the present invention (reaction units and reactor stacks) enables irreversible bonds to be produced in smaller lots. First, a plurality of identical reaction units are prepared, each including a relatively small number (e.g., 2–20) of simple plates that are irreversibly joined together. Then, a relatively small number (e.g., 2–10) of reaction units are irreversibly joined to generate a reactor stack. Finally, as many reactor stacks as desired are reversibly joined to produce a chemical plant. Each reactor stack comprises irreversibly joined elements. Should a leak in the chemical plant occur, the chemical plant can readily be disassembled, and the faulty reactor stack replaced; the entire chemical plant need not be replaced.

The main advantages of such an internally parallelized chemical plant (and of each internally parallelized reactor stack, and each internally parallelized reaction unit) are summarized as follows:

Parallelization is achieved with no additional external fluidic periphery. Only one fluid line is required for each reactant, the product, and any heat transfer media, thereby saving a significant amount of space.

Desirable equipartition of flow can be achieved without requiring valves, measurement devices and/or engineering controls. Such equipartition of flow is achieved by the design of the openings in the simple plates comprising each reaction unit. The dimensions of the reactant supply channels and the product withdrawal channel are preferably much larger compared to the dimensions of the distribution, mixing, reaction and collection channels in which the desired product is produced. Thus, the flow resistance in the mixing and reaction channels is negligible.

Even should an individual reaction unit experience a blockage, equipartition of flow in the reactor stack (and chemical plant) is substantially maintained, since all other reaction units are affected in the same way.

Compared to externally parallelized reactors, the number of plates necessary to form a reaction unit is reduced, because no reaction unit (or reactor stack) needs either a top plate or a bottom plate, since the only top and bottom plates needed are those utilized for the chemical plant top and bottom plates, whereas each externally parallelized reactor requires separate top and bottom plates.

Reversibly fixed reactor stacks provide flexibility, enabling a chemical plant to be readily scaled up or down and enabling simple replacement of leaking or damaged reactor stacks.

Exemplary Chemical Plant

FIGS. 2–28B relate to an embodiment of a stacked simple plate reactor that is specifically adapted to enable n-fold internal parallelization to be achieved simply by adding additional sets of simple plates to the stacked plate reactor. The chemical plant described in detail below is much smaller than the maximum size that chemical plants configured in accord with the present invention can be. Also, this chemical plant includes only a single reactor stack, which itself includes only two reaction units. As discussed above, production can be significantly increased by adding additional reaction units to the reactor stack, as well as by adding additional identical reactor stacks.

As noted above, a single microreactor can produce only a limited volume of product, and adding additional external microreactor units in parallel to increase production requirements also requires adding additional systems for reactant supply, heat transfer media supply, and product collection. The additional systems not only increase the complexity and footprint requirements of the overall system, but even minor differences in feed rates for some of the duplicate reactor modules can adversely effect product quality. In contrast, by carefully orienting the positions of openings in adjacent simple plates of the present invention, a single set of reactant inlets, a single heat transfer media inlet, a single heat transfer media outlet, and a single product outlet can be used to service multiple sequentially stacked reaction units.

It should be noted that the microreactor illustrated in the aforementioned commonly assigned copending parent U.S. patent application Ser. No. 09/496,999, filed Feb. 3, 2000, entitled MINIATURIZED REACTION APPARATUS, is not adaptable to n-fold internal parallelization, because of the configurations of the opening of the simple plates, and the fluid paths formed in the illustrated microreactor. For example, to enable n-fold internal parallelization to be achieved, a flow of reactants must be able to continue uninterrupted through each individual reaction unit (i.e., a set of stacked simple plates that defines a single one of the n-fold reactors). Reactants must be allowed to flow into a first reaction unit to be mixed and reacted, and reactants must also be allowed to flow beyond that first reaction unit, to be mixed and reacted in subsequent reaction units. Thus each reaction unit must incorporate two fluid paths for each reactant; one fluid path that actually flows into the mixing and reaction portions of the instant (current) reaction unit, and one fluid path that bypasses the processing portions of the instant reaction unit to provide a flow of non-reacted reactants to a next reaction unit.

The openings in the simple plate reactor illustrated in the above referenced parent application do not allow a flow of reactant to bypass the mixing and reaction channels, thus a supply of reactant would not be available to any additional reaction units. The geometry and configuration of the openings in the simple plates of the parent application are such that such a bypass fluid path could not be incorporated into the microreactor disclosed therein. Furthermore, the heat exchangers described and illustrated in the parent application are also not adaptable to n-fold parallelization. In the parent application, two different fluid paths exist for heat transfer media, such that a first heat transfer medium is used to thermally condition the reactants before they combine, and a second heat transfer medium is used to thermally condition the mixing reactants and product. The geometry and configuration of the openings in the simple plates of the parent application are such that the heat transfer fluid could only be used to thermally condition the reactants before they entered a reaction unit, as opposed to thermally conditioning the reactants before they are combined in each reaction unit. Such a configuration cannot provide as much control over the temperatures of the reactants before they combine to form a product, as the present invention.

Figure 2:
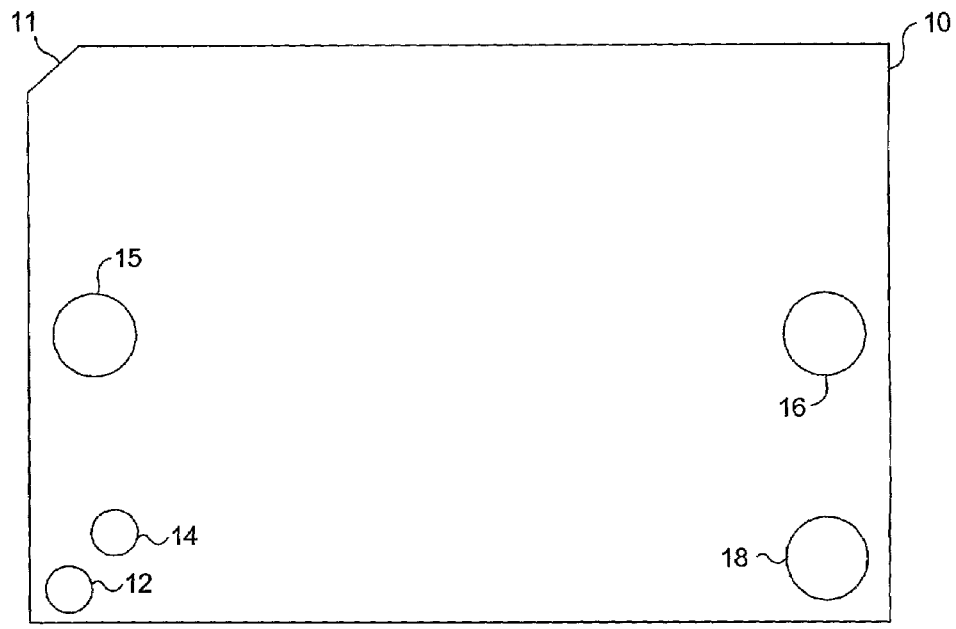
FIG. 2 is a plan view of a top simple plate of a preferred embodiment for an internally paralleled chemical reactor in accord with the present invention, including openings for reactants, heat transfer media inlets and outlets, and a product outlet.
Figure 24:
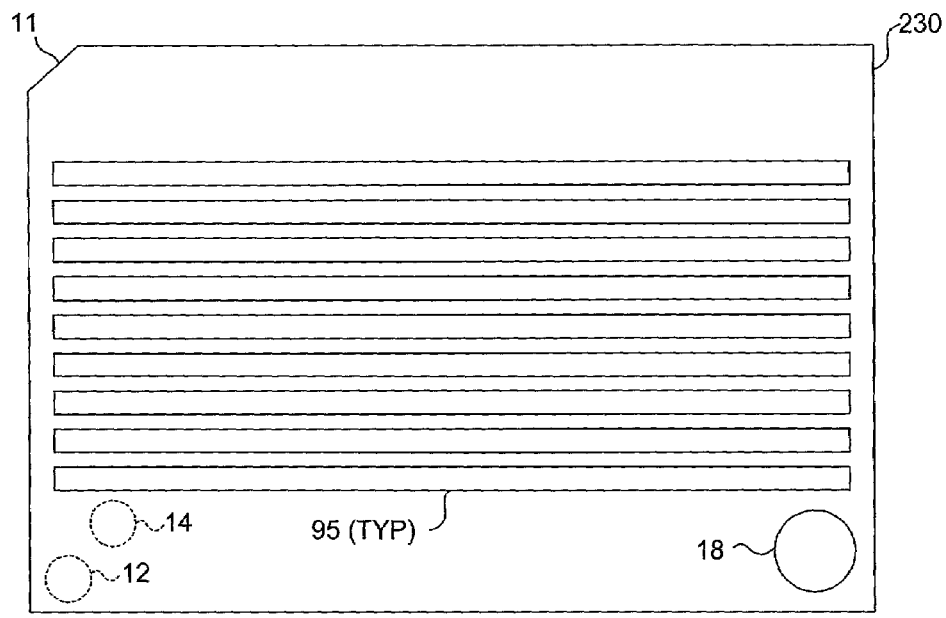
FIG. 24 is a plan view of the twenty-third simple plate of the preferred internally paralleled reactor illustrating a plugged first reactant opening, a plugged second reactant opening, a fifth heat exchanger, and a product opening.
Figure 25:
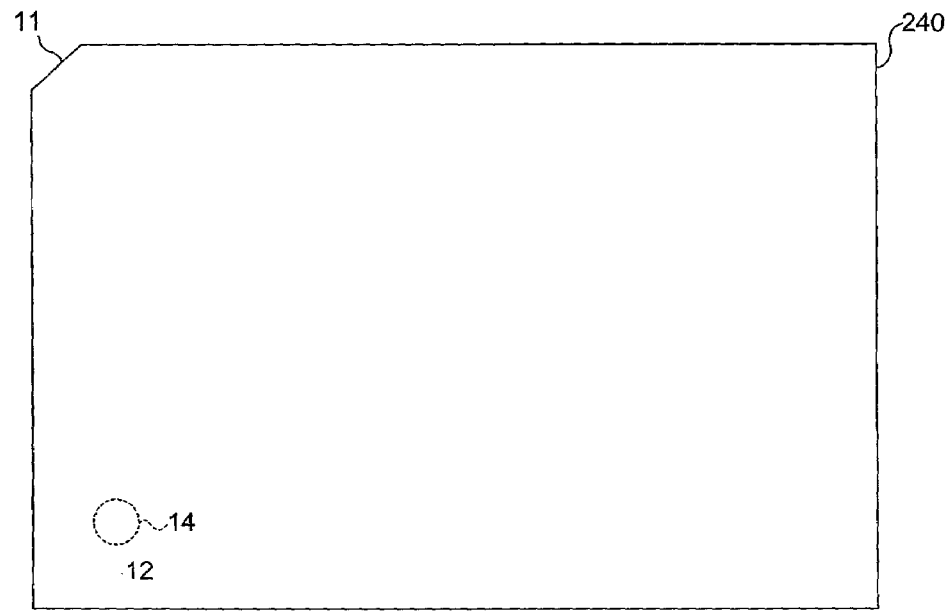
FIG. 25 is a plan view of the twenty-fourth and bottom simple plate of the preferred internally paralleled reactor, illustrating first and second reactant openings into which plugs can be inserted.

Referring now to FIGS. 2–28B, a 2-fold internally parallelized chemical plant is shown that incorporates a single reactor stack comprising two reaction units. FIGS. 2–25 illustrate layers 1–24, corresponding to simple plates 10–240, with FIG. 2 showing top simple plate 10, and FIG. 25 illustrating bottom simple plate 240. The illustrated chemical plant includes these 24 simple plates, stacked one on top of another, in 24 layers. Note that the number of simple plates is a function of the number of parallel reaction units desired. If more product is desired, then the chemical plant will include additional simple plates, arranged as duplicate reaction units and/or as duplicate reactor stacks. As will be described in more detail below, each reaction unit in this example comprises 10 simple plates, with an additional simple plate added to the chemical plant immediately adjacent to the last reaction unit, to provide an additional heat exchanger so that mixing and reaction channels in the last reaction unit can be sandwiched between heat exchangers. Also, the reaction unit design described below requires a distributor plate to be included immediately adjacent to the top or bottom plate where the reactant fluids first enter the chemical plant, to ensure that the fluids are properly distributed into each reactor stack. Thus, for a chemical plant having 4-fold internal parallelization, 44 simple plates (having the required configurations) would be required (including 40 plates for 4-fold parallelization, a top plate, a distributor plate, a final heat exchanger plate, and a bottom plate). A reactor stack included in a chemical plant does not need the top plate, the distributor plate, the final heat exchanger plate or the bottom plate, so that a reactor stack having 10-fold internal parallelization would require 100 simple plates (arranged in groups of 10 reaction units).

Figure 3:
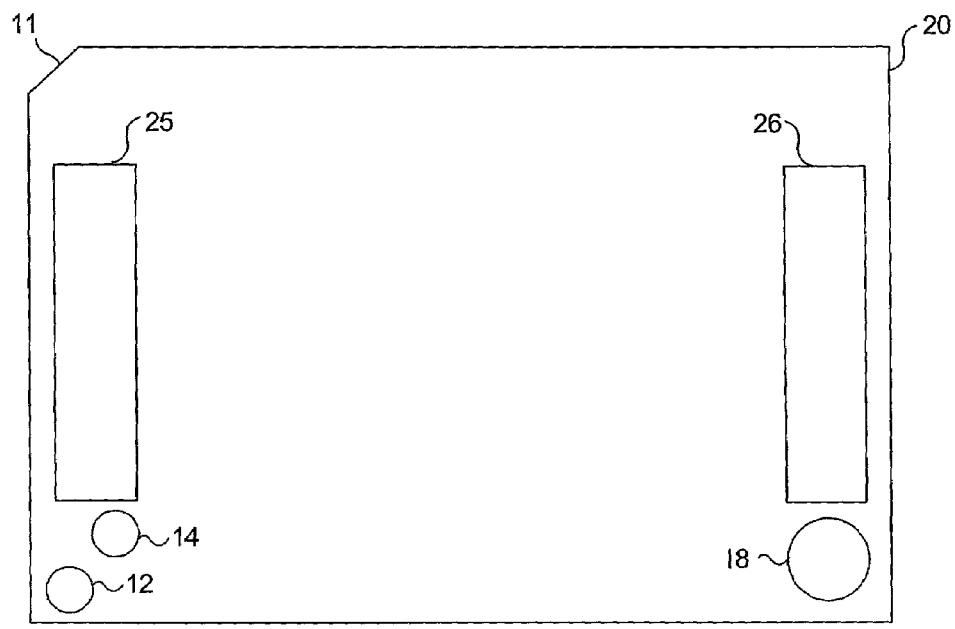
FIG. 3 is a plan view of the second simple plate of the preferred internally paralleled reactor showing a first reactant opening, a second reactant opening, two heat exchanger manifold openings, and a product opening.
Figure 26:
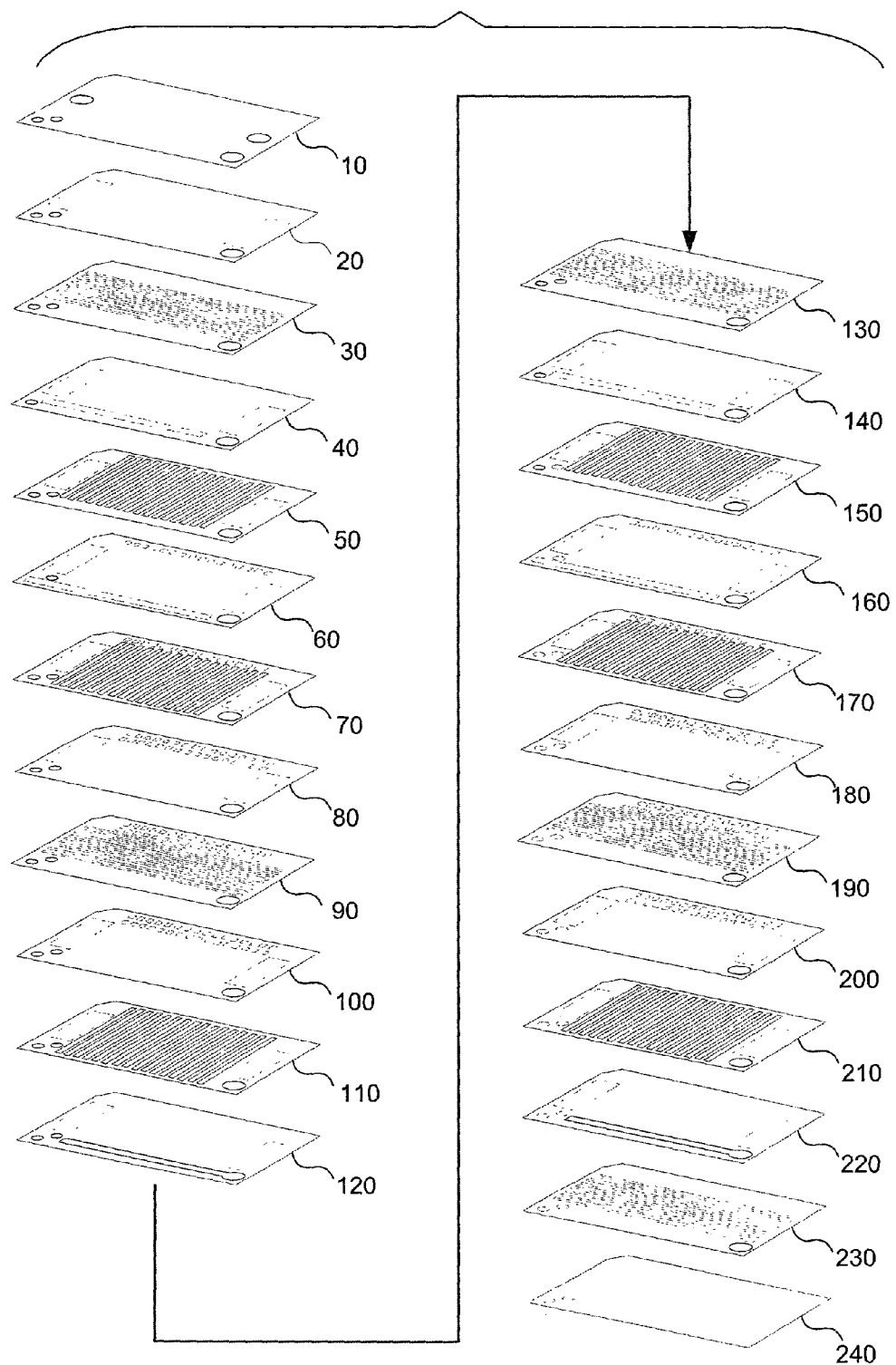
FIG. 26 is an exploded isometric view of a preferred embodiment of the internally paralleled reactor illustrating how all twenty-four simple plates are stacked.
Figure 27A:
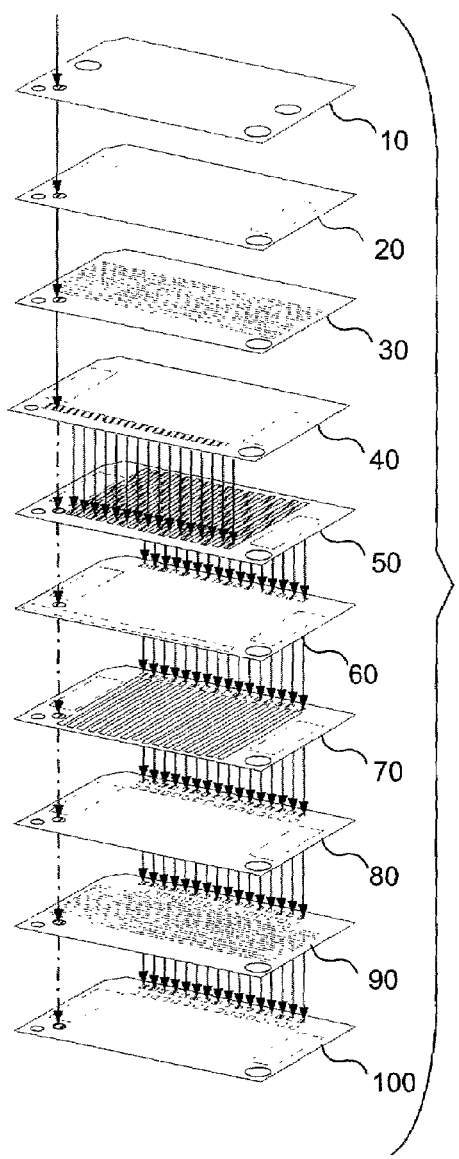
FIG. 27A is an exploded isometric view of the first ten simple plates of the internally paralleled reactor of FIG. 26, illustrating a fluid path for a first reactant.
Figure 27B:
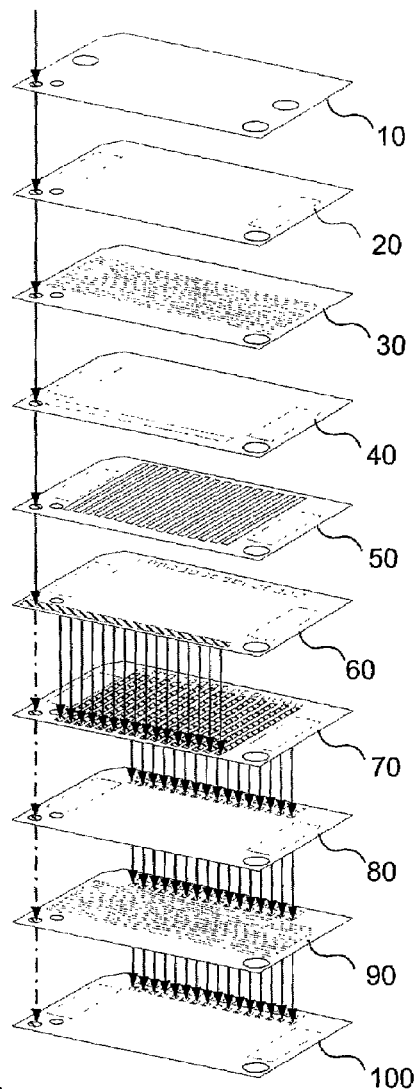
FIG. 27B is an exploded isometric view of the first ten simple plates of the internally paralleled reactor of FIG. 26, illustrating a fluid path of a second reactant.
Figure 27C:
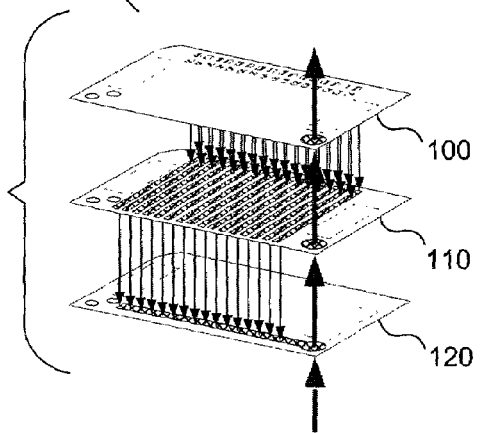
FIG. 27C is an exploded isometric view of simple plates ten through twelve of the internally paralleled reactor of FIG. 26, illustrating the combined fluid paths of the first and second reactants as they are mixed in a plurality of first reactor fluid channels, and then collected via a product collector.
Figure 28A:
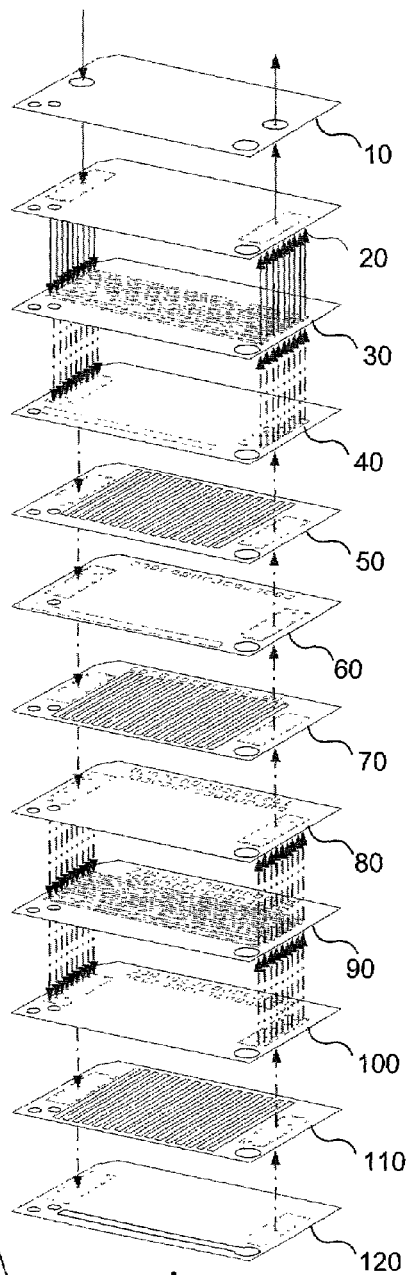
FIG. 28A is an exploded isometric view of the twenty-four simple plates of the internally paralleled reactor of FIG. 26, illustrating a fluid path for heat transfer media servicing the five heat exchangers.
Figure 28A:
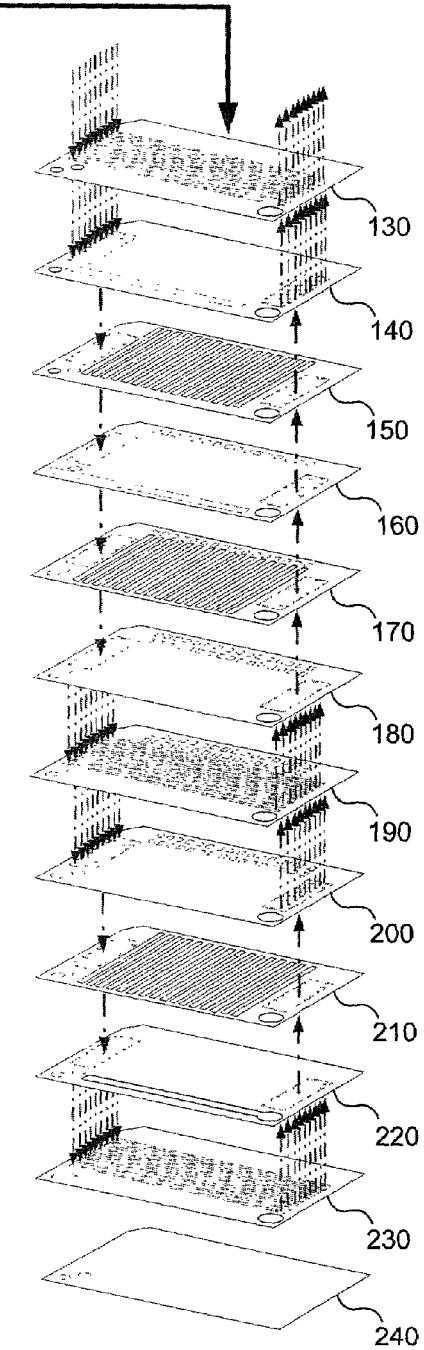

With respect to FIGS. 2–25, the figure number minus one indicates the layer or corresponding simple plate of the reactor. Thus, FIG. 2 represents the first layer; FIG. 3 represents the second layer, etc. FIG. 26 shows the orientation of the 24 simple plates stacked one on top of another to form the 2-fold internally parallelized chemical plant. FIGS. 27A–27C show the reactant fluid paths (for reactants A and B) through the first reaction unit of the 2-fold internally parallelized chemical plant. FIG. 28A illustrates the fluid paths of a heat transfer medium to each heat exchanger within the 2-fold internally parallelized chemical plant.

With reference to FIG. 2, a preferred shape for the simple plates is generally rectangular, although other shapes, such as circular disks, can also be used. It should be noted that all plates preferably include a chamfered corner to aid in the stacking of the plates in the proper orientation relative to each other. If one plate were oriented in the wrong direction, it is likely that at least one, if not all, of the fluid paths through the reactor would be blocked, disrupted, or improperly joined and the reactor might not function properly. Thus, top plate 10 has a chamfer 11 disposed in the upper left-hand corner. It is not relevant at which corner the chamfer is disposed, as long as all of the chamfers on all of the stacked simple plates are disposed in the same relative position to ensure that in the assembled reactor, continuous fluid paths for reactants and heat transfer media are provided. It is contemplated that a different type of indexing feature, such as a slot or other mark or shape variation consistently represented on each simple plate, could be used as an alignment reference instead of the chamfer. The chamfered corner is preferred, as it is a feature easily incorporated into a simple plate, and chamfer is already recognized as an alignment indicator, and widely used in the semiconductor industry on silicon wafers. It is further anticipated that the chamfer or indexing mark could be varied to denote the position of a specific simple plate relative to other simple plates in a reaction unit. For example, progressively larger chamfers could be used for upper simple plates, relative to a simple plate designated as a bottom plate in a reaction unit. Thus, the bottom simple plate might have the largest chamfer, and the simple plate having the next largest chamfer would be stacked on the bottom plate, and so on, until all the simple plates defining a single reaction unit were stacked in proper order.

In addition to chamfer 11, top simple plate 10 incorporates a plurality of openings for heat transfer media, reactants, and product. Two reactant inlet ports are also provided, an opening defining an inlet port 14 for a Reactant A, and an opening 12 defining an inlet port for a Reactant B. Top simple plate 10 incorporates one heat transfer media inlet 15 and one heat transfer media outlet 16. A product opening 18 is also provided. While not shown, it is anticipated that an additional opening for a temperature sensor can be beneficially incorporated into top simple plate 10 (as well as into subsequent simple plates), which when aligned with corresponding temperature sensor openings in other simple plates, forms a temperature sensor cavity within the reactor in which a temperature sensor can be disposed. Note that top simple plate 10 is not part of a reaction unit or reactor stack as defined relative to FIGS. 1A–1C, but is part of the overall chemical plant.

It should be noted that all the reactants and heat transfer media required to service each of the n-fold reaction units and all products subsequently produced pass through the respective openings in top simple plate 10. This configuration enables a single fluid supply system (for the reactants, the heat transfer media, and product collection) to service the n-fold reaction units and is in contrast to externally parallel reaction units, in which each additional reaction unit requires its own fluid supply system. Multiple fluid supply systems increase costs, space requirements, and present more complicated process control issues. Note that the n-fold parallelization stacked plate reactor of the present invention occupies the same "footprint," regardless of the number of additional reaction units added. The reactor stack will grow in height, while still occupying the same amount of floor space, or bench top space. In such a vertical stack, it does not matter if the fluid is introduced into the top or bottom of the stack.

FIG. 3 illustrates the second layer of the preferred reactor, showing a second simple plate 20. As described above, second simple plate 20 also includes chamfer 11, which if desired can vary in size to indicate the sequence of layers. Openings corresponding to every opening in top simple plate 10 are also provided in simple plate 20; however, the openings for heat transfer medium flow are shaped differently. A heat transfer medium enters the reactor from inlet 15 in simple plate 10; passes through second simple plate 20 via a heat transfer medium A intake manifold opening 25. After progressing through subsequent simple plates of the preferred reactor, the "spent" heat transfer medium again passes through simple plate 20, this time via a heat transfer medium exhaust manifold opening 26. From that point, the heat transfer medium exits the preferred reactor via outlet 16 in top simple plate 10.

Reactants A and B pass through second simple plate 20 via Reactant A opening 14 and Reactant B opening 12. These same reference numbers have been applied to simple plates 10 and 20 (as well as all subsequent plates), where the size, shape and position of the openings are unchanged. Second simple plate 20 also includes product opening 18. Simple plate 20 is not part of a reaction unit or reactor stack as defined relative to FIGS. 1A–1C, but is part of the overall chemical plant and is disposed immediately adjacent to the first reaction unit of first reactor stack to enable proper fluid distribution within each reaction unit.

Figure 4:
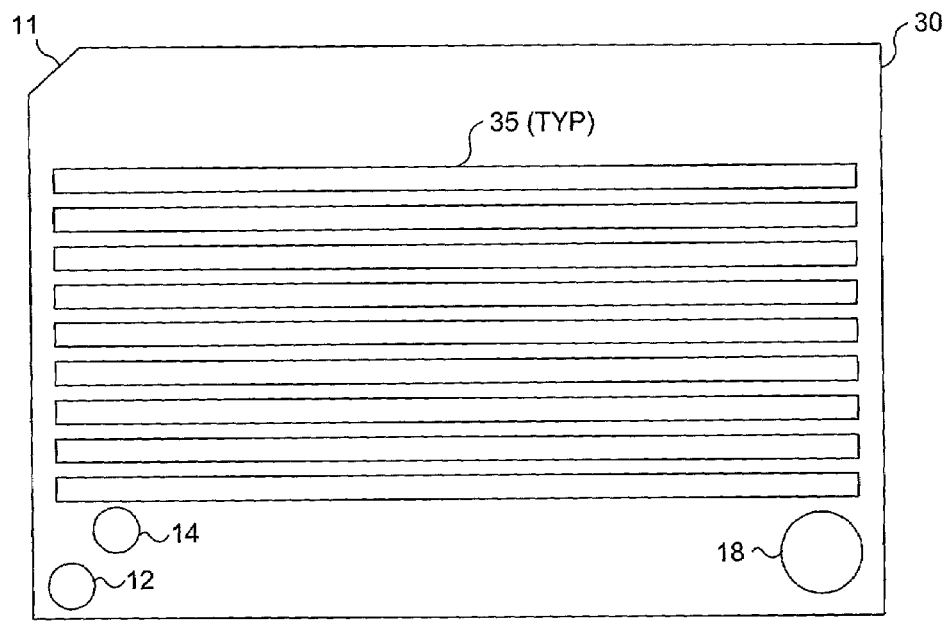
FIG. 4 is a plan view of the third simple plate of the preferred internally paralleled reactor illustrating a first reactant opening, a second reactant opening, a first heat exchanger, and a product opening.

FIG. 4 provides details of the passages in the third layer of the 2-fold internally parallelized chemical plant, and the first layer in the first reaction unit. A third simple plate 30 includes chamfer 11. Heat transfer medium flows through third simple plate 30 via a plurality of openings 35, which collectively comprise a first heat exchanger. As will become clearer with respect to FIG. 28, the first heat exchanger thermally conditions Reactant A, before Reactant A enters a first reaction unit. Note that different heat exchangers are employed to thermally condition volumes of Reactant A that enter reaction units downstream of the first reaction unit. It should also be noted that the heat transfer medium not only flows left to right through openings 35, but that a portion of the heat transfer medium continues to flow through subsequent simple plates, as portions of openings 35 overlap heat transfer medium openings in adjacent simple plates. As noted above, the fluid paths of heat transfer medium throughout the reactor are more fully described below in conjunction with FIG. 28.

It should be noted that the first reaction unit is defined by layers 3–12, representing simple plates 30–120. This relationship will become apparent as FIGS. 26–28B are discussed below. Reactants A and B pass through third simple plate 30 via Reactant A opening 14 and Reactant B opening 12, and product passes through third simple plate 30 via product opening 18.

Figure 5:
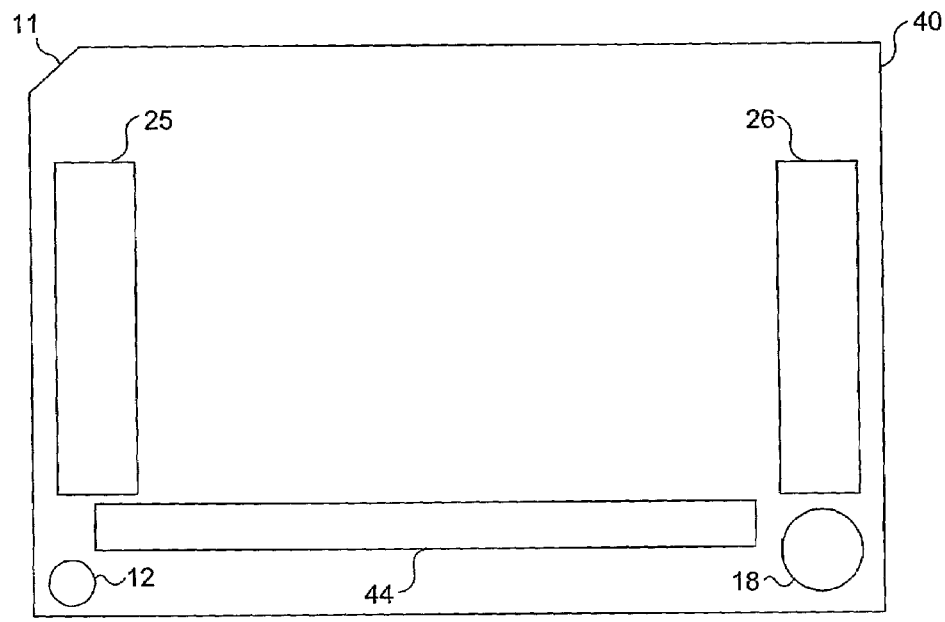
FIG. 5 is a plan view of the fourth simple plate of the preferred internally paralleled reactor illustrating a first reactant distributor, a second reactant opening, two heat exchanger manifold openings, and a product opening.

FIG. 5 provides details of the fourth layer of the 2-fold internally parallelized chemical plant, showing a fourth simple plate 40, which has chamfer 11, and which includes opening 44 that defines a manifold for Reactant A. Reactant B passes through fourth simple plate 40 via Reactant B opening 12, and product passes through fourth simple plate 40 via product opening 18. Heat transfer medium passes through fourth simple plate 40 via a heat transfer medium intake manifold opening 25. After progressing through subsequent simple plates of the preferred reactor, the "spent" heat transfer medium again passes through simple plate 40, this time via a heat transfer medium exhaust manifold opening 26.

Figure 6:
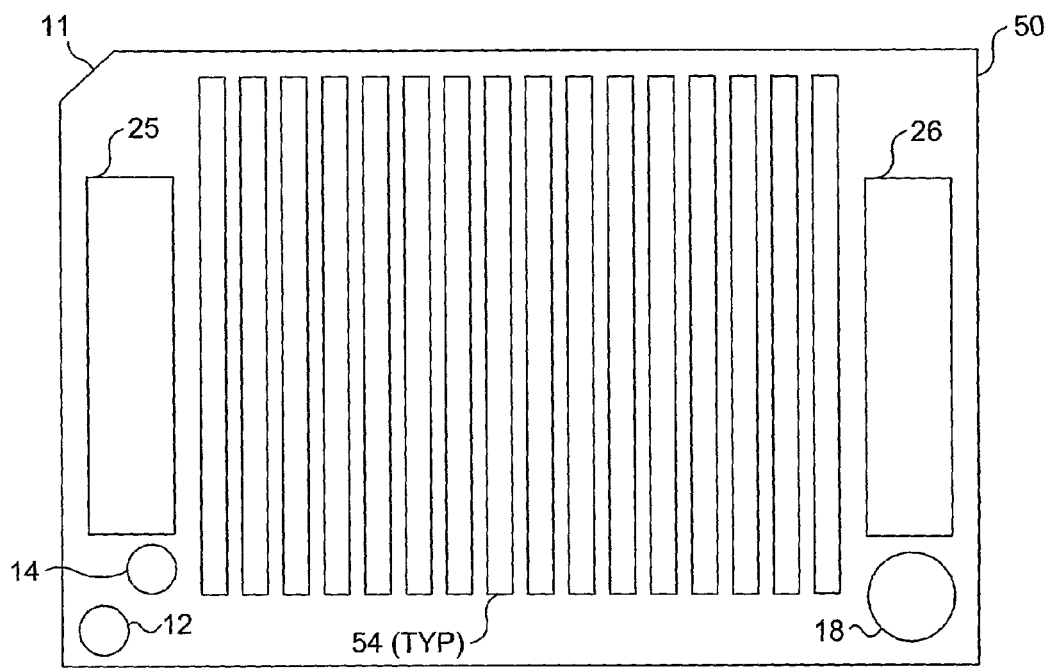
FIG. 6 is a plan view of the fifth simple plate of the preferred internally paralleled reactor illustrating a first reactant opening, a second reactant opening, a plurality of first reactant channels, two heat exchanger manifold openings, and a product opening.

In FIG. 6, a distributor for Reactant A is defined by a plurality of openings 54. Note that as Reactant A moves from the openings in simple plate 40 to the openings in simple plate 50, Reactant A is split into a plurality of different fluid streams. Not only does Reactant A flow through fluid channels defined by openings 54, but Reactant A also flows through opening 14. The portion of Reactant A flowing through the fluid channels defined by openings 54 services the first reaction unit (simple plates 30–130). The portion of Reactant A flowing through opening 14 of simple plate 50 bypasses the first reaction unit and is available to service subsequent reaction units. As will be apparent in the following figures, each simple plate 30–130 of the first reaction unit includes opening 14, thus forming a bypass fluid channel for Reactant A. A similar bypass channel for Reactant B, formed by a plurality of openings 12, is also created. Reactant B passes through fifth simple plate 50 via Reactant B opening 12. Fifth simple plate 50 also includes product opening 18, and heat transfer medium manifold openings 25 and 26.

Figure 7:
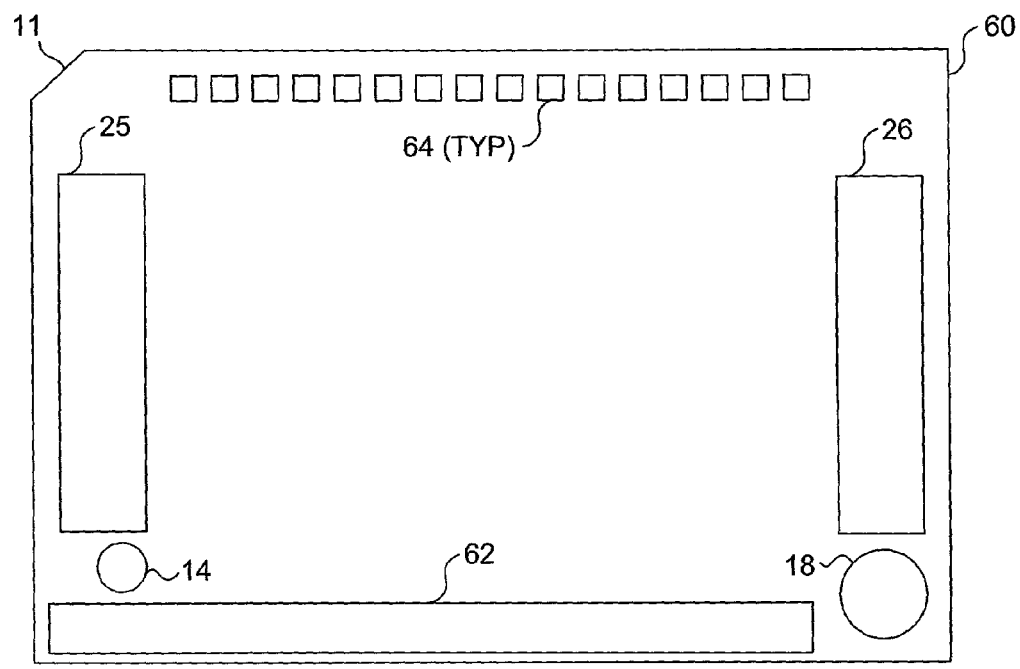
FIG. 7 is a plan view of the sixth simple plate of the preferred internally paralleled reactor illustrating a first reactant opening, a plurality of first reactant bores, a second reactant distributor, two heat exchanger manifold openings, and a product opening.

FIG. 7 provides details of the sixth layer of the 2-fold internally parallelized chemical plant, showing a sixth simple plate 60 which has chamfer 11, and which includes opening 62 that defines a manifold for Reactant B. Reactant A passes through sixth simple plate 60 via both Reactant A opening 14, and a plurality of Reactant A openings 64.

Note that Reactant A opening 14 ensures a supply of Reactant A for subsequent reaction units, while Reactant A openings 64 correspond to the Reactant A fluid channels defined by openings 54 of simple plate 50. The purpose of openings 54 and openings 64 is to position a flow of Reactant A to be processed in the current reaction unit such that that portion of the flow of Reactant A can be combined with a similar flow of Reactant B to form a product. The positioning is important not only in ensuring that flows of Reactants A and B can be combined, but also so that no obstruction hinders the flow of A and B, such that Reactants A and B can be smoothly laminated. Such a laminar flow condition enables diffusion mixing to occur, which is particularly rapid and efficient, and thus desirable. Sixth simple plate 60 also includes product opening 18, and heat transfer medium manifold openings 25 and 26.

Figure 8:
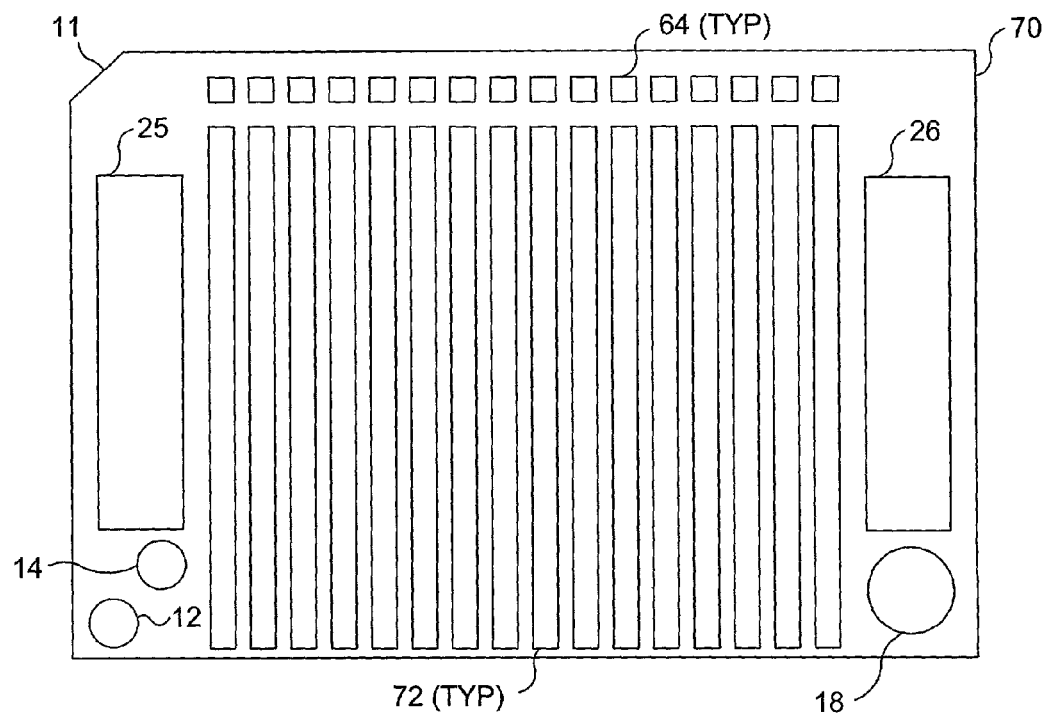
FIG. 8 is a plan view of the seventh simple plate of the preferred internally paralleled reactor illustrating a first reactant opening, a second reactant opening, a plurality of first reactant bores, a plurality of second reactant channels, two heat exchanger manifold openings, and a product opening.

Seventh simple plate 70 of FIG. 8 incorporates a distributor for Reactant B that is defined by a plurality of openings 72. Similar to the flow path split of Reactant A in FIG. 6, as Reactant B moves from openings defined in the sixth simple plate to openings in the seventh simple plate, Reactant B is split into a plurality of different fluid streams. Not only does Reactant B flow through fluid channels defined by openings 72, but Reactant B also flows through opening 12. The portion of Reactant B flowing through the fluid channels defined by openings 72 services the first reaction unit (simple plates 30–120). The portion of Reactant B flowing through opening 12 of simple plate 70 bypasses the first reaction unit, and is available to service subsequent reaction units. As noted above, each simple plate 30–120 of the first reaction unit includes opening 12, thus forming a bypass fluid channel for Reactant B.

Reactant A passes through seventh simple plate 70 via both Reactant A opening 14, and a plurality of Reactant A openings 64. Seventh simple plate 70 also includes product opening 18, and heat transfer medium manifold openings 25 and 26.

Figure 9:
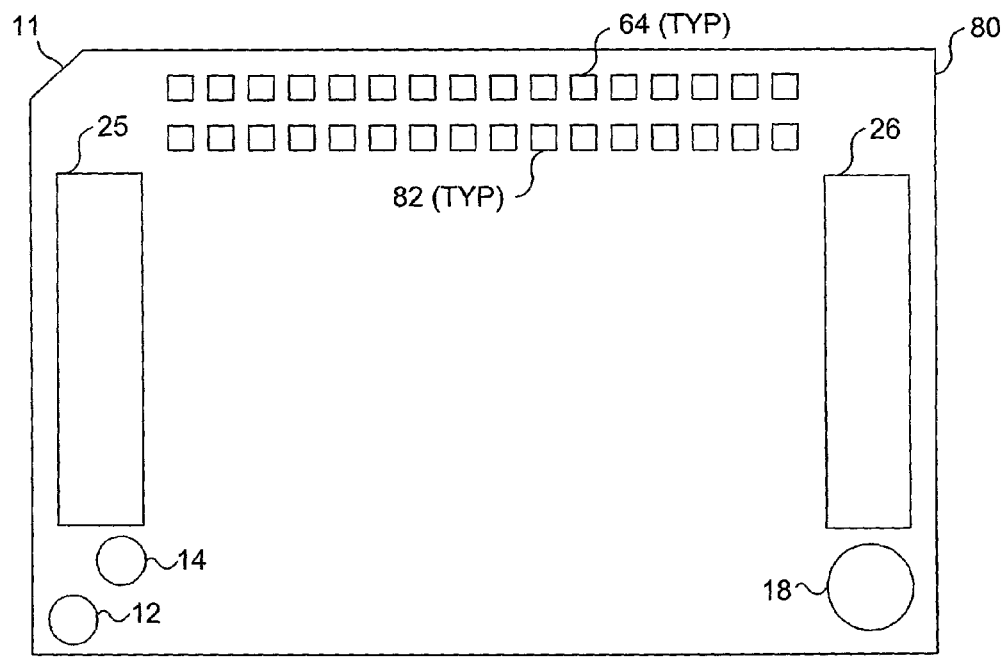
FIG. 9 is a plan view of the eighth simple plate of the preferred internally paralleled reactor illustrating a first reactant opening, a second reactant opening, a plurality of first reactant bores, a plurality of second reactant bores, two heat exchanger manifold openings, and a product opening.

FIG. 9 provides details of the eighth layer of the 2-fold internally parallelized chemical plant, showing an eighth simple plate 80, which has chamfer 11. Reactant A passes through eighth simple plate 80 via both Reactant A opening 14, and the plurality of Reactant A openings 64. Reactant B passes through eighth simple plate 80 via both Reactant B opening 12, and a plurality of Reactant B openings 82.

Note that the relative positions of openings 64 and 82 ensure that flows of Reactants A and B are properly positioned so that when introduced into mixing and reaction channels defined by openings in a subsequent plate, a unhindered lamination of Reactants A and B into individual mixing and reaction channels can be easily achieved. Eighth simple plate 80 also includes product opening 18, and heat transfer medium manifold openings 25 and 26.

Figure 10:
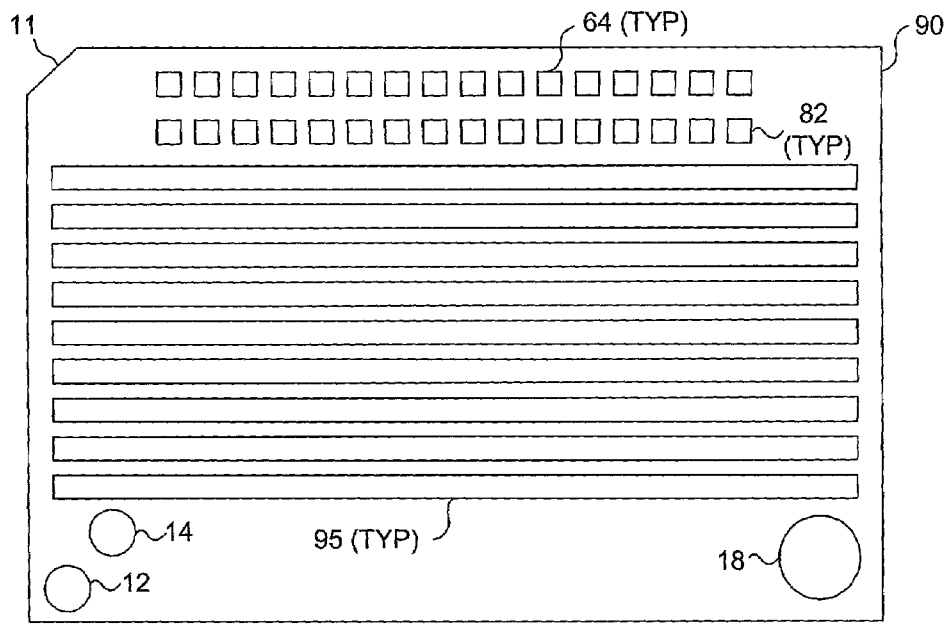
FIG. 10 is a plan view of the ninth simple plate of the preferred internally paralleled reactor illustrating a first reactant opening, a second reactant opening, a plurality of first reactant bores, a plurality of second reactant bores, a second heat exchanger, and a product opening.

Ninth simple plate 90 of FIG. 10 incorporates a second heat exchanger defined by openings 95. Heat transfer medium flows through ninth simple plate 90 via a plurality of fluid channels defined by openings 95. As will become more clear with respect to FIG. 28A, the second heat exchanger thermally conditions Reactant B, before Reactant B is combined with Reactant A in the first reaction unit (see openings 72 of simple plate 70, which define fluid channels that direct a flow of Reactant B). The heat exchanger defined by openings 95 also provides thermal conditioning to a plurality of mixing and reaction channels defined in openings on a subsequent simple plate. Note that heat transfer medium flowing in fluid passages defined by openings 95 is substantially orthogonal to a flow of Reactant B in fluid channels defined by openings 72. Also note that the heat transfer medium not only flows left to right in fluid channels 95, but that a portion of the heat transfer medium continues to flow through subsequent simple plates, as portions of fluid channels 95 overlap heat transfer medium openings in adjacent simple plates.

Reactant A passes through ninth simple plate 90 via both Reactant A opening 14, and the plurality of Reactant A openings 64. Reactant B passes through ninth simple plate 90 via both Reactant B opening 12, and the plurality of Reactant B openings 82. Ninth simple plate 90 also includes product opening 18.

Figure 11:
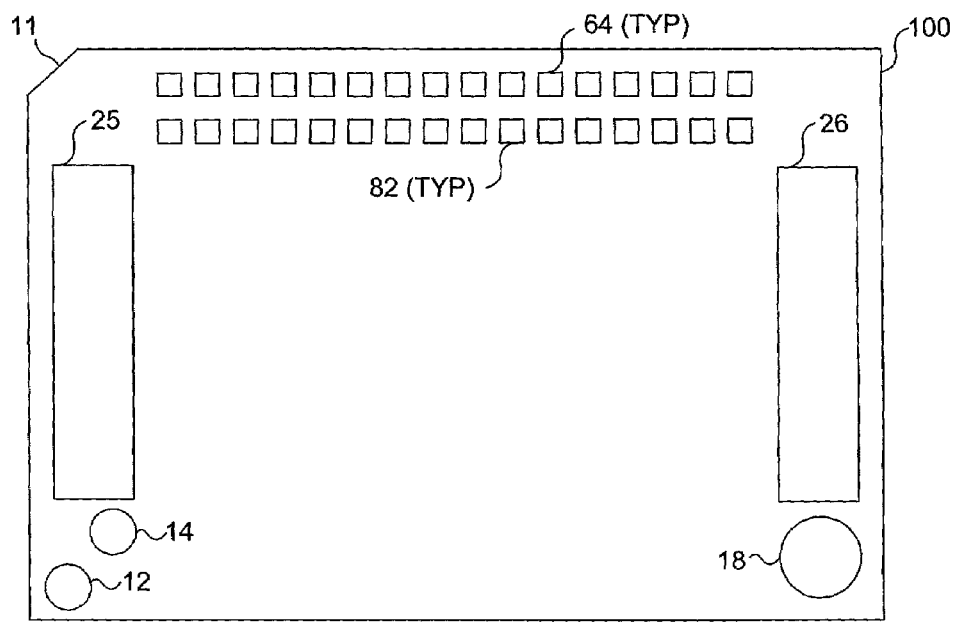
FIG. 11 is a plan view of the tenth simple plate of the preferred internally paralleled reactor illustrating a first reactant opening, a second reactant opening, a plurality of first reactant bores, a plurality of second reactant bores, two heat exchanger manifold openings, and a product opening.

FIG. 11 provides details of the tenth layer of the 2-fold internally parallelized chemical plant, showing a tenth simple plate 100, which has chamfer 11. Reactant A passes through tenth simple plate 100 via both Reactant A opening 14, and the plurality of Reactant A openings 64. Reactant B passes through tenth simple plate 100 via both Reactant B opening 12, and the plurality of Reactant B openings 82. Tenth simple plate 100 further includes product opening 18, and heat transfer medium manifold openings 25 and 26. Note that tenth simple plate 100 is identical to eighth simple plate 80. Accordingly, a reaction unit comprising 10 simple plates actually includes simple plates of less than 10 different configurations.

Figure 12:
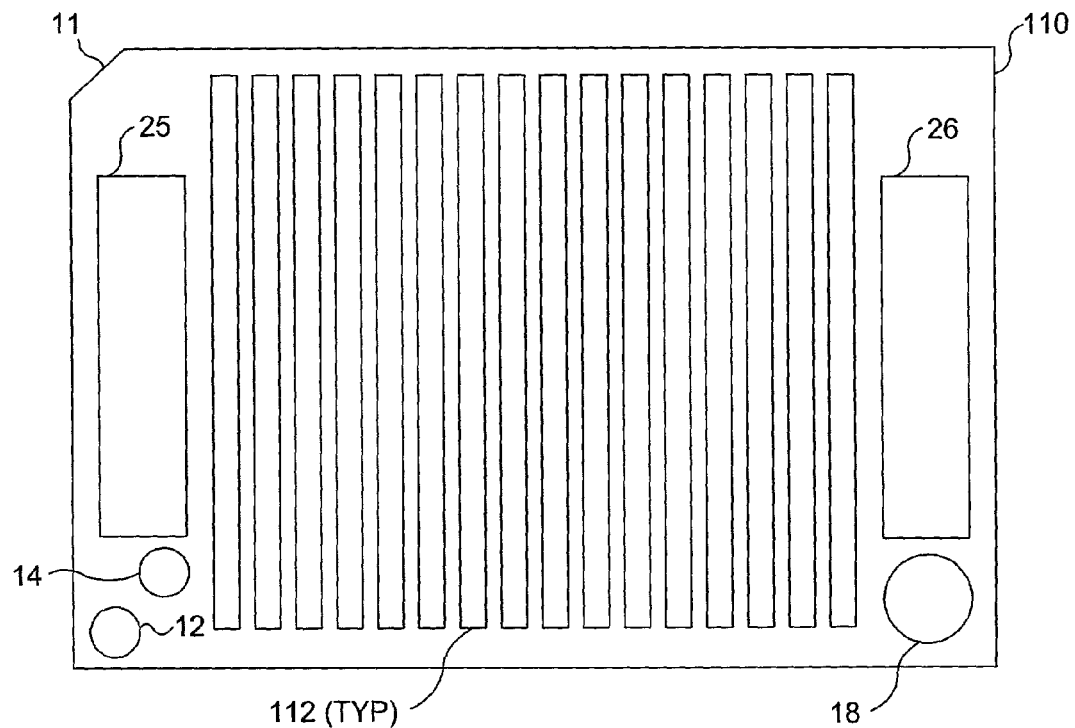
FIG. 12 is a plan view of the eleventh simple plate of the preferred internally paralleled reactor illustrating a first reactant opening, a second reactant opening, a plurality of reaction channels comprising a first reactor, two heat exchanger manifold openings, and a product opening.

Eleventh simple plate 110 of FIG. 12 incorporates a plurality of openings 112 that define a plurality of mixing and reaction channels. Note that these mixing and reaction channels are the only mixing and reaction channels in the first reaction unit, which comprises simple plates 30–130. It should also be noted that the positions of openings 112 relative to openings 64 (Reactant A) and openings 82 (Reactant B) ensure that unhindered lamination of Reactants A and B in each mixing and reaction channel can be achieved. Due to the positions of openings 64 (see simple plate 10), Reactant A will enter the mixing and reaction fluid channels defined by opening 112 first, and the flow will be disposed on the bottom portion of the mixing and reaction fluid channels. The positions of openings 82 (see simple plate 10) causes Reactant B to enter the mixing and reaction fluid channels defined by opening 112 last, such that Reactant B is laminated over Reactant A. This relationship can be more clearly seen in FIG. 27C.

Note that Reactant A also passes through eleventh simple plate 110 via Reactant A opening 14, and that Reactant B passes eleventh simple plate 110 via Reactant B opening 12. Eleventh simple plate 110 further includes product opening 18, and heat transfer medium manifold openings 25 and 26.

Figure 13:
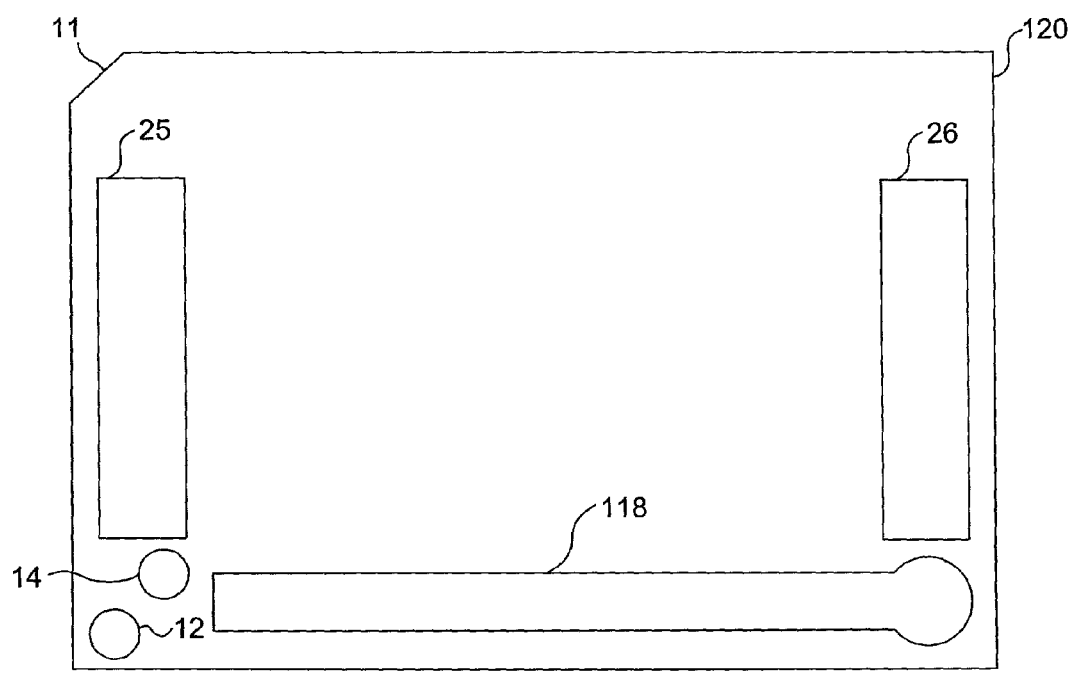
FIG. 13 is a plan view of the twelfth simple plate of the preferred internally paralleled reactor illustrating a first reactant opening, a second reactant opening, two heat exchanger manifold openings, a product collector, and a product opening.

FIG. 13 provides details of the twelfth layer of the 2-fold internally parallelized chemical plant, showing a twelfth simple plate 120, which has chamfer 11 and a product collection opening 118, which defines a product collection channel used to collect the product formed in the mixing and reaction channels defined by openings 112 in the prior simple plate. The product is then directed back through prior simple plates to exit the reactor via top simple plate 10. At this point in the first reaction unit (simple plates 30–130), Reactants A and B pass through twelfth simple plate 120 only via Reactant A opening 14 and Reactant B opening 12, respectively. The other reactant streams were combined in mixing and reaction channels defined by openings 112 in the prior simple plate, and no longer exist as distinct reactant streams (having been combined to form a product stream). Twelfth simple plate 120 further includes heat transfer medium manifold openings 25 and 26. Note that twelfth simple plate 120 also represents the last simple plate of the first reaction unit (comprising simple plates 30–120).

While this point will become clearer when FIG. 28A is reviewed, because the temperature of the reactants and the resulting product is so critical to yield and quality, the 2-fold internally parallelized chemical plant sandwiches the mixing and reaction channels of each reaction unit (such as the channels defined by openings 112 of eleventh simple plate 110) between an upper and a lower heat exchanger, to enable better temperature control. Heat exchangers in the present reactor also modify the temperature of a solid portion of adjacent simple plates. To thermally condition a fluid flowing in channels defined by openings 112 of eleventh simple plate 110, heat exchangers defined by openings in the ninth and thirteenth simple plates modify respective solid portions of the tenth and twelfth simple plates. It will be apparent that the heat exchangers of the 2-fold internally parallelized chemical plant actually moderate the temperature of a solid portion of simple plates both above and below the opening that corresponds to the heat exchanger, so that a single heat exchanger can thermally condition fluids flowing in fluid channels defined by two different simple plates.

In the reactor stacks of a chemical plant in accord with the present invention, this efficient thermal conditioning is desirable, as a single heat exchanger can be employed to simultaneously thermally condition a fluid associated with different simple plates. However, it is envisioned that in different reactor stacks, such multiple conditioning might be undesirable. If so, a simple plate that does not conduct thermal energy (i.e., whose thickness and/or thermal conductivity is sufficient to substantially prevent heat transfer) could be used to isolate the heat exchangers to avoid undesired thermal conditioning. With respect to the present 2-fold internally parallelized chemical plant, one preferable characteristic of the material from which the simple plates are fabricated is that the material be thermally conductive, at least with respect to layers that are transferring thermal energy to or from a fluid channel and a heat exchanger. If such a layer is sufficiently thin, the thermal conductivity of most materials will be adequate.

Figure 14:
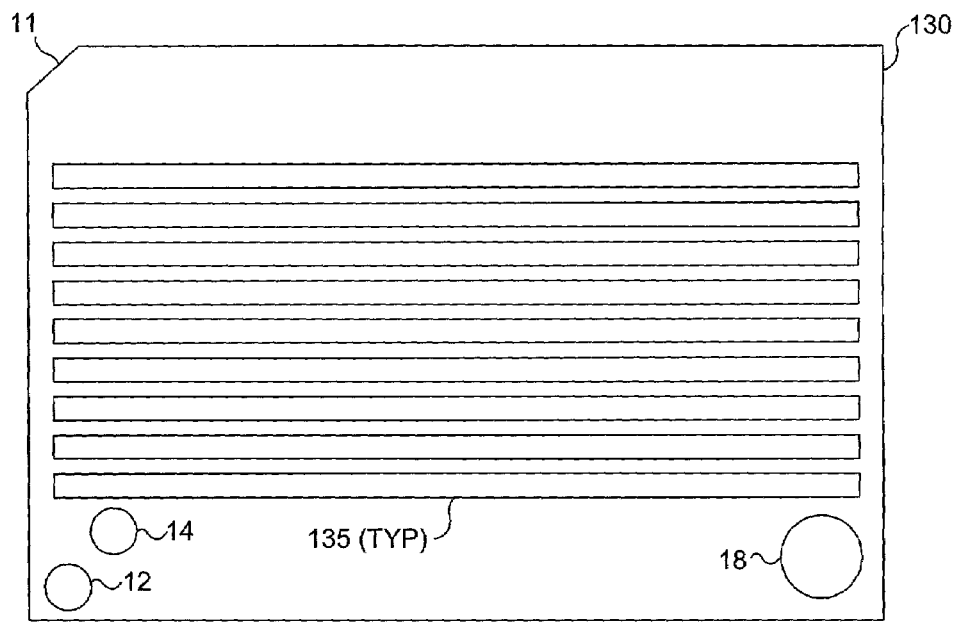
FIG. 14 is a plan view of the thirteenth simple plate of the preferred internally paralleled reactor illustrating a first reactant opening, a second reactant opening, a third heat exchanger, and a product opening.

FIG. 14 shows a thirteenth simple plate 130 that includes chamfer 11. Thirteenth simple plate 130 represents the first simple plate in the second reaction unit (comprising simple plates 130–220), and includes openings defining a heat exchanger. Note that for each reaction unit that is disposed adjacent to a preceding reaction unit, the first simple plate of the subsequent reaction unit (identical to third simple plate 30 and thirteenth simple plate 130) includes a heat exchanger that not only thermally conditions the flow of Reactant A entering the subsequent reaction unit, but also thermally conditions the fluid in the mixing and reaction channels (see eleventh simple plate 110) of the preceding reaction unit. To ensure that the mixing and reaction channels in all reactions units are similarly sandwiched by heat exchangers, the final reaction unit in a chemical plant needs to be followed by a similar heat exchanger plate, (identical to third simple plate 30 and thirteenth simple plate 130).

The heat exchanger of thirteenth simple plate 130 is defined by openings 135. Heat transfer medium flows through thirteenth simple plate 130 via a plurality of fluid channels defined by openings 135. As will become clearer with respect to FIG. 28A, openings 135 provide thermal conditioning to the plurality of mixing and reaction channels defined in openings 112 on simple plate 110. Again, the flow of heat transfer medium in fluid passages defined by openings 135 is substantially orthogonal to a flow of mixing reactants and product in fluid channels defined by openings 112. Also note that heat transfer medium not only flows left to right in fluid channels 135, but that a portion of the heat transfer medium continues to flow through subsequent simple plates, as portions of fluid channels 135 overlap heat transfer medium openings in adjacent simple plates.

Reactant A passes through thirteenth simple plate 130 via Reactant A opening 14, and Reactant B passes thirteenth simple plate 130 via Reactant B opening 12. Thirteenth simple plate 130 also includes product opening 18 (which enables product produced in lower reaction units to be withdrawn via top simple plate 10).

As noted above the second reaction unit of the 2-fold internally parallelized chemical plant is defined by layers 130–220. An additional simple plate defining a heat exchanger is disposed immediately adjacent the final reaction unit, and a bottom plate in layer 240 simply seals the chemical plant. It should be understood that if additional reaction units are desired (to increase a volume of product that can be produced per unit of time), additional reaction units comprising 10 layers can be added to the chemical plant before the final heat exchanger. As described in conjunction with FIGS. 1A–1D, production in a chemical plant is preferably increased by adding reactor stacks, which comprise a plurality of reaction units. It should be noted that the simple plates employed in each additional reaction unit, and their order in the stack, are identical to that of the reaction unit described above. Thus, the first reaction unit, corresponding to simple plates 30–120, is identical to the second reaction unit, corresponding to simple plates 130–220.

Figure 15:
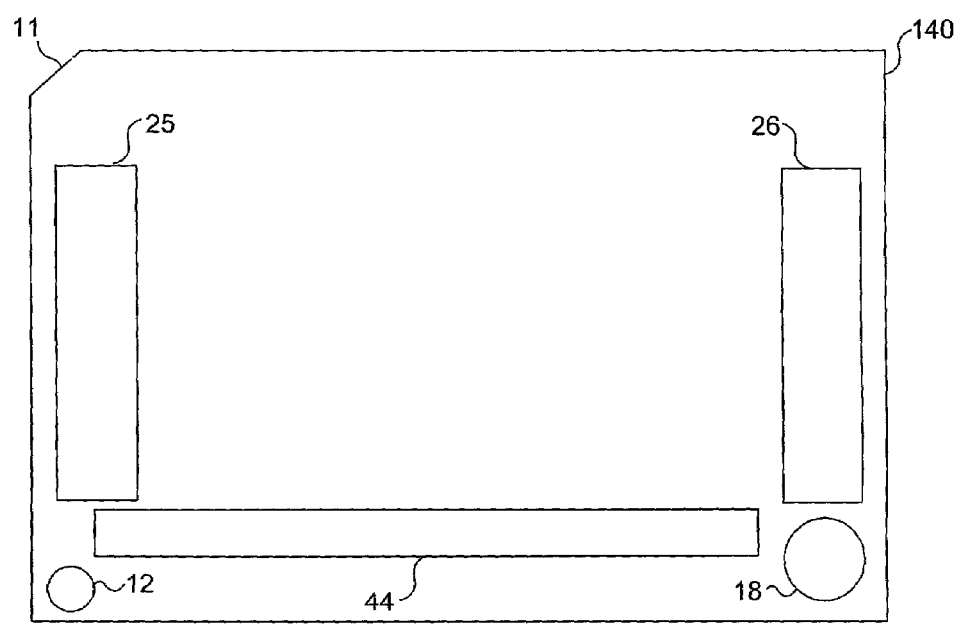
FIG. 15 is a plan view of the fourteenth simple plate of the preferred internally paralleled reactor illustrating a first reactant distributor, a second reactant opening, two heat exchanger manifold openings, and a product opening.

Turning now to FIG. 15, which provides details of the fourteenth layer of the 2-fold internally parallelized chemical plant, upon comparing FIG. 15 with previously described FIG. 5, it will be apparent that a fourteenth simple plate 140 is identical to fourth simple plate 40. Because the n-fold internally parallelized chemical plant, reactor stacks and reaction units of the present invention employ duplicate simple plates; the task of producing the simple plates is straightforward. As will become clear upon viewing FIG. 28A, the twenty-four layers of the preferred embodiment of an n-fold internally parallelized chemical plant (where n equals 2) requires using simple plates of only 12 different configurations (one top plate, one distributor plate, nine different plates per reaction unit, and one bottom plate). Of those plate configurations, all the reaction units and reactor stacks are fabricated from only nine different configurations, as described in detail above (note that each reaction unit includes two simple plates identical to simple plate 80). As will be described in further detail below, if plugs and less than optimal channel geometry are employed, a functionally similar n-fold internally parallelized chemical plant can be fabricated using simple plates having only 10 different configurations.

Figure 16:
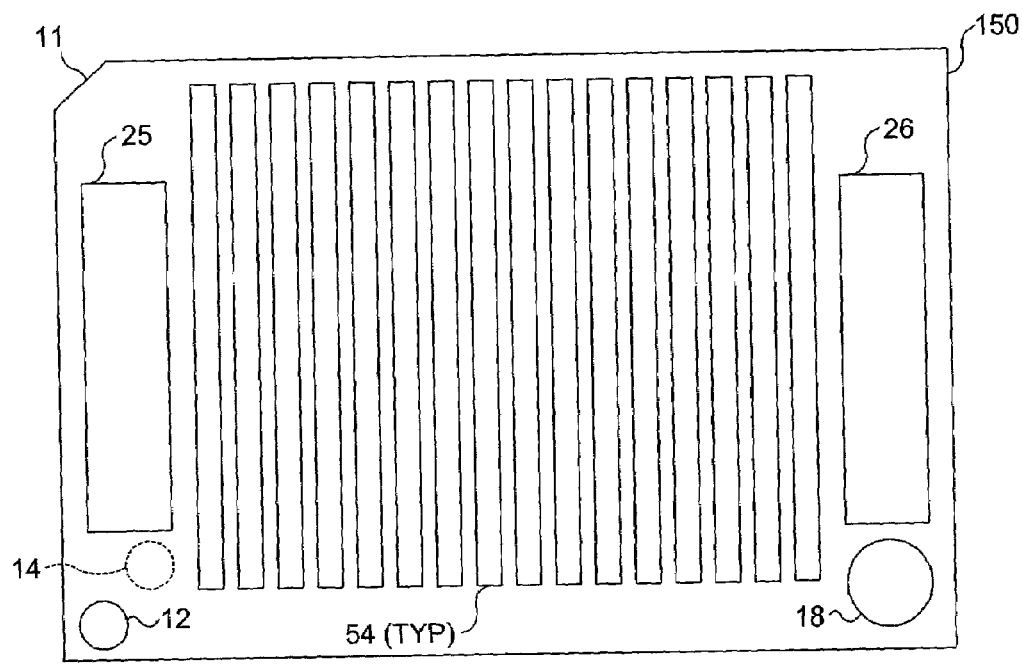
FIG. 16 is a plan view of the fifteenth simple plate of the preferred internally paralleled reactor illustrating a plugged first reactant opening, a second reactant opening, a plurality of first reactant channels, two heat exchanger manifold openings, and a product opening.

As with FIG. 6, FIG. 16 includes the plurality of openings 54 that define a distributor for Reactant A. (Note that in FIG.

16, the distributor feeds the second reaction unit, while in FIG. 6, the distributor feeds the first reaction unit.) As described above with respect to FIG. 6, in a fifteenth simple plate 150 shown in FIG. 16, Reactant A is split into a plurality of different fluid streams, such that Reactant A flows through fluid channels defined by openings 54, and through opening 14. The portion of Reactant A flowing through the fluid channels defined by openings 54 in simple plate 150 services the second reaction unit (simple plates 140–230). The portion of Reactant A flowing through opening 14 of simple plate 150 bypasses the second reaction unit and is available to service subsequent reaction units. If no additional reaction units are to be employed, opening 14 is not required and can be plugged or eliminated (note that opening 14 is shown in dashed lines). Eliminating opening 14, or not forming opening 14 during the manufacture of simple plate 150 would mean that simple plates 50 and 150 would not be identical. Because adding another configuration of the simple plates will somewhat increase the manufacturing expense, plugging opening 14 is preferred. Plugging unnecessary openings is relatively simple, and is described in more detail below. Note that plugging is optional, and not required. If opening 14 of simple plate 150 is not plugged, some portion of Reactant A will remain in the "dead volume" and not be processed. Unless the unprocessed volume of Reactant A represents an unacceptable expense (as may be the case if an ultra expensive reactant is being used), an unacceptable safety hazard (as may be the case if Reactant A is unusually unstable) or an unacceptable reduction in quality due to decomposition of reactant(s), the portion of Reactant A held in such a dead volume is not a problem.

Reactant B passes through fifteenth simple plate 150 via Reactant B opening 12. Fifteenth simple plate 150 also includes product opening 18, and heat transfer medium manifold openings 25 and 26.

Figure 17:
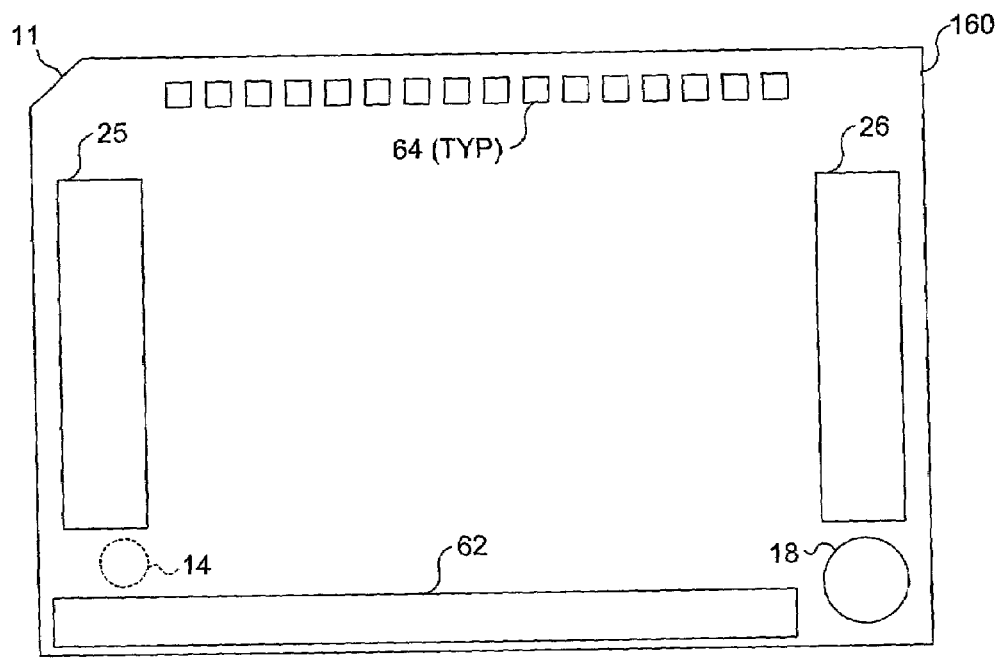
FIG. 17 is a plan view of the sixteenth simple plate of the preferred internally paralleled reactor illustrating a plugged first reactant opening, a plurality of first reactant bores, a second reactant distributor, two heat exchanger manifold openings, and a product opening.

FIG. 17 provides details of the sixteenth layer of the 2-fold internally parallelized chemical plant, showing a sixteenth simple plate 160, which like sixth simple plate 60, has chamfer 11, opening 62 that defines a manifold for Reactant B, optional Reactant A opening 14, and the plurality of Reactant A openings 64 that are in fluid communication with the Reactant A fluid channels defined by openings 54 of simple plate 150. Sixteenth simple plate 160 also includes product opening 18, and heat transfer medium manifold openings 25 and 26.

Figure 18:
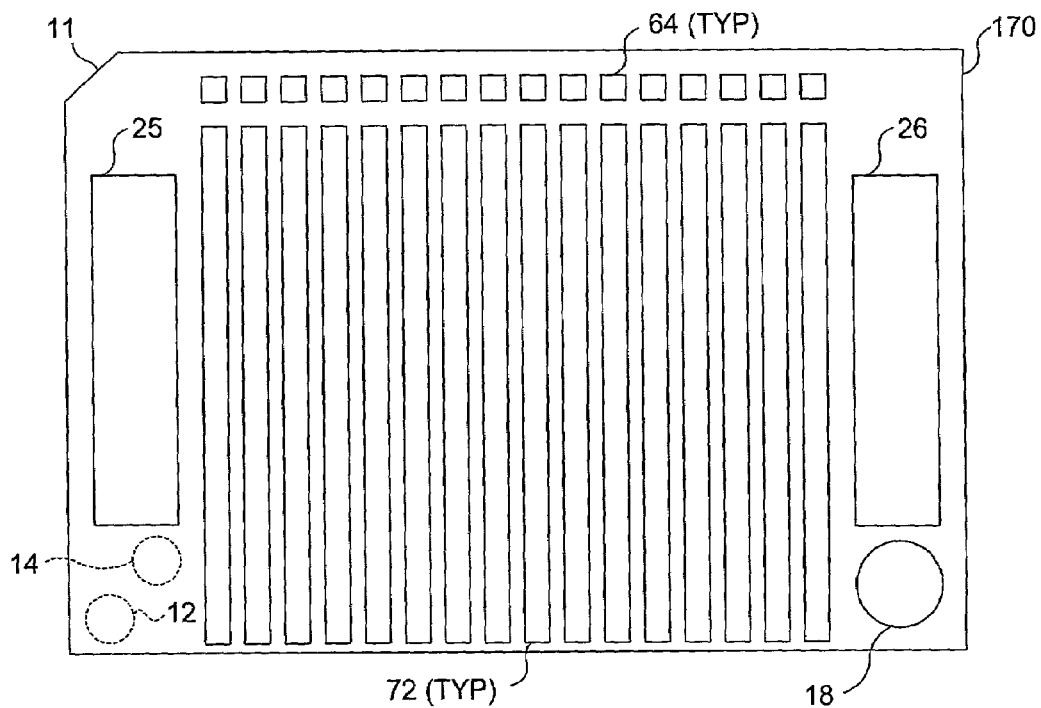
FIG. 18 is a plan view of the seventeenth simple plate of the preferred internally paralleled reactor illustrating a plugged first reactant opening, a plugged second reactant opening, a plurality of first reactant bores, a plurality of second reactant channels, two heat exchanger manifold openings, and a product opening.

Seventeenth simple plate 170 of FIG. 18 is identical to seventh simple plate 70 of FIG. 8, except that openings 12 and 14 are optional. As noted above, if additional reaction units are added, openings 12 and 14 are required to service such additional reaction units. Simple plate 170 incorporates a distributor for the thermal preconditioning of Reactant B that is defined by openings 72, product opening 18, and heat transfer medium manifold openings 25 and 26.

Figure 19:
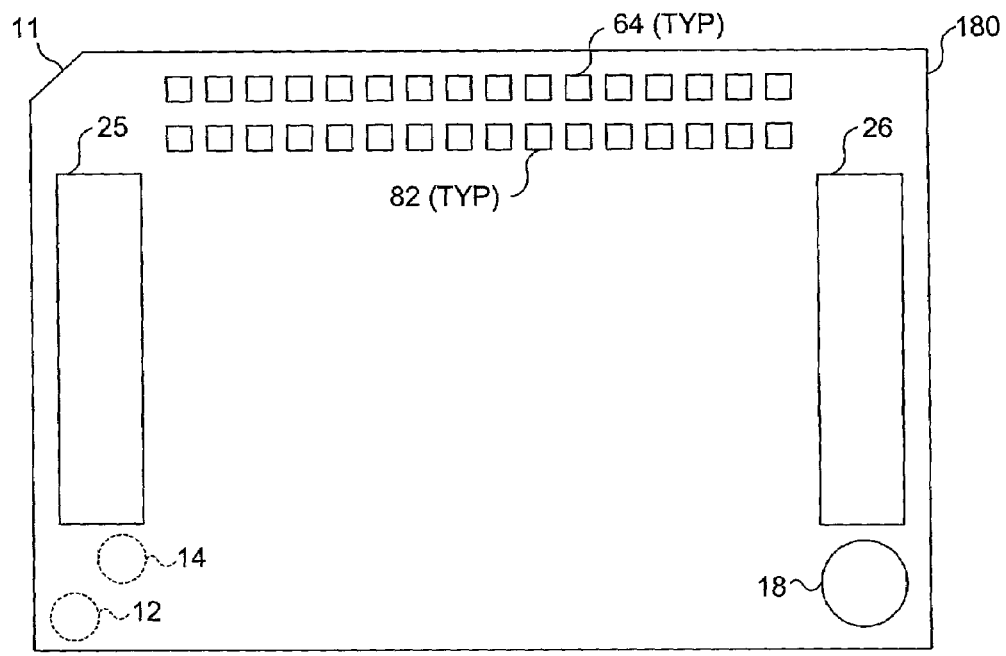
FIG. 19 is a plan view of the eighteenth simple plate of the preferred internally paralleled reactor illustrating a plugged first reactant opening, a plugged second reactant opening, a plurality of first reactant bores, a plurality of second reactant bores, two heat exchanger manifold openings, and a product opening.

FIG. 19 provides details of the eighteenth layer of the 2-fold internally parallelized chemical plant, showing an eighteenth simple plate 180, which includes chamfer 11, optional openings 12 and 14, the plurality of Reactant A openings 64, the plurality of Reactant B openings 82, product opening 18, and heat transfer medium manifold openings 25 and 26. As noted above, the relative positions of openings 64 and 72 ensure that flows of Reactants A and B are properly positioned so that when introduced into mixing and reaction channels defined by openings in a subsequent plate, a laminar flow condition between Reactants A and B in such individual mixing and reaction channels can be readily achieved.

Figure 20:
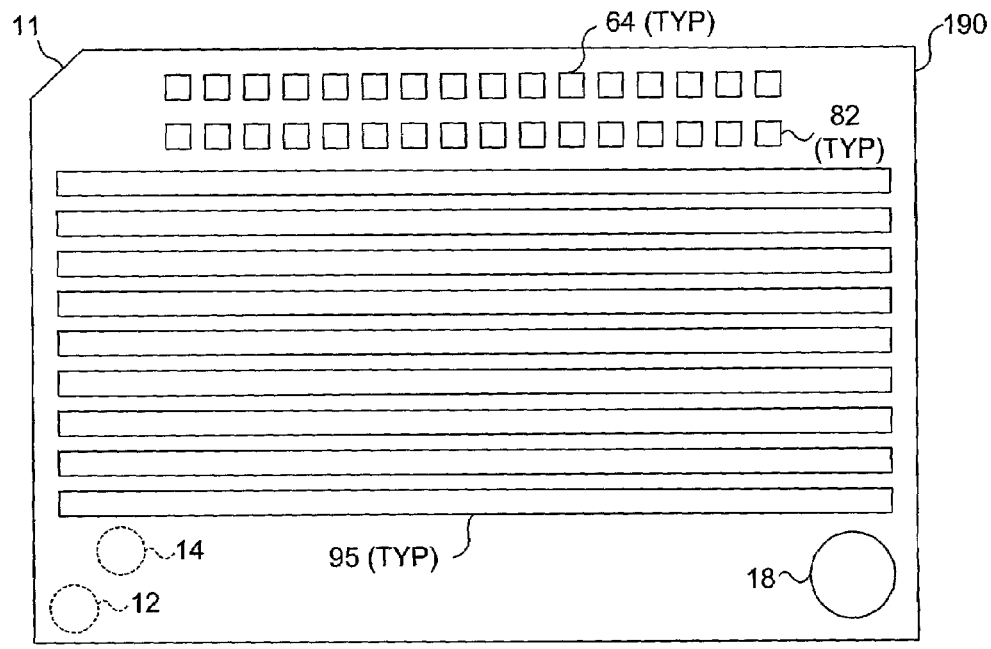
FIG. 20 is a plan view of the nineteenth simple plate of the preferred internally paralleled reactor illustrating a plugged first reactant opening, a plugged second reactant opening, a plurality of first reactant bores, a plurality of second reactant bores, a fourth heat exchanger, and a product opening.

Nineteenth simple plate 190 of FIG. 20 incorporates a heat exchanger in the second reaction unit, defined by openings 95. The heat transfer medium flows through nineteenth simple plate 190 in the plurality of fluid channels defined by openings 95. The heat exchanger of simple plate 190 thermally conditions Reactant B, before Reactant B is combined with Reactant A in the second reaction unit (see openings 72 of simple plate 170, which define fluid channels that direct a flow of Reactant B). The heat exchanger defined by openings 95 also provides thermal conditioning to a plurality of mixing and reaction channels defined in openings on a subsequent simple plate. Note that the orthogonal flow of the heat transfer medium relative to the reactants/product is maintained (as described above). Nineteenth simple plate 190 also includes optional openings 12 and 14, the plurality of Reactant A openings 64, the plurality of Reactant B openings 82, and product opening 18.

Figure 21:
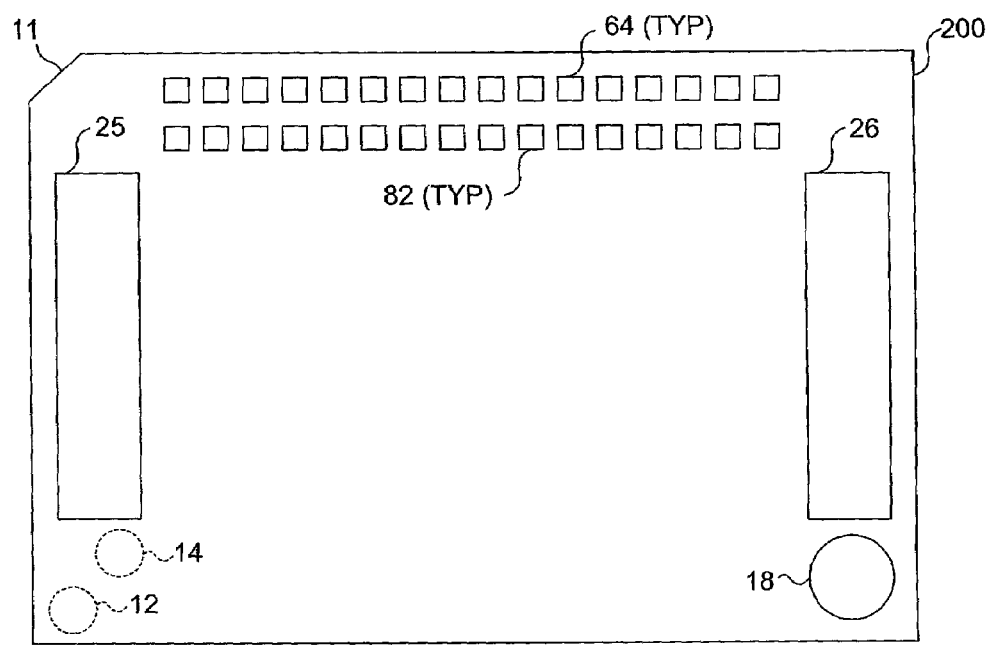
FIG. 21 is a plan view of the twentieth simple plate of the preferred internally paralleled reactor illustrating a plugged first reactant opening, a plugged second reactant opening, a plurality of first reactant bores, a plurality of second reactant bores, two heat exchanger manifold openings, and a product opening.

FIG. 21 shows the twentieth layer of the 2-fold internally parallelized chemical plant corresponding to a twentieth simple plate 200, which is identical to tenth simple plate 100 of FIG. 11. Simple plate 200 includes chamfer 11, optional openings 12 and 14, the plurality of Reactant A openings 64, the plurality of Reactant B openings 82, product opening 18, and heat transfer medium manifold openings 25 and 26.

Figure 22:
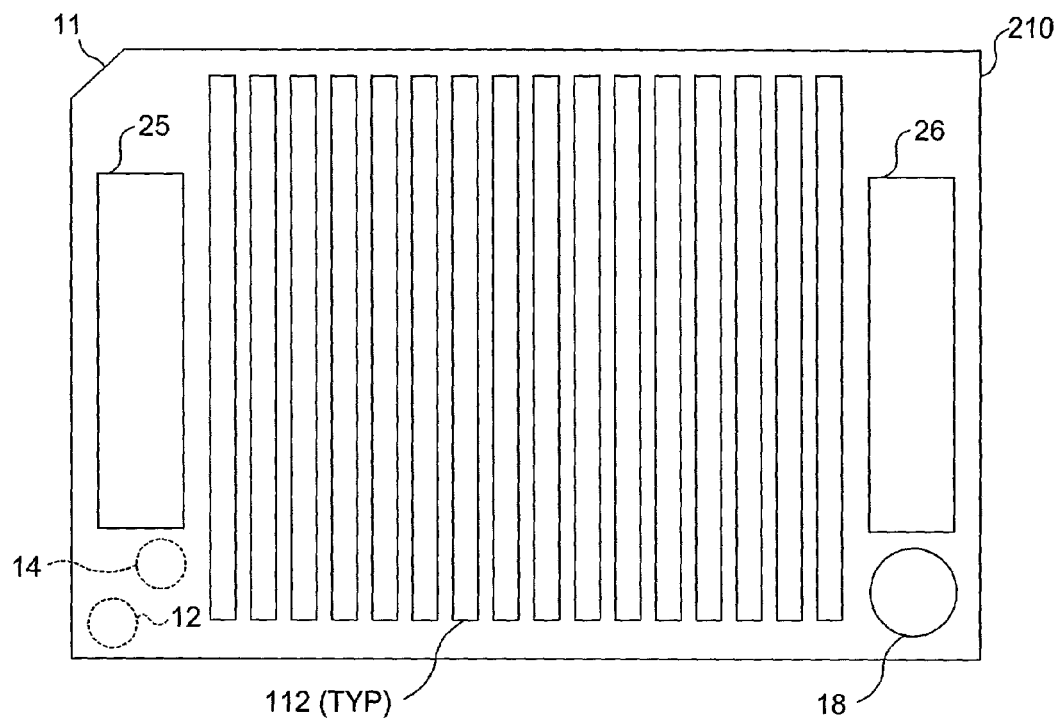
FIG. 22 is a plan view of the twenty-first simple plate of the preferred internally paralleled reactor illustrating a plugged first reactant opening, a plugged second reactant opening, a plurality of reaction channels comprising a second reactor, two heat exchanger manifold openings, and a product opening.

A twenty-first simple plate 210 of FIG. 22 (identical to simple plate 10 of FIG. 12) incorporates the plurality of openings 112 that define a plurality of mixing and reaction channels. These mixing and reaction channels are the only mixing and reaction channels in the second reaction unit, which comprises simple plates 140–230. As before, the positions of openings 112 relative to openings 64 (Reactant A) and openings 82 (Reactant B) ensure that a laminar flow relationship will exist between Reactants A and B in each mixing and reaction channel. Simple plate 210 also includes chamfer 11, optional openings 12 and 14, product opening 18, and heat transfer medium manifold openings 25 and 26.

Figure 23:
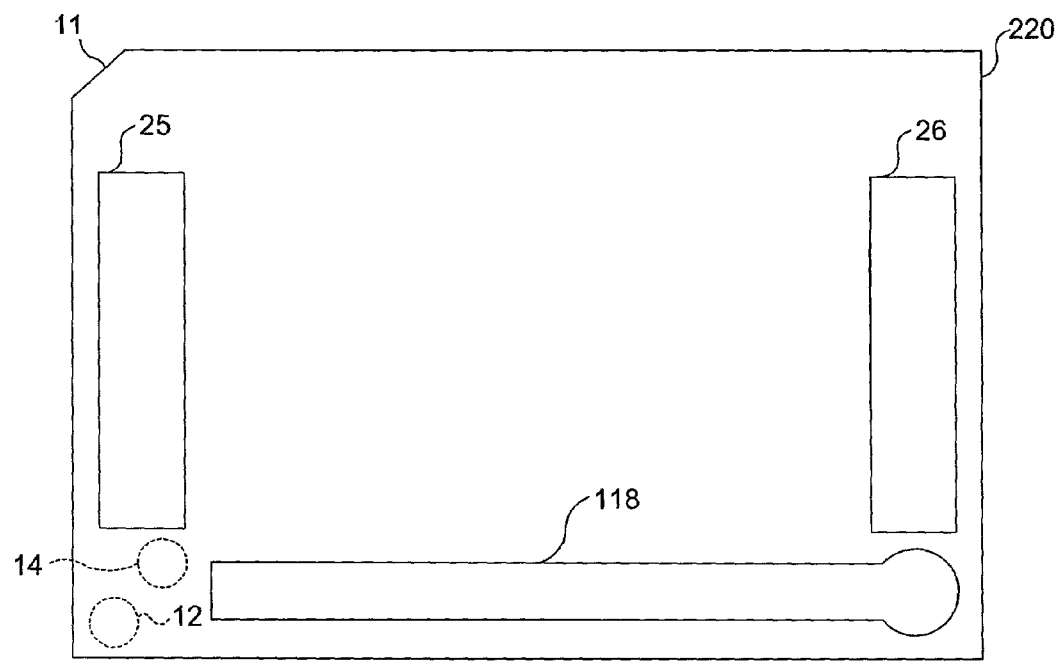
FIG. 23 is a plan view of the twenty second simple plate of the preferred internally paralleled reactor illustrating a plugged first reactant opening, a plugged second reactant opening, two heat exchanger manifold openings, a product collector, and a product opening.

FIG. 23 provides details of the twenty-second layer of the 2-fold internally parallelized chemical plant, showing a twenty-second simple plate 220, which is identical to twelfth simple plate 120. Simple plate 220 includes chamfer 11, product collection opening 118, optional openings 12 and 14, and heat transfer medium manifold openings 25 and 26. Product collection opening 118 defines a product collection channel used to collect the product formed in the mixing and reaction channels defined by openings 112 in simple plate 210. This product is then directed back through prior simple plates to exit the reactor via top simple plate 10. Simple plate 220 is the last plate in the second reaction unit. If additional reaction units were to be added to the 2-fold internally parallelized chemical plant, to generate an n-fold internally parallelized chemical plant, those reaction units would be added subsequent to simple plate 220, but preceding the final heat exchanger layer noted below.

The twenty-third layer of the 2-fold internally parallelized chemical plan incorporates a heat exchanger, that is disposed immediately subsequent to the final reaction unit, to ensure that the mixing and reaction channels of the final reaction unit are sandwiched between two heat exchangers. FIG. 24 shows a twenty-third simple plate 230, which is identical to both third simple plate 30 and thirteenth simple plate 130. Twenty-third simple plate 230 includes chamfer 11, openings 135 that define the heat exchanger, optional openings 12 and 14, and product opening 18. The heat transfer medium flows through twenty-third simple plate 230 via a plurality of fluid channels defined by openings 135. The heat exchanger defined by openings 135 in simple plate 230 provides thermal conditioning to the plurality of mixing and reaction channels defined in openings 112 on simple plate 210. Again, the heat transfer medium flow in fluid passages defined by openings 135 is substantially orthogonal to a flow of mixing reactants and product in fluid channels defined by openings 112.

The final layer of this 2-fold internally parallelized chemical plant is the twenty-fourth layer. FIG. 25 illustrates a twenty-fourth bottom simple plate 240, also having chamfer 11, and optional openings 12 and 14. Note that if optional openings 12 and 14 are included, then an appropriately sized plug will be inserted into each opening, to prevent Reactants A or B from exiting the reactor through openings 12 and 14 on simple plate 240. Also, opening 14 is no longer required in the 2-fold internally parallelized reactor at simple plate 150, and opening 12 is no longer required at simple plate 170, because at simple plate 140, opening 44 (defining a distributor for Reactant A in the second reaction unit) directs the flow of Reactant A toward the desired fluid path. Since no additional reaction unit is coupled to the second reaction unit, opening 14 is no longer required to provide a secondary or bypass fluid path for Reactant A. Opening 62 (defining a distributor for Reactant B in the second reaction unit) in simple plate 160 directs the flow of Reactant B toward the desired fluid path in the second reaction unit, and opening 12 is no longer required for the same reason. Preferably, a plug used to seal opening 12 at bottom simple plate 240 will be of a sufficient length to extend into the reactor as far as simple plate 170, and a plug used to seal opening 14 at simple plate 240 will be of a sufficient length to extend into the reactor as far as simple plate 150, thus eliminating the dead volumes for Reactants A and B.

It should be noted that in preferred chemical plants, the thickness of both top simple plate 10 and bottom simple plate 240 are significantly greater than the thickness of the intermediate simple plates used to construct the individual reaction units. The greater thickness provides both greater structural integrity, as well as helping to thermally isolate the inner layers of the reactor from the outside environment.

In this preferred embodiment, two reaction units are included, yielding a 2-n fold reactor. Additional reaction units could be added. For example, a first plate of the additional reaction unit can be added immediately subsequent to simple plate 220, and a last plate of any final reaction unit disposed immediately preceding simple plate 230. As discussed above, any subsequent reaction unit will include 10 simple plates, of the same configurations and in the same order as simple plates 30–120 (or simple plates 130–220). Of course, if additional reaction units are added, optional openings 12 and 14 will be required to allow reactants to bypass the second reaction unit and to be delivered to a subsequent reaction unit. Any final reaction unit, disposed immediately preceding the final heat exchanger plate (see simple plate 230) and bottom plate 240 can include openings 12 and 14 as optional features, rather than required elements. Also as noted above, if openings 12 and 14 are eliminated, more configurations of the simple plates will be required. From a fabrication cost consideration, fewer configurations of simple plates is preferred. If for a particular reaction, there is a concern that either the dead volume or plugs are undesirable, then the extra fabrication steps and concomitant cost required to produce the added plate configurations is acceptable. Keeping all reaction units identical (i.e., having openings 12 and 14 in all reaction units) is preferable, particularly when a chemical plant includes many reaction units, arranged in reactor stacks as described with respect to FIGS. 1A–1C.

FIG. 26 is an exploded isometric view of the 2-fold internally parallelized chemical plant described above, including all twenty-four layers (forming two reaction units) described in regard to FIGS. 2–25. Simple plates 10–240 are shown stacked in order so that the relative positions of each simple plate to each other is evident. Note that simple plates 30–120 define the first reaction unit, and that simple plates 130–220 define the second reaction unit. If additional reaction units are desired to increase the rate of product production, then additional 10-layer reaction units can be included (each additional reaction unit comprising duplicates of simple plates 130–220, in the same order and corresponding configurations). As explained above, reaction units are preferably irreversibly bonded in groups of up to 10 reaction units, thereby generating a reactor stack. Therefore, plates 30–220 are preferably irreversibly joined to form a reactor stack that includes two reaction units. Any chemical plant corresponding to the 2-fold internally parallelized chemical plant described above includes a distributor plate (see simple plate 20) and a final heat exchanger plate (see simple plate 230). While irreversible bonding is generally preferred, it is not critical that distributor plate or the final heat exchanger plate be irreversibly bonded to the top and bottom simple plates. A preferred dimensional thickness of the simple plates is as follows:

| | |
|---|---|
| Top simple plate 10: | 3.0 mm. |
| Simple plates 20–230 | 0.3 mm. |
| Bottom simple plate 240: | 3.0 mm |

Simple plates 10 and 240 (the top and bottom simple plates) are thicker than the other simple plates to provide greater structural stability. Simple plates 20–230 are thinner than the top and bottom simple plates to enhance mixing and heat transfer. As will be discussed below, a thickness of 0.3 mm provides a reasonable heat transfer ability for a wide variety of materials. It should be noted that if desired, some of simple plates 20–230 can be made thicker, to increase a volume of a fluid channel defined by an opening in that simple plate. For example, simple plates 30, 90, 130, 190, and 230 include a plurality of elongate openings disposed in a longitudinal parallel array. Those openings define heat exchangers. To provide a larger volume of fluid in any of those heat exchangers, the respective simple plate can be made thicker. It should be noted that the preferred plate thicknesses correspond to sheet metal thicknesses that are commercially available, and that the ready availability of such materials lowers production costs of the reactor.

For simple plates that include solid portions used to transfer thermal energy to or from heat exchangers, a preferred thickness is about 0.3 mm. As plate thickness increases, mechanical rigidity and stability increases, mixing and heat transfer efficiency decreases. The 0.3 mm thickness provides a good trade off between heat transfer characteristics and pressure drop demands, without sacrificing mechanical stability. It should be noted however, that it has been empirically determined that simple plates defining openings that only conduct fluids in an orthogonal direction relative to a fluid flow in an adjacent simple plate, can be thinner, preferably 0.1 mm.

FIG. 27A illustrates a fluid flow path of Reactant A, as it enters top simple plate 10 and proceeds through the tenth simple plate 100. Reactant A enters through opening 14 in top simple plate 10, passes through simple plates 20 and 30 of the second and third layers via openings 14, and enters Reactant A manifold defined by opening 44 on simple plate 40 of the fourth layer. Reactant A then flows to simple plate 50 of the fifth layer and enters Reactant A distributor defined by a plurality of parallel openings 54. In layers six through ten (simple plates 60–100), Reactant A passes through each plate via the plurality of openings 64. At this point, Reactant A is properly disposed to be laminated with Reactant B. As discussed above, the purpose of the distributors for Reactants A and B is to precisely align the fluid flows for Reactants A and B to optimize mixing in subsequent layers of the reactor. The purpose of Reactant A openings 64 is to precisely align a plurality of Reactant A fluid paths with a plurality of Reactant B fluid paths, so that a stacked laminar flow can be achieved with equilibrated pressure drops. It should be noted that heat exchangers provided in simple plates 30 and 90 are used to bring both Reactants A and B to the proper temperature before they are mixed.

FIG. 27B illustrates the fluid path that Reactant B takes in entering the first ten layers of the 2-fold internally parallelized chemical plant. Reactant B enters top simple plate 10 through opening 12, and then passes through the second-fifth layers via identical Reactant B openings 12 in simple plates 20–50. In the sixth layer, Reactant B enters the Reactant B manifold defined by opening 62 in simple plate 60. Reactant B then flows to simple plate 70 of the seventh layer and enters the Reactant B thermal preconditioning channels defined by the plurality of parallel openings 72. In layers eight through ten (simple plates 80–100), Reactant B passes through each plate via the plurality of openings 82. At this point, Reactant B is properly disposed to enable laminated flow to be established when combined with Reactant A.

FIG. 27C illustrates the combined flows of Reactants A and B after passing through the tenth layer and proceeding through layers 110–120 of the 2-fold internally parallelized chemical plant. Reactants A and B are combined (in a stacked laminar flow pattern) in the plurality of parallel fluid channels defined on simple plate 110 by the plurality of opening 112. It is in these mixing and reaction channels (defined by openings 112) that lamination of Reactants A and B is achieved, resulting in rapid diffusion mixing and a desired chemical reaction between Reactants A and B. The heat exchangers defined by openings in simple plates 90 and 130 (see FIG. 26) are used to control the temperature of the reactants as they mix and react in the mixing and reaction channels (defined by openings 112). After Reactants A and B become thoroughly mixed in simple plate 110, the now mixed Reactants A and B flow into a collection channel defined by opening 118 in simple plate 120. Opening 118 includes an enlarged section that aligns with product opening 18 on simple plate 110. The mixed reactants/product then flow back up the reactor, through aligned product openings 18 in simple plates 110–200, and the product exits the reactor via opening 18 in top simple plate 10. If the combination of the mixing and reaction channels defined by openings 112 on simple plate 110 and the fluid channel defined by aligned openings 18 in simple plates 10–110 do not provide sufficient residence time for the reaction to reach completion, then an additional residence time channel can be added downstream of the product outlet of the chemical plant.

FIG. 28A illustrates the fluid paths for the heat transfer medium throughout the exemplary 2-fold internally parallelized chemical plant. Note that heat exchangers in the preferred reactor are defined by openings in simple plates 30, 90, 130, 190, and 230. These heat exchangers thermally condition each Reactant as it enters a reaction unit, as well as thermally conditioning the mixed reactants in the mixing and reaction channels of each reaction unit. It should be noted that the flow of the heat transfer fluid through the heat exchanges is always orthogonal to a flow of reactant or mixed reactants/product.

Freshly conditioned heat transfer medium enters the 2-fold internally parallelized chemical plant via opening 15 in top simple plate 10, and spent heat transfer medium exits the 2-fold internally parallelized chemical plant via opening 16 in top simple plate 10. After entering the 2-fold internally parallelized chemical plant, the heat transfer medium flows through a manifold defined by opening 25 in simple plate 20. Next, the heat transfer medium enters a first heat exchanger defined by openings 35 in simple plate 30. Note that the first heat exchanger thermally conditions that portion of Reactant A that enters the first reaction unit (see openings 54 in simple plate 50). A second portion of Reactant A continues through aligned openings 12 and is not yet thermally conditioned. That portion of the flow of Reactant A will service the second reaction unit, and will be thermally conditioned as the flow enters the second (or subsequent) reaction unit.

The flow of heat transfer medium actually splits at simple plate 30. Some heat transfer medium enters the heat exchanger defined by openings 35. That portion then flows up out of the reactor, passing through a heat transfer medium manifold defined by opening 26 in simple plate 20, and then exits the reactor via opening 16 in top simple plate 10.

A second portion of heat transfer medium continues to flow down into the 2-fold internally parallelized chemical plant via the overlap of openings 35 in simple plate 30 and opening 25 in simple plate 40. As noted above, openings 25 define heat transfer medium manifolds, and aligned openings 25 in simple plates 40–80 direct the flow of heat transfer medium through the reactor to service a second heat exchanger defined by openings 35 in simple plate 90. The second heat exchanger thermally conditions the portion of Reactant B that enters the first reaction unit (see openings 72 in simple plate 70), as well as the mixed reactants/product flowing through mixing and reaction channels defined by openings 112 on simple plate 110. The heat transfer medium flowing through the second heat exchanger exits the reactor through aligned openings 26 in simple plates 80, 70, 60, 50, and 40. Simple plate 30 includes the first heat exchanger, and a portion of the first heat exchanger overlaps opening 26 in simple plate 40, enabling the heat transfer medium from the second heat exchanger to pass through the this overlapping portion, and then exit the reactor, as described above.

The flow of heat transfer medium again splits at simple plate 90. Some heat transfer medium enters the heat exchanger defined by openings 95. That portion then flows out of the 2-fold internally parallelized chemical plant, as described above. A second portion of the heat transfer medium continues to flow down into the 2-fold internally parallelized chemical plant, via the overlap of openings 95 in simple plate 90 and opening 25 in simple plate 100. Aligned openings 25 in simple plates 100–120 direct the heat transfer medium through the reactor to service a third heat exchanger defined by openings 135 in simple plate 130. The third heat exchanger thermally conditions mixed reactants/product flowing through mixing and reaction channels defined by openings 112 on simple plate 110. Because temperature control is critical to achieving quality reaction products, mixing and reaction channels defined by openings 112 on simple plate 110 are sandwiched between the second and third heat exchanger to maximize thermal control. The third heat exchanger also thermally conditions that portion of Reactant A that enters the second reaction unit (through openings 154 in simple plate 150).

The heat transfer medium flowing through the third heat exchanger exits the 2-fold internally parallelized chemical plant by flowing upwards through aligned openings 26 in simple plates 120, 110, and 100. The heat transfer medium from the third heat exchanger merges with the heat transfer medium from with the second heat exchanger in simple plate 90, to exit the 2-fold internally parallelized chemical plant as described above.

Also as described above, the flow of heat transfer medium once again splits at simple plate 130. Some heat transfer medium enters the heat exchanger defined by openings 135. That portion of the heat transfer medium then flows up and out of the 2-fold internally parallelized chemical plant as described above. Another portion of the heat transfer medium continues to flow down into the 2-fold internally parallelized chemical plant, via the overlap of openings 135 in simple plate 130 and opening 25 in simple plate 140. Aligned openings 25 in simple plates 140–180 direct the heat transfer medium through the reactor to service a fourth heat exchanger defined by openings 135 in simple plate 190. The fourth heat exchanger thermally conditions mixed reactants/product flowing through mixing and reaction channels defined by openings 112 on simple plate 210, as well as the portion of Reactant B that enters the second reaction unit (through openings 72 in simple plate 170).

The heat transfer medium flowing through the fourth heat exchanger exits the 2-fold internally parallelized chemical plant by flowing upwards through aligned openings 26 in simple plates 180, 170, 160, 150, and 140. The heat transfer medium from the fourth heat exchanger merges with the heat transfer medium from the third heat exchanger in simple plate 130, to exit the 2-fold internally parallelized chemical plant as described above.

Once again, the flow of heat transfer medium splits at simple plate 190, such that some heat transfer medium enters the fourth heat exchanger defined by openings 95, and a still further portion of the heat transfer medium continues to flow down into the 2-fold internally parallelized chemical plant, via the overlap of openings 95 in simple plate 190 and opening 25 in simple plate 200. Aligned openings 25 in simple plates 200–220 direct the heat transfer medium through the 2-fold internally parallelized chemical plant to service a fifth heat exchanger defined by openings 95 in simple plate 230. Note that the fifth heat exchanger is the final heat exchanger noted above. The fifth heat exchanger thermally conditions mixed reactants/product flowing through mixing and reaction channels defined by openings 112 on simple plate 210, thus sandwiching the reaction channels of the second reaction unit between an upper heat exchanger in simple plate 190 and a lower heat exchanger in simple plate 230. The heat transfer medium flowing through the fifth heat exchanger exits the reactor by flowing upward through aligned openings 26 in simple plates 220, 210, and 200. The heat transfer medium from the fifth heat exchanger merges with the heat transfer medium from the heat exchanger in simple plates 190, 130, 90, and 30, and exits the reactor as described above.

Because no additional reaction units are present, the heat transfer medium does not continuing flowing downward (bottom plate 240 is immediately below the fifth heat exchanger). However, if an additional reaction unit were added to the reactor (enabling 3-fold internal parallelization), that reaction unit would be incorporated preceding the final heat exchanger, so the final heat exchanger would thermally condition the mixing and reaction channels of the last reaction unit added.

Figure 28B:
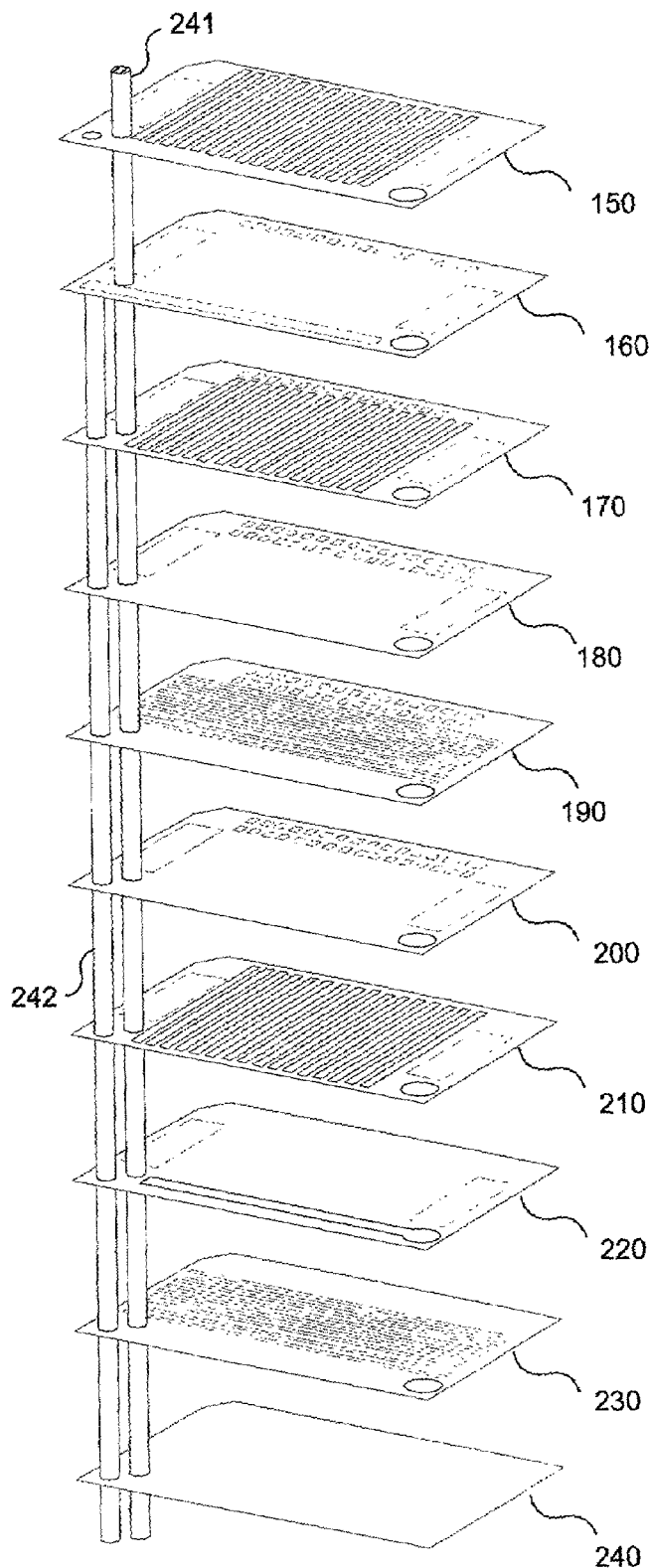
FIG. 28B is an exploded isometric view of a portion of the twenty-four simple plates of the internally paralleled reactor of FIG. 26 illustrating how plugs can be used to seal openings that are not required.

When a heat exchanger in the reactor "thermally conditions a fluid," it should be understood that the heat exchanger is actually enabling heat transfer through a solid section of a simple plate that is disposed between the simple plate that contains an opening defining the heat exchanger and the simple plate containing an opening that defines a fluid channel in which the fluid to be thermally conditioned flows. For example, heat transfer occurs between the heat transfer medium flowing through the first heat exchanger defined by openings 35 in simple plate 30 and Reactant A that is flowing in fluid channel defined by openings 54 in simple plate 50. The heat transfer is through the solid portions of simple plate 40 that overlie openings 35 in simple plate 30. Generally the heat transfer medium used in the reactor will be a liquid, although it is envisioned that liquid/gas-mixtures, fluid/solid mixtures as well as selected gases may also be beneficially employed. FIG. 28B illustrates how plugs 241 and 242 are inserted through bottom simple plate 240 to fill openings 12 and 14 when they are not needed to divert a flow of Reactant A and B to any subsequent reaction unit. Plugging these openings eliminates a dead volume, and enables identical simple plates to be used for both the first and second reaction units. As noted above, if unnecessary openings 12 and 14 from the second reaction unit are eliminated, additional configurations of simple plates will be required, complicating the fabrication process. Plug 241 fills unneeded openings 14 in simple plates 150–240, while plug 242 fills unneeded openings 12 in simple plates 170–240. Note that because FIG. 28B is an exploded isometric view, plugs 241 and 242 are shown greatly exaggerated in length. In reality, the length of each plug will be equal to the total thickness of the simple plates in which the plug is used to seal openings. Thus, plug 241 is only as long as the total thicknesses of simple plates 150–240, while plug 242 will be slightly shorter, being as long as the total thicknesses of simple plates 170–240. When plugs 241 and 242 are employed, an n-fold internally parallelized chemical plant reactor can be assembled from simple plates of 12 different configurations, as follows:

| | |
|---|---|
| Configuration #1 | Simple plate 10; |
| Configuration #2 | Simple plate 20; |
| Configuration #3 | Simple plates 30, 130 and 230; |
| Configuration #4 | Simple plates 40 and 140; |
| Configuration #5 | Simple plates 50 and 150; |
| Configuration #6 | Simple plates 60 and 160; |
| Configuration #7 | Simple plates 70 and 170; |
| Configuration #8 | Simple plates 80, 100, 180 and 200; |
| Configuration #9 | Simple plates 90 and 190; |
| Configuration #10 | Simple plates 110 and 210; |
| Configuration #11 | Simple plates 120 and 220; and |
| Configuration #12 | Simple plate 240. |

Additional reaction units can be added by incorporating duplicates of simple plates 30–120. It should also be noted that if additional plugs are used, having a size and shape corresponding to openings 15, 16, and 18 in top simple plate 10, then a duplicate of top simple plate 10 can be used for bottom simple plate 240, reducing by one the number of different configurations of simple plates required to assemble an n-fold internally parallelized chemical plant. Thus, only 11 different configurations of simple plates are required, as follows:

| | |
|---|---|
| Configuration #1 | Simple plate 10 and bottom plate 240; |
| Configuration #2 | Simple plate 20; |
| Configuration #3 | Simple plates 30, 130 and 230; |
| Configuration #4 | Simple plates 40 and 140; |
| Configuration #5 | Simple plates 50 and 150; |
| Configuration #6 | Simple plates 60 and 160; |
| Configuration #7 | Simple plates 70 and 170; |
| Configuration #8 | Simple plates 80, 100, 180 and 200; |
| Configuration #9 | Simple plates 90 and 190; |
| Configuration #10 | Simple plates 110 and 210; and |
| Configuration #11 | Simple plates 120 and 220. |

Simple plate 20 is quite similar to simple plates 120 and 220. If either simple plate 120 or 220 is substituted for simple plate 20, then some dead volume will be included in the second simple plate of the stacked plate reactor. Because the dead volume is associated with the product exiting the reactor, in reactors that operate continuously, and for reactions in which some additional product residence time within the reactor is acceptable, such a substitution is likely to be acceptable. In this case, simple plates having only 10 different configurations are required, as follows:

| | |
|---|---|
| Configuration #1 | Simple plate 10 and bottom plate 240; |
| Configuration #2 | Simple plates 20, 120 and 220; |
| Configuration #3 | Simple plates 30, 130 and 230; |
| Configuration #4 | Simple plates 40 and 140; |
| Configuration #5 | Simple plates 50 and 150; |
| Configuration #6 | Simple plates 60 and 160; |
| Configuration #7 | Simple plates 70 and 170; |
| Configuration #8 | Simple plates 80, 100, 180 and 200; |
| Configuration #9 | Simple plates 90 and 190; and |
| Configuration #10 | Simple plates 110 and 210; |

Finally, the configurations of simple plates 50 and 150 (Configuration #5) are very similar to the configurations of simple plates 110 and 210 (Configuration #11). The mixing and reaction channels in simple plates 110 and 210 (defined by openings 112) are oriented and positioned identically to Reactant A distributor fluid channels in simple plates 50 and 150 (defined by openings 54); however, the mixing and reaction channels are approximately 5 percent longer. This difference is due to the offset between the Reactant A manifolds of simple plate 40 and 140 (defined by openings 44) and the product collection channels of simple plates 120 and 220 (defined by openings 118). To further reduce the number of different configurations of simple plates required, the configuration of simple plates 110 and 210 could be used for simple plates 50 and 150. This would generate additional volume in the Reactant A thermal preconditioning channels which would mean that the volumes of the Reactant A distributor fluid channels and the Reactant B distributor fluid channels (defined by openings 72 on simple plates 70 and 170) are not the same. Such differences in volume will affect the residence time distribution of Reactants A and B within each reaction unit, and will also result in different pressure drops between the reactants. Because this difference would result in less than ideal mixing dynamics, this embodiment is generally less preferred, as such a difference is likely to have a measurable effect on product quality (unless reducing the number of different configurations of plates is more important than product quality). Depending on the reaction in question, the effect may or may not be acceptable. If employed, this substitution (combined with the other substitutions suggested above) would require simple plates with only 9 different configurations, as follows:

| | |
|---|---|
| Configuration #1 | Simple plate 10 and bottom plate 240; |
| Configuration #2 | Simple plates 20, 120 and 220; |
| Configuration #3 | Simple plates 30, 130 and 230; |
| Configuration #4 | Simple plates 40 and 140; |
| Configuration #5 | Simple plates 50, 110, 150 and 210; |
| Configuration #6 | Simple plates 60 and 160; |
| Configuration #7 | Simple plates 70 and 170; |
| Configuration #8 | Simple plates 80, 100, 180 and 200; and |
| Configuration #9 | Simple plates 90 and 190. |

An additional alternative would use the configuration of simple plates 50 and 150 for the mixing and reaction channels of simple plates 110 and 210, so that Reactant A thermal preconditioning channels and Reactant B thermal preconditioning channels would be of substantially the same length, but the mixing and reaction channels would have slightly less volume. Such an alternative is likely to have little impact on product quality. Note that if this change is made, the shape and position of the product collection channels of simple plates 120 and 220 (defined by openings 118) would need to be modified to extend more toward the center of each simple plate so as to overlap openings 54 (see simple plates 50 and 150). In this case, openings 118 would be disposed similarly to openings 44 of simple plates 40 and 140, but with an extension enabling openings 118 to overlap openings 18 of the adjacent simple plates.

As discussed above, the simple plates of each reaction unit are preferably irreversibly bonded together to achieve a pressure tight fit, so that the resulting stacked plate reactor is free from leaks. While theoretically, n-fold internal parallelization can be achieved with any reasonable number of reaction units, it is likely that attempting to bond too many simple plates together will be challenging. A working 2-fold internally parallelized chemical plant (having 24 plates as described above) has been fabricated and successfully operated. It is anticipated that a 1000-fold internally parallelized chemical plant is readily achievable. To facilitate the production of such scaled up chemical plants, up to 10 irreversibly bonded reactor units will be irreversibly joined to generate reactor stacks, up to 100 of which can then be reversibly joined to produce the desired 1000-fold internally parallelized chemical plant. Sealing between reactor stacks can be enhanced using conventional flat seals or O-rings. Preferably, the reactor stacks are reversibly joined, such that a reactor stack that experiences a failure (a bond failure, or clogging of the fluid channels in a specific reaction unit) can be removed from the chemical plant and replaced with a fresh reactor stack. Using a combination of reversible and non-reversible bonding in this manner, it is contemplated that the stated 1000-fold internally parallelized chemical plant can be achieved. It is believed that neither residence time nor pump capacity is a practical limit on the degree of internal parallelization that can be achieved, but internal flow equipartition between the parallelized reaction units and reactor stacks must be ensured. Note that if lower n-fold internally parallelized chemical plants are desired (i.e., n=less than 10), individual reaction units may be reversibly joined together, so that individual reaction units can be replaced in the event of a reaction unit failure.

Including parallel fluid channels in a stacked plate reactor, such as those fluid channels defined by the openings shown in simple plates 30, 50, 70, 90, 110, 130, 150, 170, 190, 210 and 230 as described above, preferably is done in such a manner that flow equipartition throughout such channels is achieved. To obtain flow equipartition, two important concepts are employed. Each of these concepts are addressed in the following sections. A first concept is flow bifurcation, described below in conjunction with FIGS. 29–50. A second concept involves manipulating a dimension of individual fluid channels, which is described below in relation with FIGS. 51–66.

Stacked Plate Reactors Having Bifurcated Fluid Channels

FIGS. 29–46 relate to an embodiment of a stacked simple plate bifurcated reactor that incorporates bifurcated shaped openings, to provide fluid channels that exhibit substantially equal residence time distributions and hydrodynamic resistance for two fluids. It should be understood that while FIGS. 29–46 describe bifurcation applied to an individual reactor, such bifurcated fluid channels can be beneficially incorporated into the reaction units described above. Thus, in this embodiment, means for manipulating a flow of fluid in a bifurcated reactor to achieve a desired result comprises the bifurcated shaped openings. It is desired that the resulting reactor be capable of processing viscous fluids in parallel fluid channels with substantially equivalent residence time distributions. The ability to maintain equivalent residence times is expected to enhance the quality of a chemical product produced in the bifurcated reactor.

It should be noted that employing bifurcated shaped fluid channels enables substantially equivalent residence time distributions to be achieved more or less independently of the viscosity of a reactant, or a reactant mixture, or a chemical product flowing through such a bifurcated fluid channel. Other means for enabling substantially equivalent residence time distributions to be achieved, such as employing parallel fluid channels of varying width (which is described in detail below), are much more dependent on the transient viscosity behavior of the fluid flowing through the fluid channels.

The stacked plate bifurcated reactor employing bifurcated shaped openings preferably employs the simple plates described above. Also, the lengths of fluid paths associated with each reactant through the bifurcated reactor are preferably identical. In this embodiment of the stacked plate bifurcated reactor, which incorporates bifurcated reactant channels, a "stem" of each bifurcated reactant channel is in fluid communication with a corresponding fluid inlet, and the "branches" of each bifurcated reactant channel are in fluid communication with a processing volume (parallel mixing and reaction channels). A bifurcated product channel has branches that are in fluid communication with the processing volume described above, and a stem of the bifurcated product channel is in fluid communication with a corresponding product outlet. While in the stacked simple plate bifurcated reactor described below, the reactant inlets are disposed in a top simple plate and the product outlet is disposed in a bottom simple plate, additional openings can be included to provide a product fluid channel that exits the stacked plate bifurcated reactor via the top simple plate.

Figure 29:
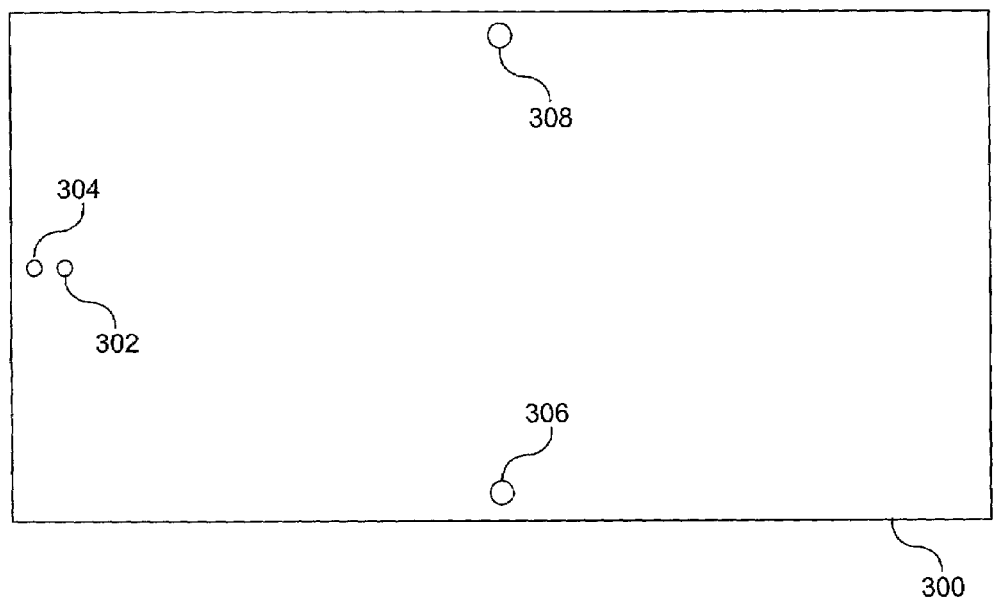
FIG. 29 is a plan view of a top simple plate of an embodiment for a stacked plate chemical reactor that incorporates bifurcated fluid channels illustrating openings for reactants and heat transfer media inlets and outlets.
Figure 30:
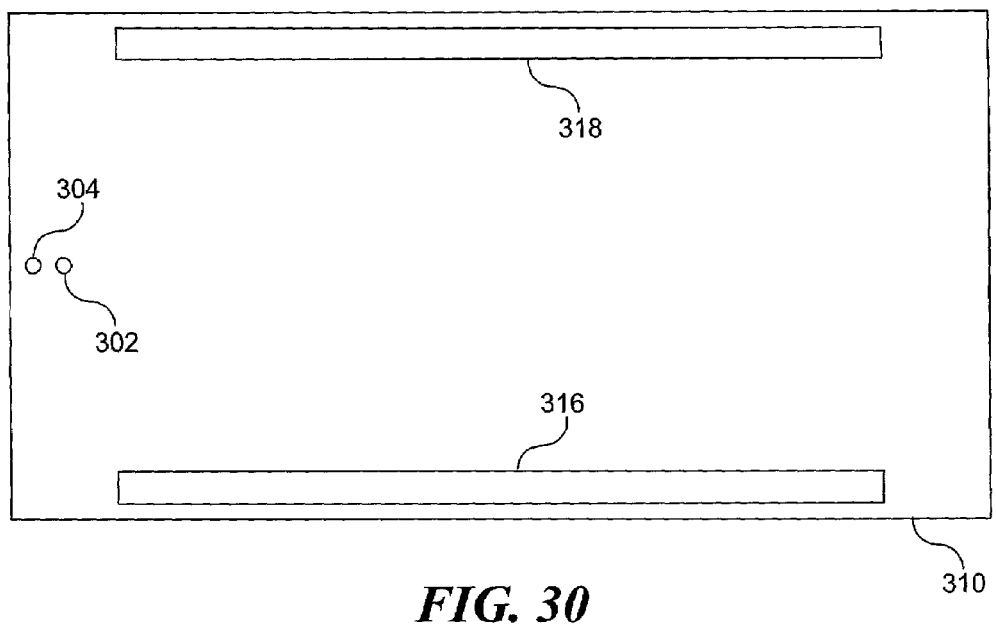
FIG. 30 is a plan view of the second simple plate of the embodiment for a reactor that incorporates bifurcated fluid channels showing a first reactant opening, a second reactant opening, and two heat exchanger manifold openings.
Figure 45:
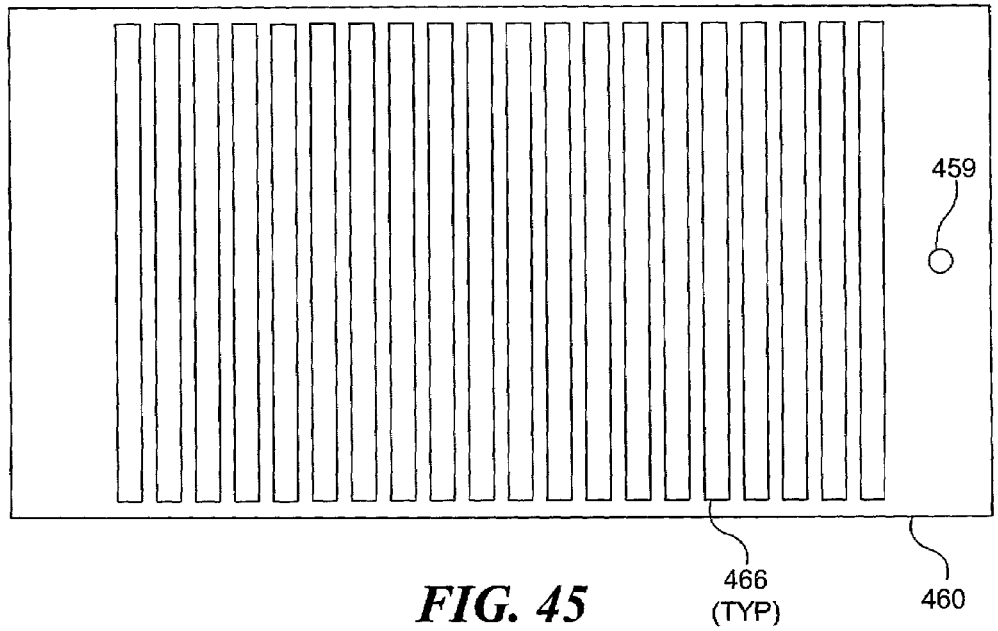
FIG. 45 is a plan view of the seventeenth simple plate of the embodiment for a reactor that incorporates bifurcated fluid channels illustrating a product outlet bore and a fourth heat exchanger.
Figure 46:
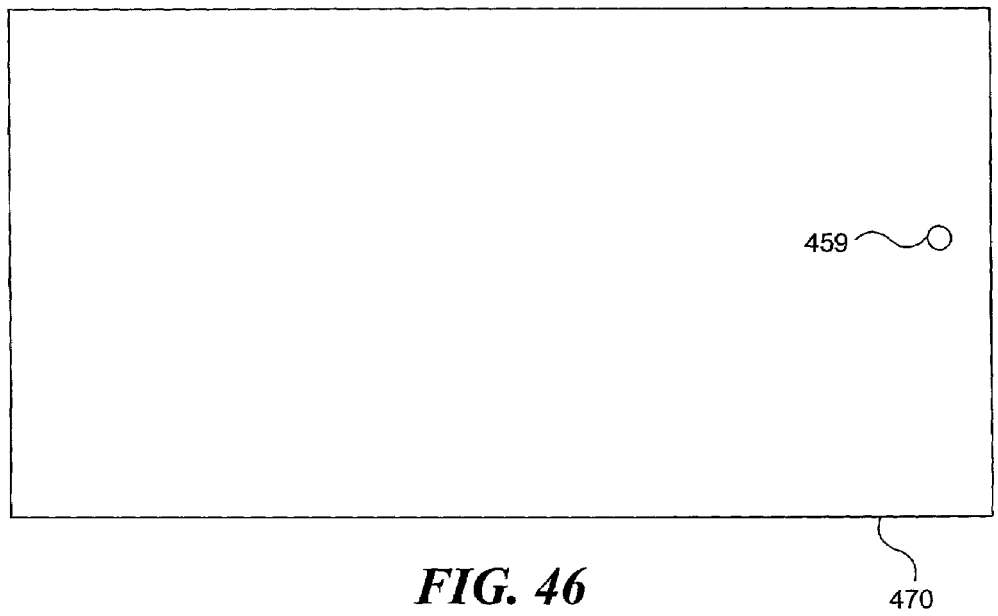
FIG. 46 is a plan view of the eighteenth simple plate of the embodiment for a reactor that incorporates bifurcated fluid channels illustrating a product collector outlet.
Figure 47:
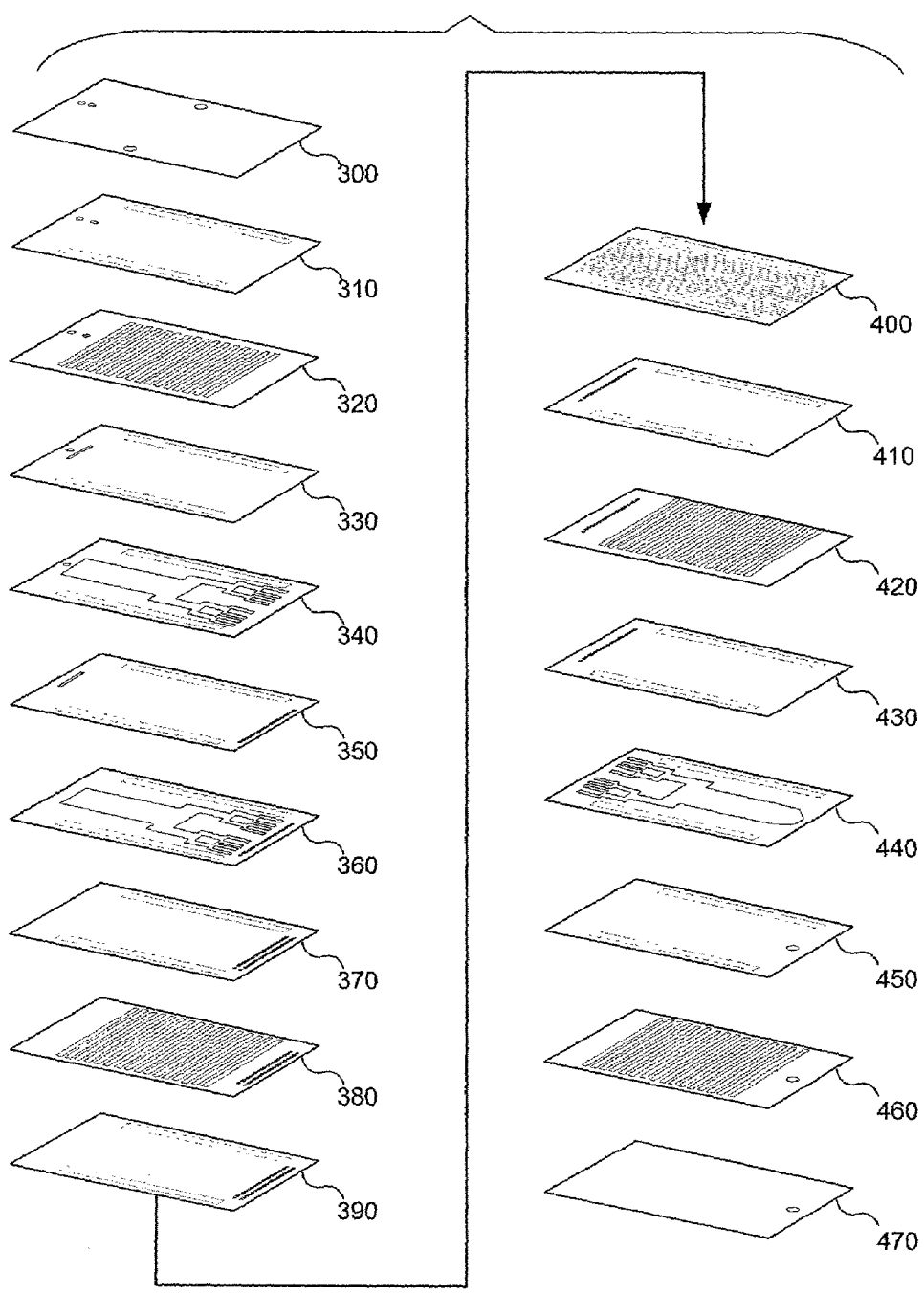
FIG. 47 is an exploded isometric view of the bifurcated reactor, illustrating how all eighteen simple plates are stacked.

FIGS. 29–46 illustrate a bifurcated reactor having 18 layers corresponding respectively to simple plates 300–470 stacked one on top of another, with FIG. 29 showing top simple plate 300, and FIG. 46 illustrating bottom simple plate 470. Note that the order of the simple plates from top to bottom in this reactor corresponds to the order of the Figure numbers. Thus, FIG. 29 represents the first layer; FIG. 30 represents the second layer, and so on. FIG. 47 shows the 18 simple plates, stacked one on top of another.

A preferred shape for the simple plates is generally rectangular, although other shapes, such as circular disks can also be used. While not specifically shown, it should be noted that all of the simple plates preferably include a chamfered corner shown in FIGS. 2–28B, to aid in the stacking of the plates in the proper orientation relative to each other. As noted above, if even a single plate is oriented in the wrong direction, it is likely that at least one, if not all, of the fluid paths through the bifurcated reactor would be blocked, disrupted, or improperly joined, and the bifurcated reactor would not be functional. A different type of indexing feature could also be used as an alignment reference, such as a slot or other mark or shape variation consistently represented on each simple plate.

With reference to FIG. 29, top simple plate 300 incorporates a plurality of openings for the heat transfer medium and reactants. Two reactant inlet ports are also provided, an opening 302 for a Reactant A, and an opening 304 for a Reactant B. Top simple plate 300 incorporates one heat transfer medium inlet 306 and one heat transfer medium outlet 308. While not shown, it is anticipated that one or more additional openings for temperature and other sensors can be beneficially incorporated into top simple plate 10 (as well as into subsequent simple plates), which when aligned with corresponding sensor openings in other simple plates, form sensor cavities or receptacles within the bifurcated reactor in which sensors can be inserted at a desired location within the stacked simple plate bifurcated reactor.

FIG. 30 illustrates the second layer of the bifurcated reactor, showing a second simple plate 310. Openings corresponding to every opening in simple plate 300 are also providing in simple plate 310; however, the openings for conveying the heat transfer medium are shaped differently. The heat transfer medium enters the bifurcated reactor through inlet 306 in simple plate 300 and passes through second simple plate 310 via a heat transfer medium A intake manifold opening 316. After progressing through subsequent simple plates of the bifurcated reactor, the "spent" heat transfer medium again passes through simple plate 310, this time via a heat transfer medium exhaust manifold opening 318. From that point, heat transfer medium exits the bifurcated reactor via outlet 308 in top simple plate 300.

Reactants A and B pass through second simple plate 310 via Reactant A opening 302 and Reactant B opening 304, respectively. The same reference numbers have been applied to simple plates 300 and 310 (as well as all subsequent plates) where the size, shape, and position of openings are unchanged.

Figure 31:
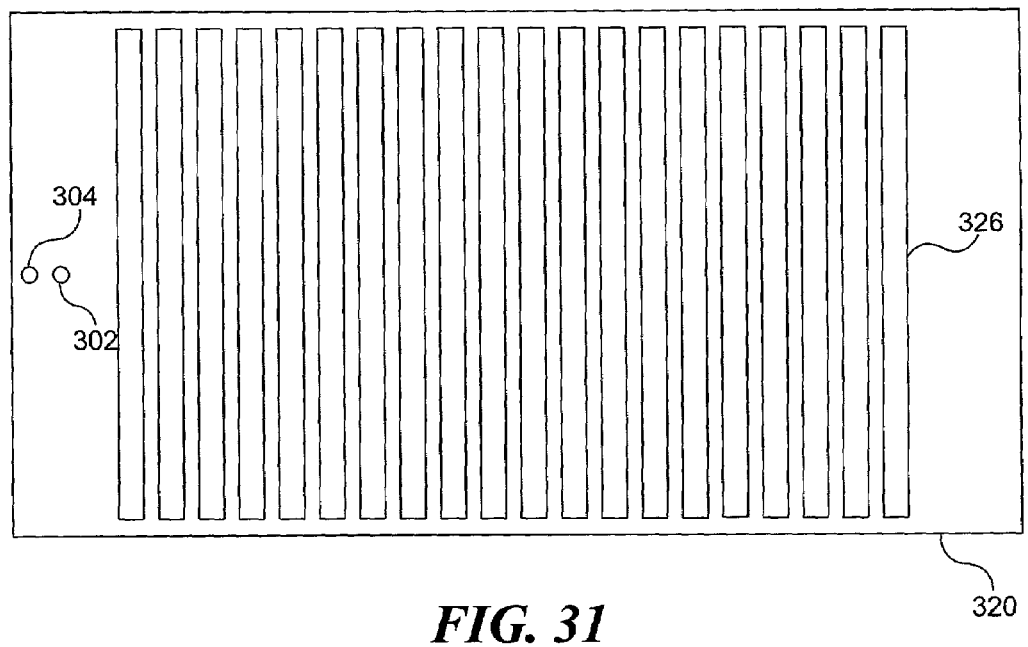
FIG. 31 is a plan view of the third simple plate of the embodiment for a reactor that incorporates bifurcated fluid channels illustrating a first reactant opening, a second reactant opening, and a first heat exchanger.

FIG. 31 provides details of the passages in the third layer of the bifurcated reactor. The heat transfer medium flows through third simple plate 320 via a plurality of fluid channels 326, which collectively comprise a first heat exchanger. As will be evident with respect to FIG. 47, the first heat exchanger thermally conditions Reactant A, before Reactant A is mixed with Reactant B. A portion of the heat transfer medium continues to flow through subsequent simple plates, where fluid channels 326 overlap heat transfer medium openings in adjacent simple plates. The fluid paths of the heat transfer medium and of other fluids throughout the bifurcated reactor, can be more readily visualized by inspection of FIG. 47.

Figure 32:
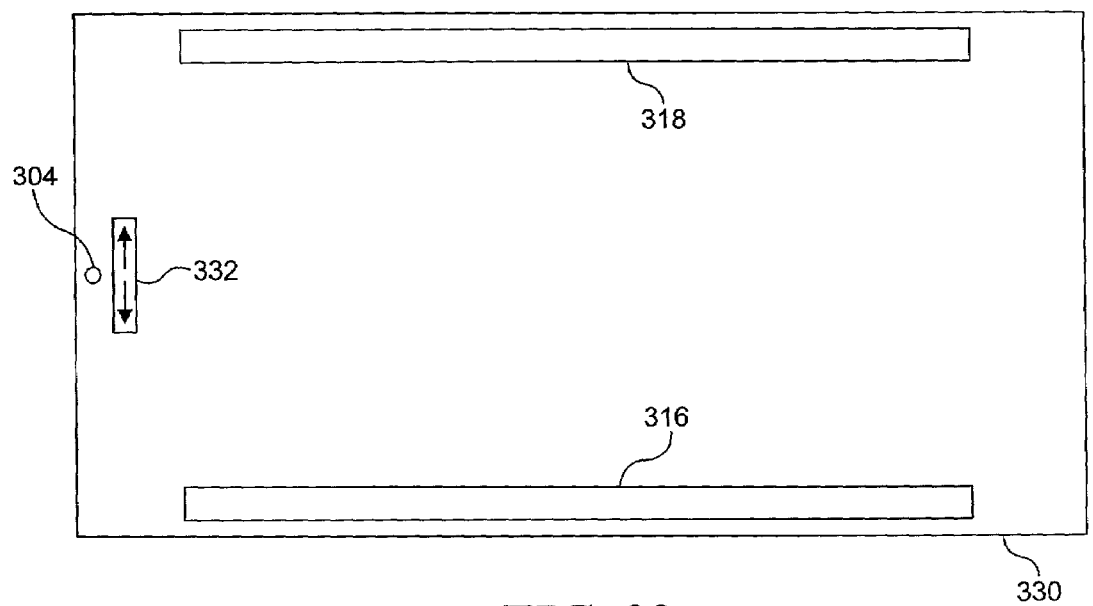
FIG. 32 is a plan view of the fourth simple plate of the embodiment for a reactor that incorporates bifurcated fluid channels illustrating a first reactant manifold, a second reactant opening, and two heat exchanger manifold openings.

FIG. 32 provides details of the fourth layer of the bifurcated reactor, showing a fourth simple plate 330, which includes an opening 332 that defines a manifold for Reactant A. Reactant B passes through fourth simple plate 330 via Reactant B opening 304. The heat transfer medium passes through fourth simple plate 330 via heat transfer medium intake manifold opening 316. After progressing through subsequent simple plates of the bifurcated reactor, the "spent" heat transfer medium again passes through simple plate 330, but this time, via heat transfer medium exhaust manifold opening 318.

Figure 33:
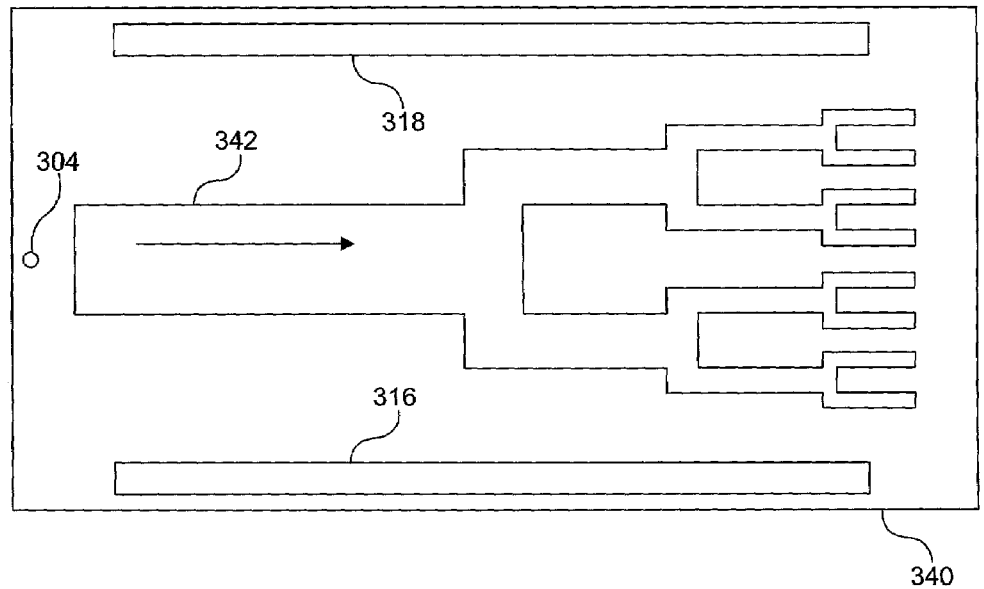
FIG. 33 is a plan view of the fifth simple plate of the embodiment for a reactor that incorporates bifurcated fluid channels illustrating a bifurcated first reactant distributor, a second reactant opening, and two heat exchanger manifold openings.

As shown in FIG. 33, a distributor for Reactant A is defined by a bifurcated opening 342. In simple plate 340, Reactant A enters the bifurcated opening at a stem as a single fluid stream and is then split into 2, 4, and finally, 8 different fluid streams. Reactant B passes through fifth simple plate 340 via Reactant B opening 304. Fifth simple plate 340 also includes heat transfer medium manifold openings 316 and 318.

Figure 34:
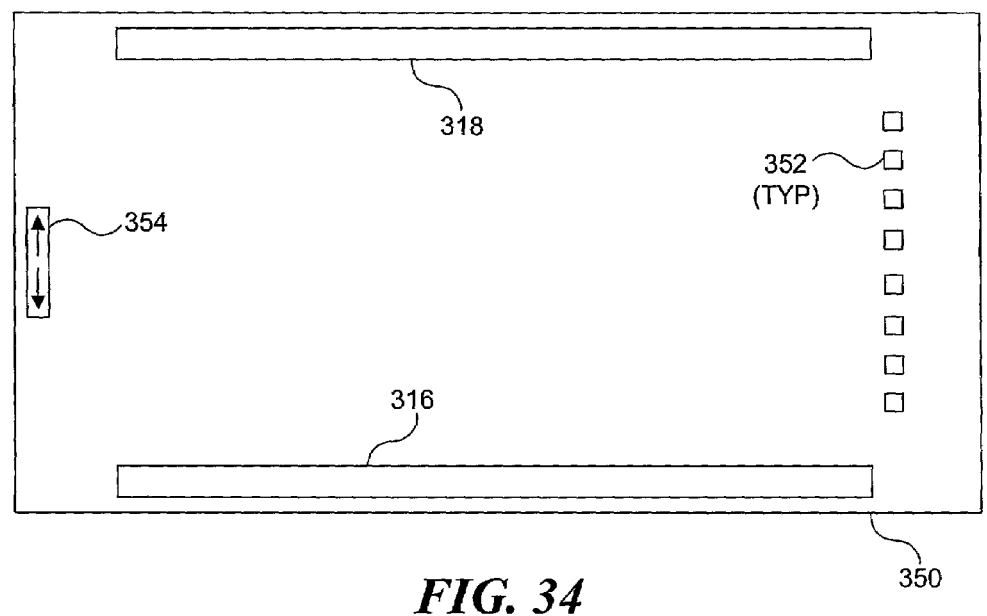
FIG. 34 is a plan view of the sixth simple plate of the embodiment for a reactor that incorporates bifurcated fluid channels illustrating a plurality of first reactant bores, a second reactant distributor, and two heat exchanger manifold openings.

FIG. 34 provides details of the sixth layer of the bifurcated reactor, showing a sixth simple plate 350, which includes opening 354 that defines a manifold for Reactant B. Reactant A passes through sixth simple plate 350 via a plurality of Reactant A openings 352, which correspond to the eight Reactant A fluid channels defined by the branches of bifurcated opening 342 of simple plate 340. The purpose of bifurcated opening 342 and openings 352 is to enable a flow of Reactant A to be processed in the reactor such that that a portion of Reactant A can be combined with a portion of Reactant B to form a product. The positioning of these reactants in the bifurcated reactor is important not only for ensuring that Reactant A and B are combined, but also so that flows of Reactant A and B can be laminated smoothly. As described above, the laminar flow condition facilitates particularly rapid and efficient diffusion mixing of the reactants. Sixth simple plate 350 also includes heat transfer medium manifold openings 316 and 318.

Figure 35:
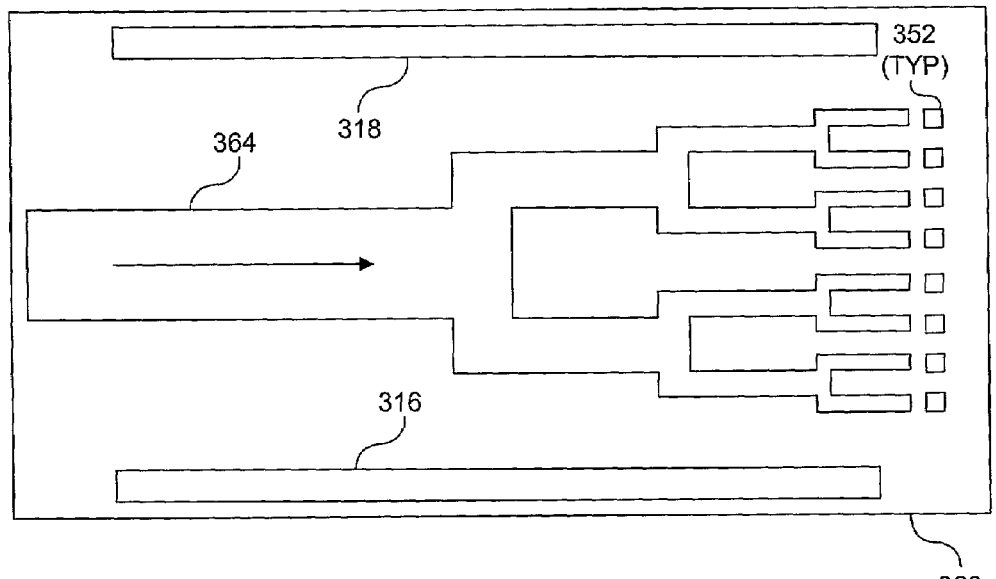
FIG. 35 is a plan view of the seventh simple plate of the embodiment for a reactor that incorporates bifurcated fluid channels illustrating a plurality of first reactant bores, a bifurcated second reactant distributor, a plurality of second reactant channels, and two heat exchanger manifold openings.

Seventh simple plate 360 of FIG. 35 includes a distributor for Reactant B that is defined by a bifurcated opening 364. In a manner similar to the flow path split of Reactant A in simple plate 360 of FIG. 33, Reactant B enters bifurcated opening 364 at a stem as a single fluid stream, and is then split into 2, 4, and finally, 8 different fluid streams. Reactant A passes through seventh simple plate 360 via the plurality of Reactant A openings 352. Seventh simple plate 360 also includes heat transfer medium manifold openings 316 and 318.

Figure 36:
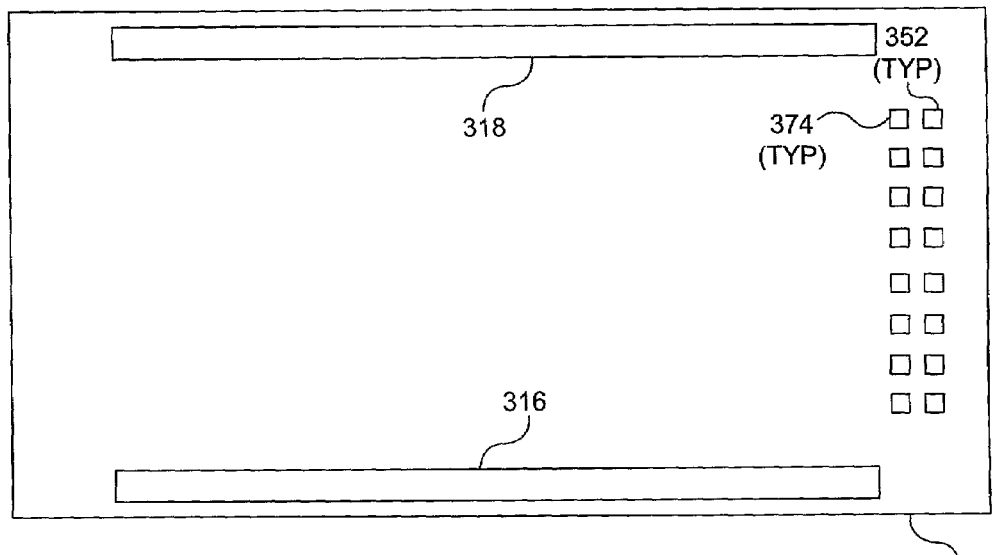
FIG. 36 is a plan view of the eighth simple plate of the embodiment for a reactor that incorporates bifurcated fluid channels illustrating a plurality of first reactant bores, a plurality of second reactant bores, and two heat exchanger manifold openings.

FIG. 36 provides details of the eighth layer of the bifurcated reactor, showing an eighth simple plate 370. Reactant A passes through eighth simple plate 370 via the plurality of Reactant A openings 352. Reactant B passes through eighth simple plate 370 via a plurality of Reactant B openings 374. The relative positions of openings 352 and 374 ensure that flows of Reactants A and B are properly disposed so that when introduced into mixing and reaction channels defined by openings in a subsequent plate, smooth lamination of Reactant A and B into the individual mixing and reaction channels is easily achieved. Eighth simple plate 370 also includes heat transfer medium manifold openings 316 and 318.

Figure 37:
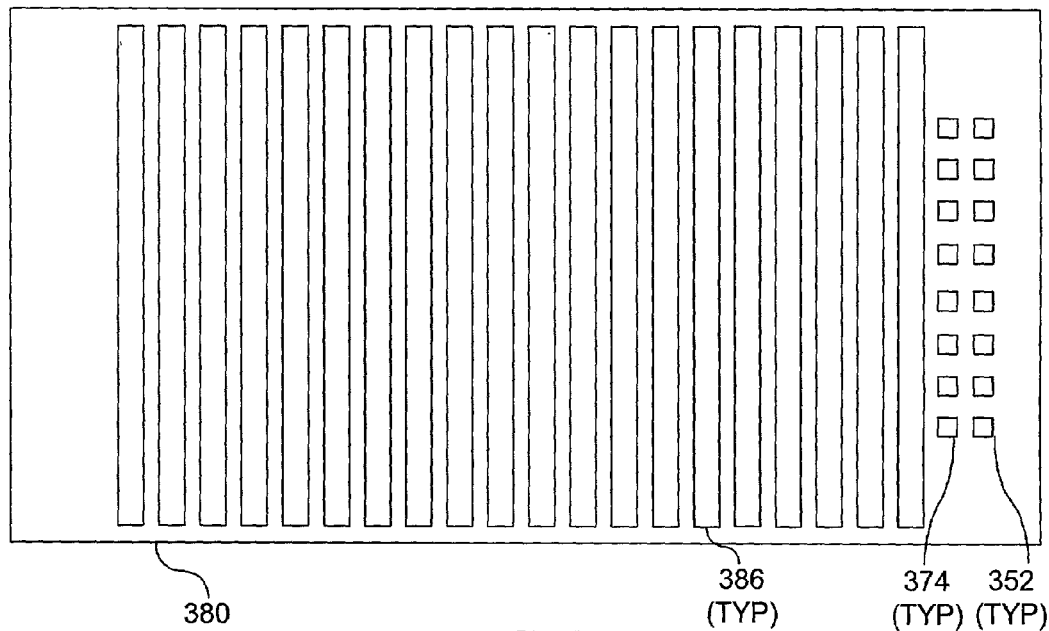
FIG. 37 is a plan view of the ninth simple plate of the embodiment for a reactor that incorporates bifurcated fluid channels illustrating a plurality of first reactant bores, a plurality of second reactant bores, and a second heat exchanger.

Ninth simple plate 380 of FIG. 37 includes a second heat exchanger defined by openings 386, through which heat transfer medium flows. As should be evident from FIG. 47, the second heat exchanger thermally conditions Reactant B before Reactant B is combined with Reactant A in mixing and reaction channels of simple plate 400. This thermal conditioning is described in more detail below. The heat exchanger defined by openings 386 also provides thermal conditioning of the mixing and reaction channels defined by openings on of simple plate 400. The heat transfer medium flowing in fluid passages defined by openings 386 is substantially orthogonal to a flow of Reactant B in fluid channels defined by bifurcated opening 354 of simple plate 360.

A portion of the heat transfer medium continues to flow through subsequent simple plates, where fluid channels 386 overlap heat transfer medium openings in adjacent simple plates. Reactant A passes through ninth simple plate 380 via the plurality of Reactant A openings 352, while Reactant B passes through ninth simple plate 380 via the plurality of Reactant B openings 374.

Figure 38:
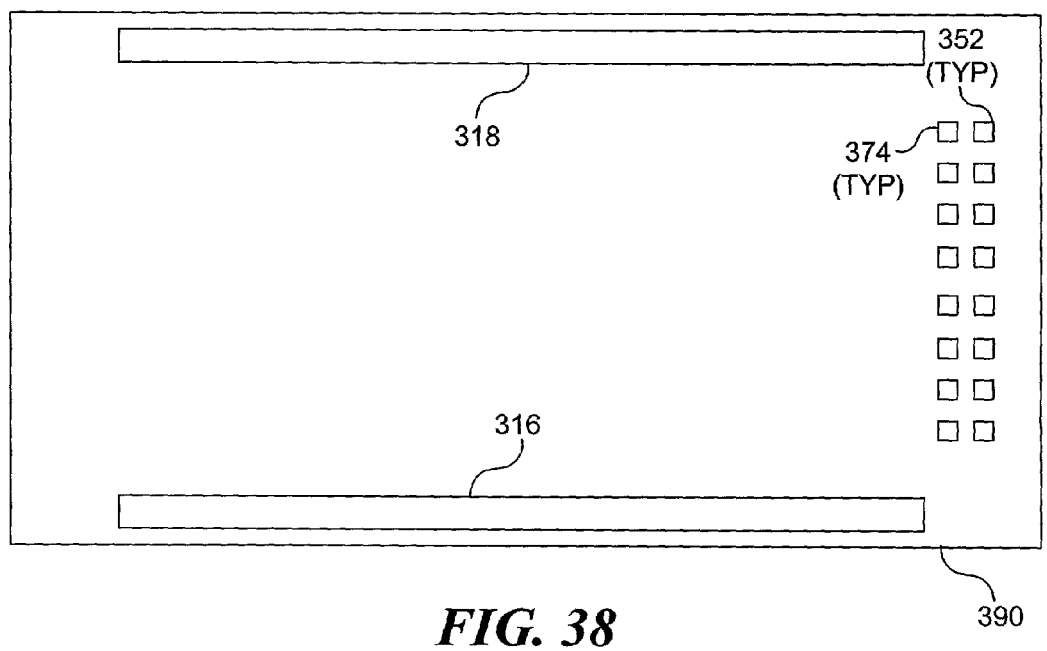
FIG. 38 is a plan view of the tenth simple plate of the embodiment for a reactor that incorporates bifurcated fluid channels illustrating a plurality of first reactant bores, a plurality of second reactant bores, and two heat exchanger manifold openings.

FIG. 38 illustrates details of the tenth layer of the bifurcated reactor, showing a tenth simple plate 390. Reactant A passes through tenth simple plate 390 via the plurality of Reactant A openings 352, and Reactant B passes through tenth simple plate 390 via the plurality of Reactant B openings 374. Tenth simple plate 390 further includes heat transfer medium manifold openings 316 and 318.

Figure 39:
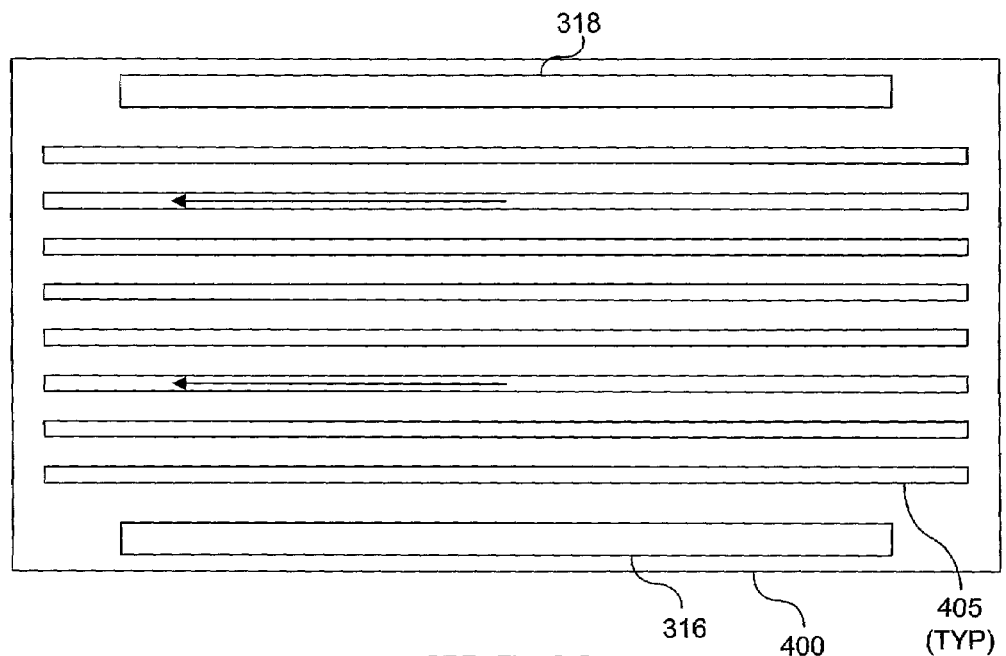
FIG. 39 is a plan view of the eleventh simple plate of the embodiment for a reactor that incorporates bifurcated fluid channels illustrating a plurality of mixing and reaction channels, and two heat exchanger manifold openings.

Eleventh simple plate 400 of FIG. 39 incorporates a plurality of openings 405 that define a plurality of mixing and reaction channels, which are the only mixing and reaction channels in the bifurcated reactor. The disposition of openings 405 relative to openings 352 (Reactant A) and openings 374 (Reactant B) ensures that flows of Reactant A and B can be laminated smoothly in each mixing and reaction channel. Due to the positions of openings 352 (see simple plate 390), Reactant A enters the mixing and reaction fluid channels defined by openings 405 first, and the flow of Reactant A is disposed on the bottom portion of the mixing and reaction fluid channels. The positions of openings 374 (see simple plate 390) causes Reactant B to enter the mixing and reaction fluid channels defined by opening 405 last, so that the flow of Reactant B is laminated atop Reactant A. Eleventh simple plate 400 also includes heat transfer medium manifold openings 316 and 318.

Figure 40:
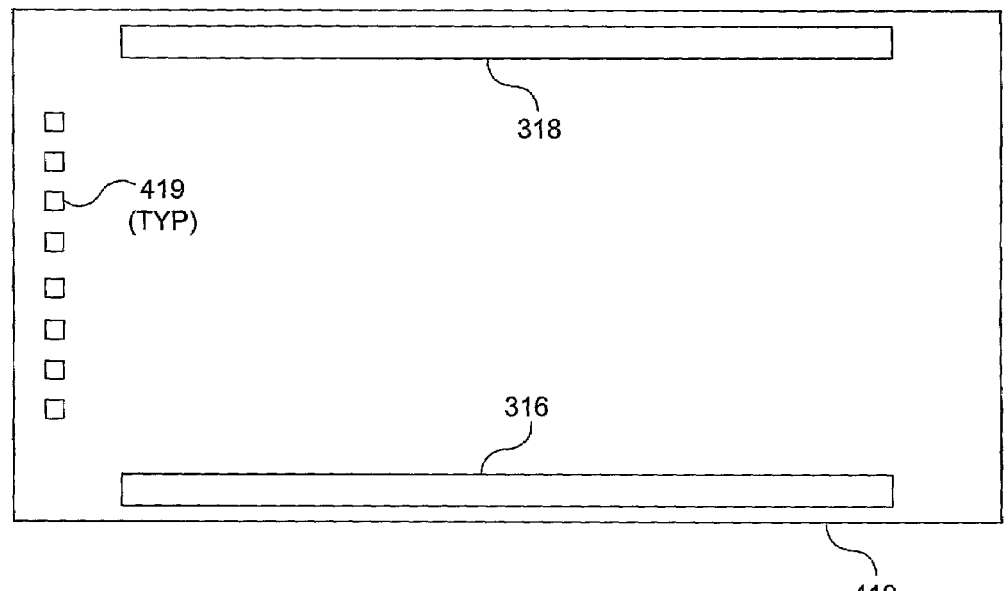
FIG. 40 is a plan view of the twelfth simple plate of the embodiment for a reactor that incorporates bifurcated fluid channels illustrating a plurality of product collector bores and two heat exchanger manifold openings.

FIG. 40 shows details of the twelfth layer of the bifurcated reactor, illustrating a twelfth simple plate 410, which includes a plurality of product collection openings 419. These openings define the passage to the product collection channels used to collect the product formed in the mixing and reaction channels defined by openings 405 in the prior simple plate. While in the internally parallelized reactor of FIGS. 2–28B, the product was then directed back through prior simple plates to exit the internally parallelized reactor via the top simple plate, in the bifurcated reactor of FIGS. 29–47, the product exits via a bottom simple plate. Twelfth simple plate 410 further includes heat transfer medium manifold openings 316 and 318.

Figure 41:
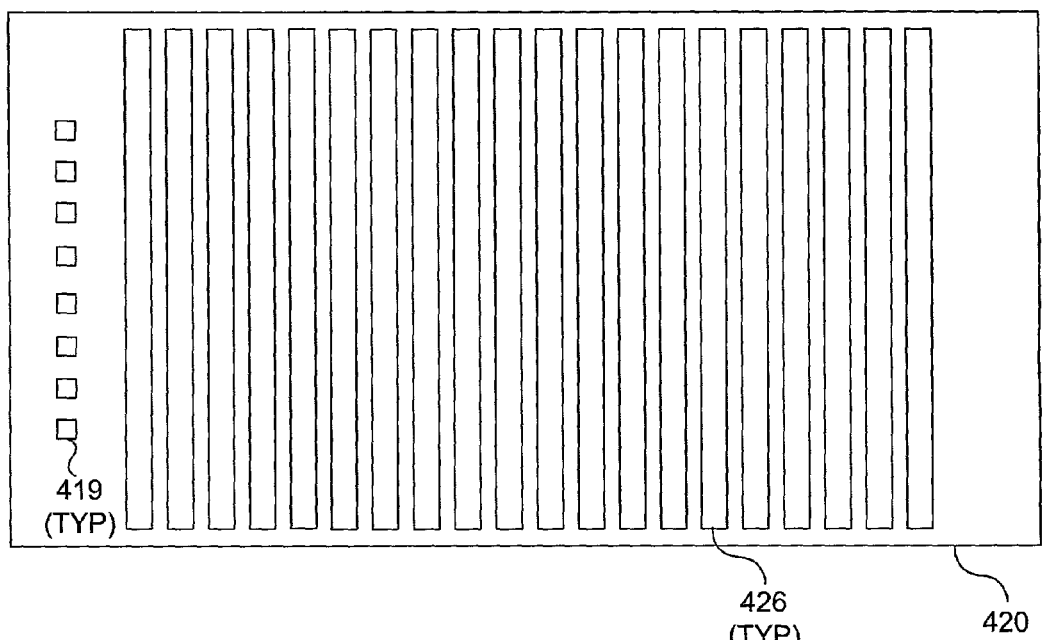
FIG. 41 is a plan view of the thirteenth simple plate of the embodiment for a reactor that incorporates bifurcated fluid channels illustrating a plurality of product collector bores and a third heat exchanger.

The thirteenth layer of the bifurcated reactor incorporates a third heat exchanger. FIG. 41 shows a thirteenth simple plate 420 that includes a third heat exchanger defined by openings 426. Thus, the heat transfer medium flows through thirteenth simple plate 420 via the plurality of fluid channels defined by openings 426. As is clear from inspecting FIG. 47, the third heat exchanger provides thermal conditioning to the plurality of mixing and reaction channels defined in openings 405 on simple plate 400, as well as a bifurcated product collection fluid path in a subsequent simple plate 440 (discussed in detail below). The direction of heat transfer medium flow in fluid passages defined by openings 426 is substantially orthogonal to that of the mixing reactants and product in fluid channels defined by openings 405. As indicated above, the heat transfer medium not only flows through fluid channels 426, but a portion of the heat transfer medium continues to flow through subsequent simple plates, where fluid channels 426 overlap heat transfer medium openings in adjacent simple plates.

As indicated more clearly in FIG. 47, because the temperature of the reactants and the resulting product is so critical to product yield and quality, the bifurcated reactor sandwiches mixing and reaction channels of the reactor (openings 405 of eleventh simple plate 400) between an upper and a lower heat exchanger, to enable enhanced temperature control. The heat exchangers in the present bifurcated reactor thermally condition a fluid flowing in channels defined by openings 405 of eleventh simple plate 400 by heat transfer through the intervening simple plates. Specifically, heat exchangers defined by openings in the ninth and thirteenth simple plates transfer heat through the tenth and twelfth simple plates, which are defined by the upper and lower walls of the mixing and reaction channels. Heat transfer through adjacent upper and lower simple plates on opposite sides of each heat exchanger is used to moderate the temperature of fluids flowing in fluid channels defined by two different simple plates disposed above and below each heat exchanger. Thus, the heat exchanger defined by openings 426 in simple plate 420 moderates a temperature of the fluid flowing in mixing and reaction channels 405 in simple plate 400, as well as that of a fluid flowing through a fluid path in a simple plate 440 (as described below, with respect to FIG. 43).

In the bifurcated reactor, use of a single heat exchanger to simultaneously thermally condition both a Reactant and a product flowing through openings in different simple plates is desirable. However, it is envisioned that in different embodiment of the stacked plate bifurcated reactor, multiple conditioning may be desirable. If so, a simple plate that does not readily conduct thermal energy could be used to isolate the upper heat exchanger to avoid undesired heat transfer and thermal conditioning in one direction. For example, the thickness and/or the thermal conductivity of the material employed to fabricate the simple plate would be selected so as to minimize heat transfer through it. With respect to the present bifurcated reactor, one desired characteristic of the material from which the simple plates are fabricated is that the material be thermally conductive, at least with respect to layers that are transferring thermal energy between a fluid channel and a heat exchanger. Note that if such a layer is sufficiently thin, then the thermal conductivity of most materials has little effect on the heat transfer efficiency of the resulting simple plate.

Figure 42:
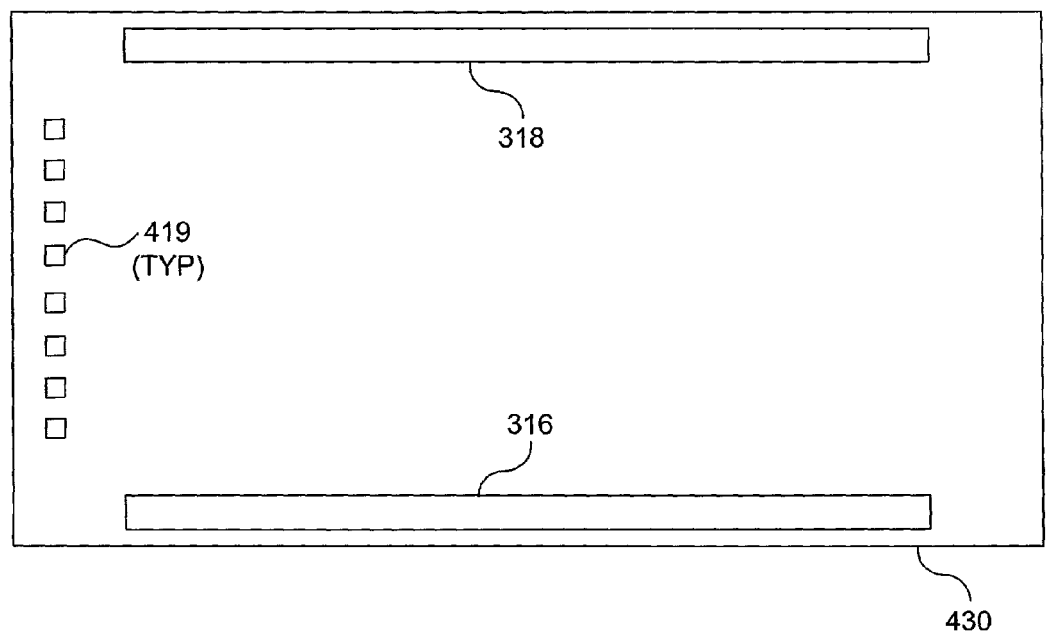
FIG. 42 is a plan view of the fourteenth simple plate of the embodiment for a reactor that incorporates bifurcated fluid channels illustrating a plurality of product collector bores and two heat exchanger manifold openings.

Upon comparing FIG. 42 with previously described FIG. 40, it will be apparent that a fourteenth simple plate 430 shown in FIG. 42 is substantially identical to twelfth simple plate 410. As should be evident from viewing FIG. 47, the eighteen layers of the preferred embodiment of a bifurcated reactor includes simple plates having 16 different configurations (simple plates 370 and 390 are also substantially identical to each other). As simple plate 410, simple plate 430 includes the plurality of product openings 419, and heat transfer medium manifold openings 316 and 318.

Fifteenth simple plate 440 includes a product collector that is defined by a bifurcated opening 449. Product from product openings 419 in simple plate 430 enters bifurcated opening 449 as eight different fluid streams at a branched end of bifurcated opening 449. The 8 fluid streams are combined into 4 streams, then into 2 streams, and finally into a single stream at a stem of bifurcated opening 449. This configuration essentially reverses the bifurcated openings employed as reactant distributors for Reactants A and B in simple plates 340 and 360, respectively. Fifteenth simple plate 440 also includes heat transfer medium manifold openings 316 and 318.

Figure 44:
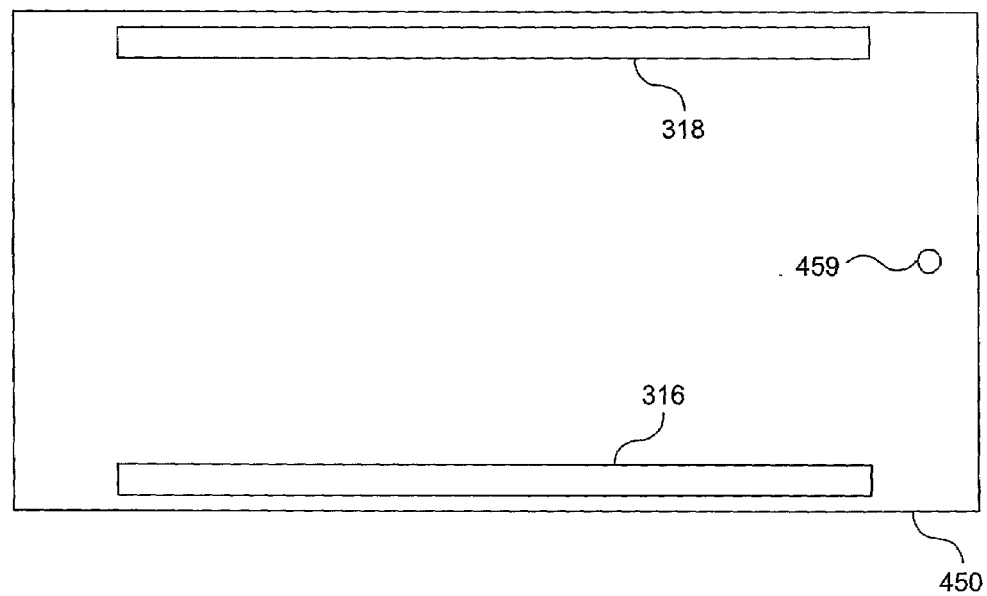
FIG. 44 is a plan view of the sixteenth simple plate of the embodiment for a reactor that incorporates bifurcated fluid channels illustrating a product outlet bore and two heat exchanger manifold openings.

FIG. 44 shows details of the sixteenth layer of the bifurcated reactor, illustrating a sixteenth simple plate 450, which includes a single product opening 459 that defines a product outlet fluid path. Sixteenth simple plate 450 also includes heat transfer medium manifold openings 316 and 318.

Seventeenth simple plate 460 of FIG. 45 incorporates a fourth heat exchanger of the bifurcated reactor, defined by openings 466. The fourth heat exchanger only modifies the temperature of the product flowing through the bifurcated product collector fluid path of simple plate 440, as the eighteenth layer is at the bottom of the reactor. Note that in previous heat exchangers, the heat transfer medium continued to flow through the simple plate defining the heat exchanger and into openings formed in subsequent simple plates. Because the fourth heat exchanger is adjacent to the bottom simple plate, the heat transfer medium simply flows back through the bifurcated reactor to the heat transfer medium outlet in the top simple plate. The flow of the heat transfer medium is substantially orthogonal relative to the flow of the product in the bifurcated product collector of simple plate 440. Seventeenth simple plate 460 also includes product opening 459.

The final layer of the bifurcated reactor is the eighteenth layer. FIG. 46 illustrates an eighteenth simple plate 470, which includes product opening 459 that serves as the product outlet from the bifurcated reactor. It should be noted that in the bifurcated reactor, the thickness of both top simple plate 300 and bottom simple plate 470 are significantly greater than the thickness of the intermediate simple plates. The greater thickness provides both greater structural integrity and rigidity, helps to thermally isolate the inner layers of the bifurcated reactor from the outside environment, provides space to mount connectors, and facilitates the bonding process.

FIG. 47 illustrates the stacked eighteen layers, each separately described above in regard to FIGS. 29–46. Note that simple plates 320, 380, 420, and 460 include openings that define the first, second, third, and fourth heat exchangers, respectively. Simple plates 340 and 360 include bifurcated openings that define reactant distributors for Reactants A and B, respectively and which split a single reaction fluid path into eight reaction fluid paths. Simple plate 400 includes the plurality of mixing and reaction channels, while simple plate 440 includes the bifurcated product collector, which combines eight different product fluid paths into a single product fluid path. Preferably, the dimensional thickness of each simple plate is similar to those described above with respect to the n-fold internally parallelized reactor and are as follows:

| Top simple plate 300: | 3.0 mm; |
|---|---|
| Simple plates 310–460 | 0.3 mm; and |
| Bottom simple plate 470: | 3.0 mm. |

As noted above, a plate thickness of 0.3 mm provides a reasonable heat transfer ability for a wide variety of materials from which the simple plates might be fabricated. Note that plates 310, 330, 350, 410, 430, 450 may be even thinner, such as 0.1 mm. If desired, some of the simple plates can be made thicker, to increase a volume of a fluid channel defined by an opening in that simple plate. For example, simple plates 320, 380, 420, and 460 include elongate openings disposed in a parallel array that define heat exchangers. To provide a larger volume of heat transfer fluid in any of those heat exchangers, the respective simple plate can be made thicker. Preferably, the thicknesses selected represent the commercially available thickness of sheet metal, reducing production costs.

Careful inspection of FIG. 47 should enable the function and purpose of the heat exchangers defined by simple plates 320, 380, 420, and 460 to be readily understood. The first heat exchanger, defined by openings 326 in simple plate 320, thermally conditions Reactant A that is flowing through the bifurcated opening of simple plate 340. Note that heat transfers through a solid portion of simple plate 310 relative to the first heat exchanger, but as top simple plate 300 is immediately adjacent to simple plate 310, there is no fluid flow for this heat transfer to thermally condition, and the heat transfer is relative to the ambient fluid surrounding the bifurcated reactor.

The second heat exchanger, defined by openings 386 in simple plate 380, thermally conditions both Reactant B flowing through the bifurcated opening of simple plate 360, and the mixed Reactants A and B flowing through the mixing and reaction channels defined by openings 419 in simple plate 400. The third heat exchanger, defined by openings 426 in simple plate 420, thermally conditions both the mixed Reactants A and B flowing through the mixing and reaction channels defined by openings 419 in simple plate 400, and the product flowing through the bifurcated product collector in simple plate 440. Finally, the fourth heat exchanger, defined by openings 466 in simple plate 460, thermally conditions the product flowing through the bifurcated product collector in simple plate 440.

Note that both the mixed Reactants A and B flowing through the mixing and reaction channels defined by openings 419 in simple plate 400, and the product flowing through the bifurcated product collector in simple plate 440 are thermally conditioned by the heat exchangers that "sandwich" these fluid channels, ensuring maximum thermal control. This thermal control is important to assure maximum product quality, as the temperatures in these areas have a significant impact on product quality, reaction yield and selectivity.

The bifurcated openings defining the reactant distributors and the product distributor ensure that even in the case of varying viscosities during a chemical reaction, the flow velocities, and hence, the residence time distribution for fluid flowing in the eight different fluid channels provided by the branches of the bifurcated openings, have substantially equivalent residence times. By controlling the residence times of the parallel flow channels, as well as by controlling temperature conditions, a high quality product can be produced by the bifurcated reactor.

While the bifurcated reactor includes bifurcated fluid paths defined by a single simple plate, it should be noted that bifurcated fluid paths can also be achieved by aligned openings on a plurality of simple plates. In this case, although requiring more layers to achieve bifurcation, each layer has a smaller amount of its surface area devoted to openings. Simple plates 340, 360, and 440 (those plates incorporating bifurcated openings) have a significant amount of their surface area devoted to openings. By using a plurality of stacked layers to define a bifurcated fluid path, rather than a single opening in a single simple pate, the complexity of the openings in the multilayer bifurcated fluid path are much simpler compared to the single bifurcated opening of simple plates 340, 360, and 440. Such simple openings are more readily manufactured.

Figure 43:
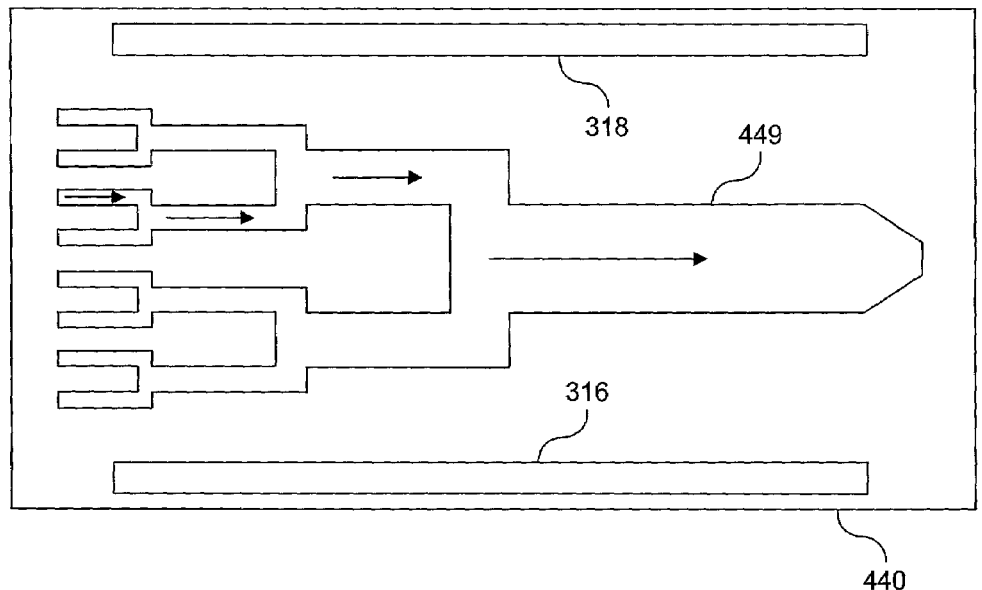
FIG. 43 is a plan view of the fifteenth simple plate of the embodiment for a reactor that incorporates bifurcated fluid channels illustrating a bifurcated product collector, and two heat exchanger manifold openings.
Figure 48:
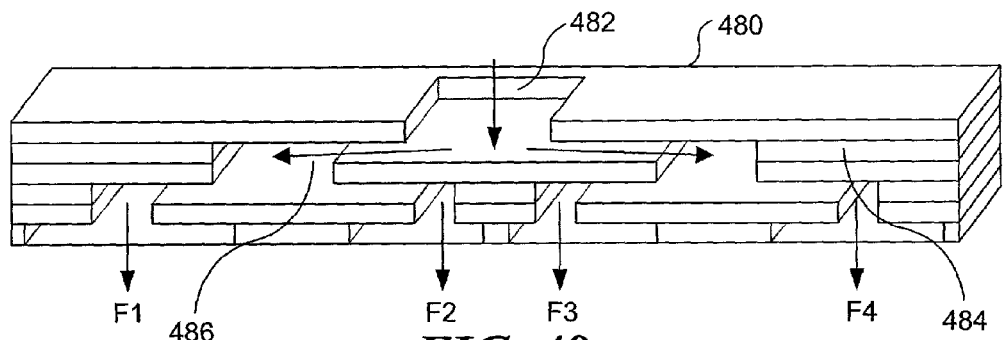
FIG. 48 is an isometric view of a portion of an alternate bifurcated reactor in which the bifurcation occurs over a series of adjacent plates rather than in a single plate.

FIG. 48 illustrates a portion of an alternate bifurcated reactor in which bifurcated fluid distribution is achieved not on a single plate (see FIGS. 33, 35, and 43 illustrating simple plates 340, 360, and 440), but instead using a plurality of aligned openings in a horizontally oriented stack of simple plates. Fluid enters the stacked bifurcated distributor of FIG. 48 via an opening 482 in a first simple plate 480. First simple plate 480 is not necessarily a top simple plate in a reactor, but is the first simple plate of the stacked bifurcated distributor which will be included in a larger stack of simple plates that define other fluid pathways such as heat exchangers and mixing and reaction channels. Due to the presence of an opening 486 in a second simple plate 484, fluid flow is first separated into two different flow paths; subsequent openings in later plates further bifurcate the fluid flow into four distinct fluid paths F1–F4, as indicated by the arrows in FIG. 48.

Figure 49:
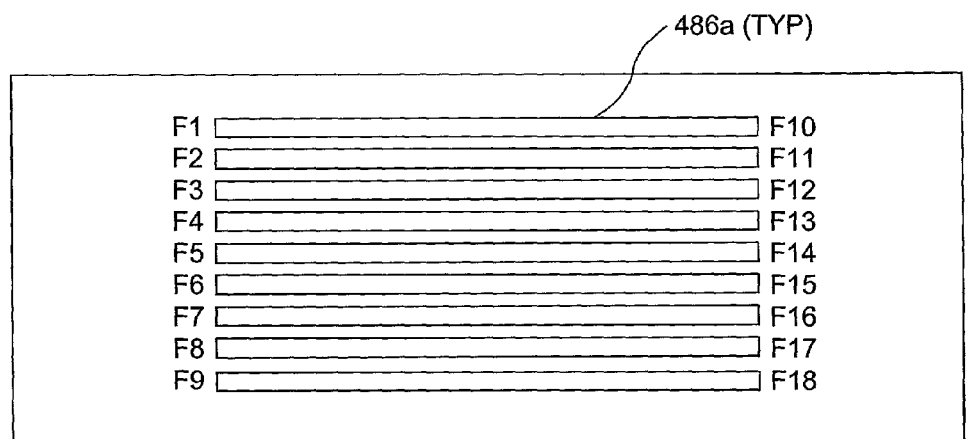
FIG. 49 is a plan view of a top plate in the portion of the alternate bifurcated reactor of FIG. 48.

FIG. 49 shows how second simple plate 484a is modified to provide even greater bifurcation. Note that simple plate 484a includes a plurality of openings 486a, such that each opening defines a separate fluid path. Thus, the nine openings define nine fluid paths, each of which are bifurcated into two different paths as described above, for a total of 18 distinct fluid paths.

Figure 50:
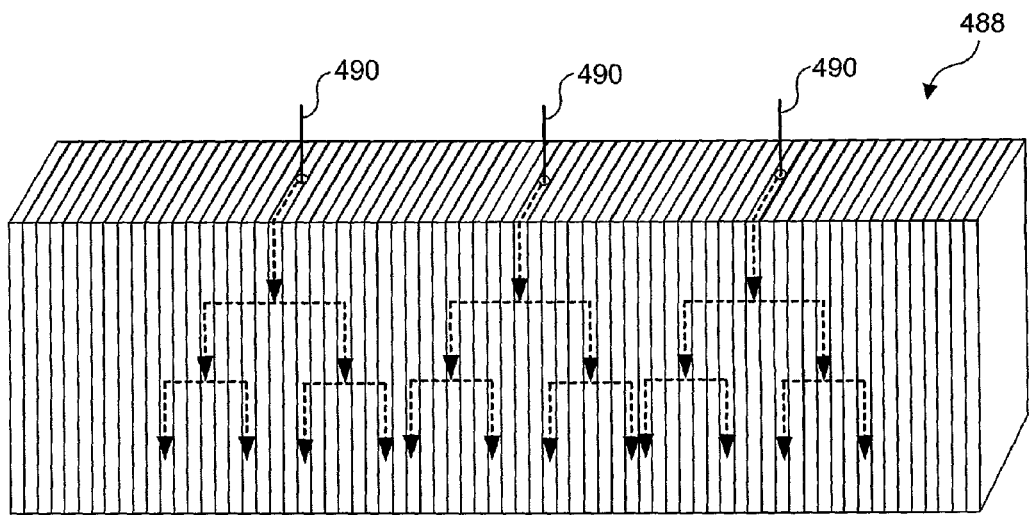
FIG. 50 is an isometric view of a portion of yet another embodiment of a bifurcated reactor in which the bifurcation occurs over a series of vertically oriented plates, rather than the horizontally oriented plates of FIG. 48.

FIG. 50 shows how aligned openings in simple plates stacked in a vertical orientation can also be used to achieve a vertically oriented bifurcated reactor 488. While three different single fluid paths 490 are shown bifurcating into four individual fluid paths (for a total of 12 distinct fluid paths), it should be understood that vertically oriented bifurcated reactors could be designed that include either more (or fewer) individual flow paths 490, as well as more (or fewer) levels of bifurcation. Accordingly, it should be understood that a bifurcated distributor can be achieved on a single simple plate (FIGS. 33, 35, and 43 illustrating simple plates 340, 360 and 440), over a horizontally oriented stack of simple plates (FIGS. 48 and 49), or even in a vertically oriented stack of simple plates (FIG. 50). The main advantage of a bifurcated distributor achieved via a horizontally oriented stack of simple plates or a vertically oriented stack of simple plates, as opposed to a single simple plate, is that the openings on each single plate in the horizontally oriented or vertically oriented stack are much less complicated than the openings on simple plates 340, 360, and 440. Simple plates having fewer and less complicated openings are much more robust for bonding.

Three different types of bifurcation have been described above. Horizontal bifurcation has been described within the plane of a simple plate (see FIGS. 33 and 35). Vertical bifurcation can be achieved by aligning a plurality of openings in a stack of simple plates (see FIGS. 48 and 49), where each bifurcated flow is split into two flows that are orientated parallel to the plane of the simple plates. Finally, mixed horizontal/vertical bifurcation is shown in FIG. 50, and is achieved by aligning a plurality of openings in a stack of simple plates, where each bifurcated flow is split into two flows that are orientated orthogonal to the plane of the simple plates.

Stacked Plate Reactors Having Parallel Fluid Channels of Different Widths

Equipartition of flow throughout parallel reaction fluid channels is difficult to achieve if the viscosity of a product is significantly different (i.e., greater than an order of magnitude) than the viscosity of the reactant mixture before the reactants have reacted to generate the product. Viscosities of a reaction mixture can change dramatically during a reaction. The viscosity of the reaction can increase during a reaction (e.g., reactions such as polymerizations or precipitations) or decrease during a reaction (e.g., reactions such as lysis). Reactions that result in such viscosity changes are quite common. Changes of the viscosity strongly affect the hydrodynamics of the fluidic networks within parallelized systems. In this embodiment of an internally parallelized reaction unit, the dimensions of the fluid channels are optimized to address such viscosity changes. For a given reaction having a predictable change in the viscosity of a product relative to a reactant mixture, flow equipartition is optimized by proper dimensional control of the common reactants distribution channels, the parallel fluid processing channels (i.e., mixing and reaction channels) and the common product collection channel. In particular, an optimal width of each fluid processing channel is determined individually. Traditionally, the dimensions (length, height, width) of each parallel fluid processing channel are identical.

The present invention preferably controls the relative widths of fluid processing channels (the variation of channel length or height have been shown to be less suitable). The width of a fluid channel is that dimension substantially orthogonal to the direction of the flow that is attributed to the plane of the simple plate, whereas the thickness of the simple plate defines the channel height. In reference to the simple plates of the present inventions, for the openings defining an array of parallel processing channels, a width of the opening is substantially smaller than the length of such an opening. The present invention similarly controls the width of each common reactant distribution channel, and of the common product collection channel.

FIGS. 51–64 relate to an embodiment of a stacked simple plate reactor that incorporates different width openings configured in a parallel array, such that the opening widths vary across the array. The widths vary from a narrowest opening on a first side of the array (farthest from the inlet servicing the array), to a widest opening on the opposing side of the array (closest to the fluid inlet servicing the array), to provide fluid channels that have substantially equal residence time distributions. In this embodiment the means for manipulating a flow of fluid in a reactor to achieve a desired result comprises the different width openings configured in a parallel array. The desired result is enabling viscous fluids to be processed in parallel fluid channels with substantially equivalent residence time distributions. Maintaining equivalent residence times should enhance the quality of a chemical product produced by the reactor. It should be understood that while FIGS. 51–64 describe such dimensioning as being applied to an individual reactor, dimensioning to optimize equipartition can be beneficially incorporated into the reaction units described above.

Selection of specific different widths used for the openings in the array of parallel fluid channels is a function of the viscosities of the reactants and product. The structure of such a reactor will be described first, followed by a discussion of the relationships employed to determine the widths of the openings.

Simple plates similar to those described above with respect to the internally parallelized reactor are used for a stacked plate reactor having parallel fluid channels whose widths vary; this type of reactor is hereinafter referred to as a "stacked plate variable width reactor" or simply as a "variable width reactor." The lengths of fluid paths associated with each reactant through the variable width reactor are preferably identical. In the variable width reactor, a widest fluid channel is in fluid communication with and disposed closest to a corresponding fluid inlet. The manner in which the widths of the parallel opening vary across the simple plate have been empirically or computationally determined to provide substantially equivalent residence time distributions for fluids flowing through the array of parallel fluid channels. While in the variable width stacked plate described below, the reactant inlets, heat exchanger inlets and outlets, and product outlets are all disposed in a top simple plate, one or more of those inlets/outlets could be disposed in a bottom simple plate, so long as the required openings in the simple plates defining the reactor include the required openings for the appropriate internal fluid paths.

Figure 52:
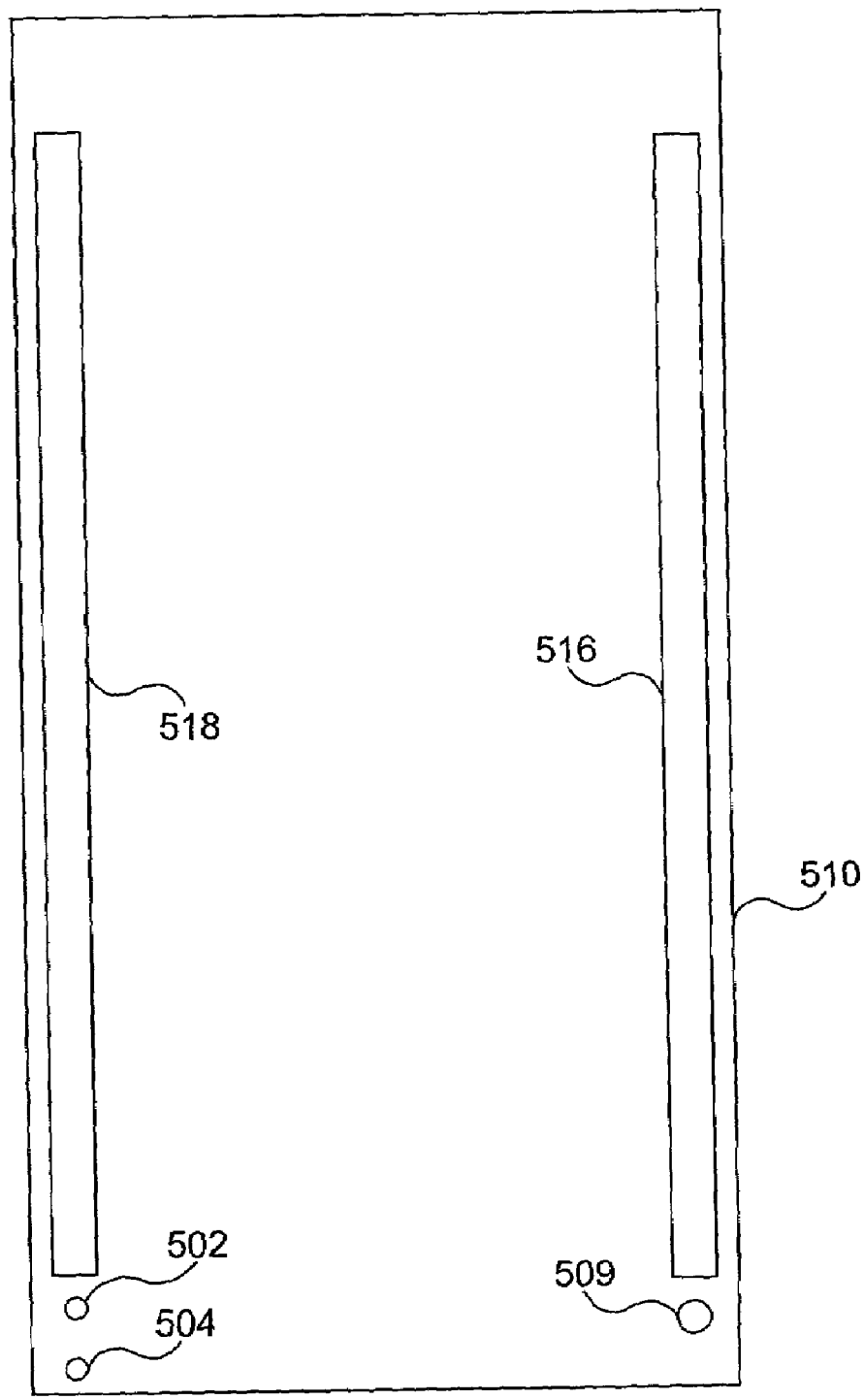
FIG. 52 is a plan view of the second simple plate of the embodiment for a stacked plate chemical reactor that incorporates a parallel array of different width fluid channels showing a first reactant opening, a second reactant opening, a product opening, and two heat exchanger manifold openings.

FIGS. 51–63 illustrate 13 layers representing corresponding simple plates 500–620, with FIG. 51 representing top simple plate 500, and FIG. 63 illustrating bottom simple plate 620. The variable width reactor thus includes 13 simple plates, stacked one on top of another, in 13 layers. Note that the order of the simple plates from top to bottom in this embodiment again corresponds to the order of the figure numbers. Accordingly, FIG. 51 represents the first layer, FIG. 52 represents the second layer, and so on. FIG. 64 shows the orientation of the 13 simple plates stacked one on top of another.

As with the reactors described above, a preferred shape for the simple plates is generally rectangular, although other shapes such as circular disks can also be used. While not specifically shown, all plates preferably include the chamfered corner shown in FIGS. 2–28B, to aid in the stacking of the plates in the proper orientation relative to each other. As disclosed above, if even a single plate is oriented in the wrong direction, it is likely that at least one, if not all, of the fluid paths through the variable width reactor would be blocked, disrupted, or improperly joined, and the variable width reactor would not be functional.

With reference to FIG. 51, top simple plate 500 incorporates a plurality of openings for the heat transfer medium, reactants, and product. Two reactant inlet ports are provided, including an opening 502 for a Reactant A, and an opening 504 for a Reactant B. Top simple plate 500 incorporates one heat transfer medium inlet 506 and one heat transfer medium outlet 508, as well as a product opening 509. While not shown, it is anticipated that one or more additional openings for temperature sensors and other types of sensors can be beneficially incorporated into top simple plate 500 (as well as into subsequent simple plates), which when aligned with corresponding sensor openings in other simple plates form sensor cavities within the variable width reactor in which sensors can be inserted and disposed within the stacked simple plate variable width reactor.

FIG. 52 illustrates the second layer of the preferred variable width reactor, showing a second simple plate 510. Openings corresponding to every opening in simple plate 500 are also provided in simple plate 510; however, it should be noted however that the openings corresponding to heat transfer medium are shaped differently. The same reference numbers have been applied to simple plates 500 and 510 (as well as all subsequent plates) when the size, shape, and position of the openings are unchanged. The heat transfer medium enters the variable width reactor through inlet 506 in simple plate 500 and passes through second simple plate 510 via a heat transfer medium A intake manifold opening 516. After progressing through subsequent simple plates of the preferred variable width reactor, the "spent" heat transfer medium again passes through simple plate 510, this time via a heat transfer medium exhaust manifold opening 518. From that point, heat transfer medium exits the variable width reactor via outlet 508 in top simple plate 500. Product produced in mixing and reaction channels in subsequent layers passes through simple plate 510 via product opening 509. Reactants A and B pass through second simple plate 510 via Reactant A opening 502 and Reactant B opening 504, respectively.

Figure 53:
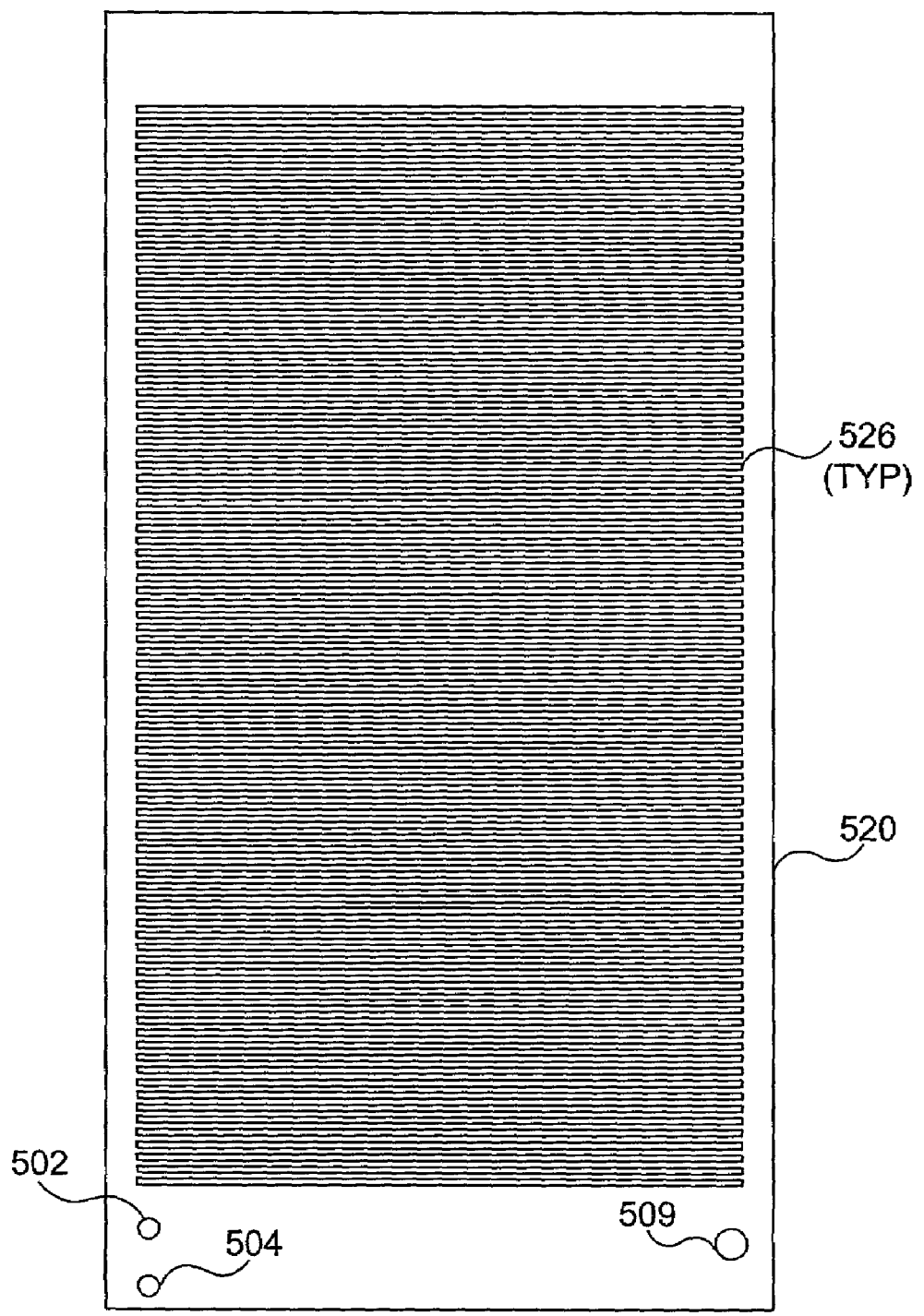
FIG. 53 is a plan view of the third simple plate of the embodiment for a stacked plate chemical reactor that incorporates a parallel array of different width fluid channels illustrating a first reactant opening, a second reactant opening, a product opening, and a first heat exchanger.

FIG. 53 provides details of the passages in the third layer of the variable width reactor. Heat transfer medium flows through third simple plate 520 via a plurality of fluid channels 526, which collectively comprise a first heat exchanger. As will be apparent with respect to FIG. 64, the first heat exchanger thermally conditions Reactant A, before Reactant A is mixed with Reactant B. The heat transfer medium now flows through fluid channels 526, and a portion of the heat transfer medium continues to flow through subsequent simple plates, where fluid channels 526 overlap heat transfer medium openings in adjacent simple plates. The fluid paths of the heat transfer medium and of other fluids throughout the variable width reactor can be more readily visualized in conjunction with FIG. 64. Product produced in subsequent layers passes through simple plate 520 via product opening 509, while Reactants A and B pass through third simple plate 520 via Reactant A opening 502 and Reactant B opening 504.

Figure 54:
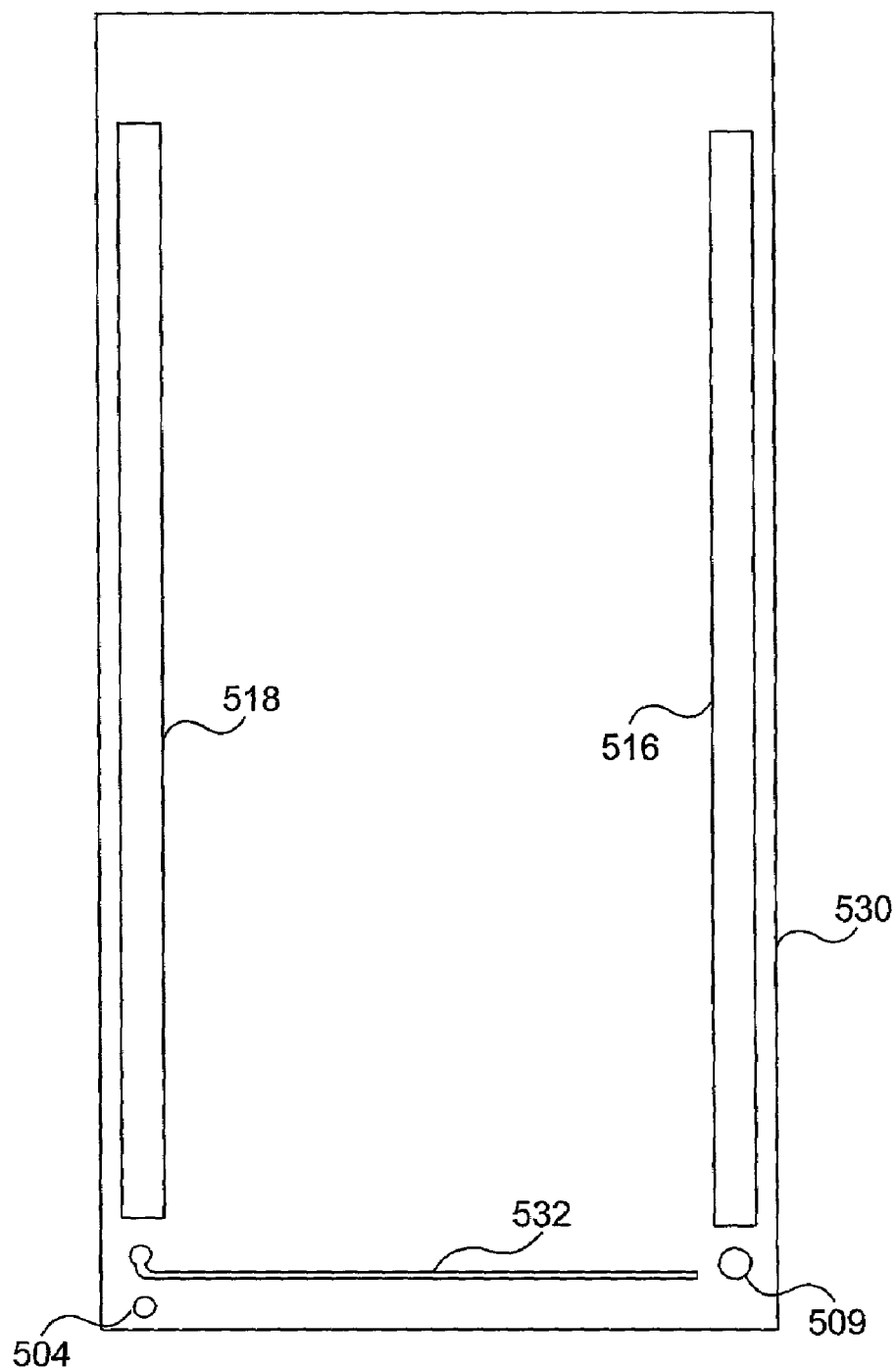
FIG. 54 is a plan view of the fourth simple plate of the embodiment for a stacked plate chemical reactor that incorporates a parallel array of different width fluid channels illustrating a first reactant manifold, a second reactant opening, a product opening, and two heat exchanger manifold openings.

FIG. 54 provides details of the fourth layer of the variable width reactor, showing a fourth simple plate 530, which includes an opening 532 that defines a manifold for Reactant A. Reactant B passes through fourth simple plate 530 via Reactant B opening 504. Heat transfer medium passes through fourth simple plate 530 via heat transfer medium intake manifold opening 516. After progressing through subsequent simple plates of the variable width reactor, the spent heat transfer medium again passes through simple plate 530, this time via heat transfer medium exhaust manifold opening 518. Product produced in subsequent layers passes through simple plate 520 via product opening 509.

Figure 55:
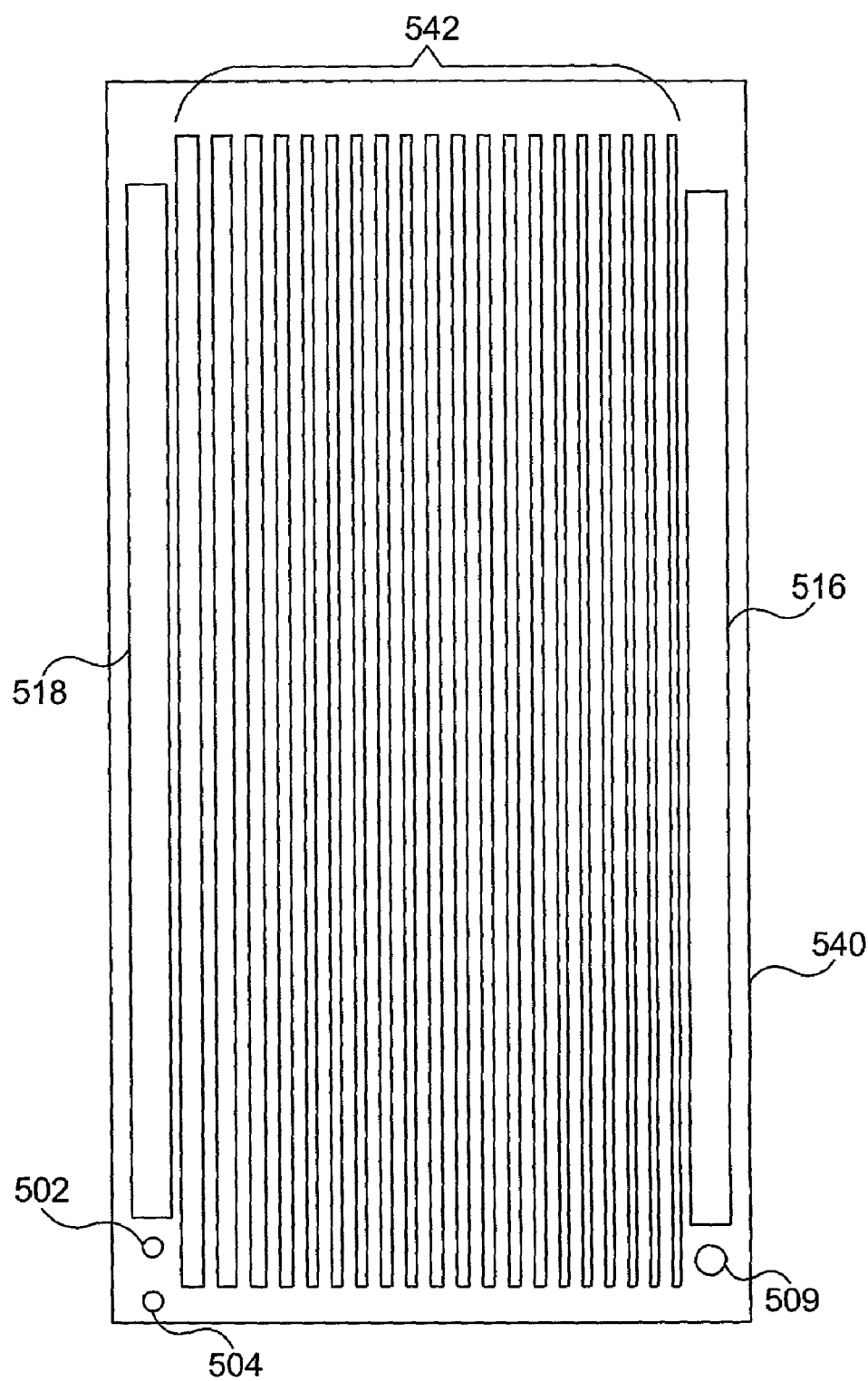
FIG. 55 is a plan view of the fifth simple plate of the embodiment for a stacked plate chemical reactor that incorporates a parallel array of different width fluid channels illustrating a first reactant opening, a second reactant opening, a first reactant distributor comprising a parallel array of different width openings, a product opening, and two heat exchanger manifold openings.

In FIG. 55, which illustrates details of the fifth layer of the variable width reactor, a distributor for Reactant A is defined by a plurality of variable width openings 542 in a fifth simple plate 540. Note that in simple plate 540, Reactant A is distributed into 20 different variable width openings 542 (each having a different width). The widest variable width opening 542 is disposed closest to the origin of the fluid that is introduced into variable width openings 542; i.e., closest to opening 502. Variable width openings 542 decrease in width in a generally linear progression, so that the narrowest opening is disposed the farthest away from opening 502. As the openings narrow in width, a velocity of the fluid flowing in the fluid channels defined by the openings (and the by solid portions of the adjacent simple plates) increases, so that a residence time for a fluid flowing through variable width openings 542 is substantially equivalent. Techniques for determining the different widths of variable width openings 542 are discussed below.

Note that Reactant A also passes through fifth simple plate 540 via opening 502. As will become clear with respect to the view of the variable width rector in FIG. 64, Reactant A opening 502 in fifth simple plate 540 is not required, because this embodiment of the variable width reactor includes only one set of mixing and reaction channels (i.e., includes only one reaction unit). However, if desired, additional simple plates for additional reaction units can be included as described above in conjunction with the n-fold internally parallelized reactor, so that an n-fold internally parallelized variable width reactor is achieved (for n greater than one). It should also be understood that opening 502 on simple plate 540 could be eliminated, if opening 502 is not required as a bypass, in order to provide Reactant A to an additional reaction unit. Reactant B passes through fifth simple plate 540 via Reactant B opening 504, and fifth simple plate 540 also includes heat transfer medium manifold openings 516 and 518, and product opening 509.

Figure 56:
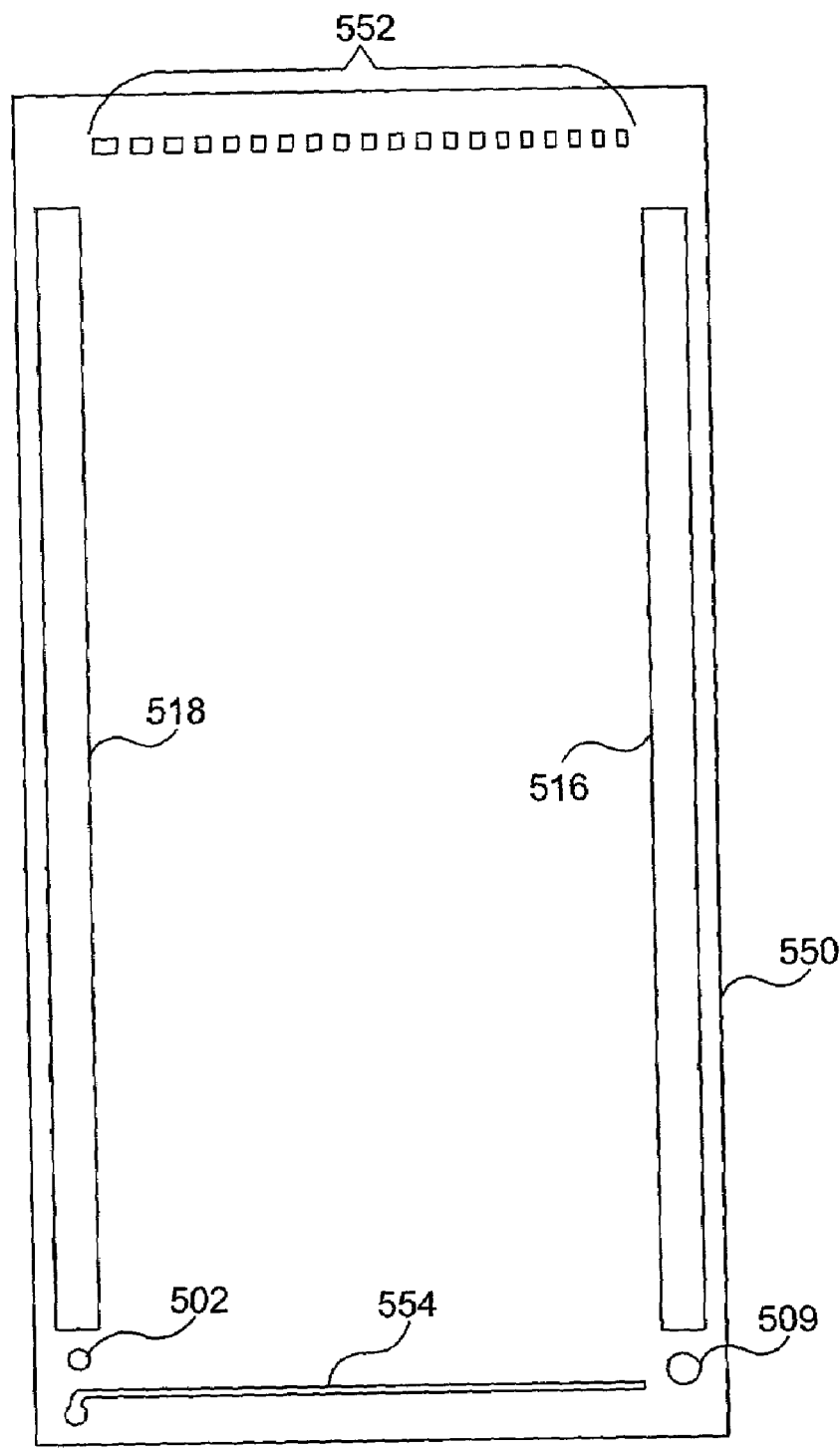
FIG. 56 is a plan view of the sixth simple plate of the embodiment for a stacked plate chemical reactor that incorporates a parallel array of different width fluid channels illustrating a first reactant opening, a plurality of first reactant bores, a second reactant manifold, a product opening, and two heat exchanger manifold openings.

FIG. 56 shows details of the sixth layer of the variable width reactor, illustrating a sixth simple plate 550, which includes opening 554 that defines a manifold for Reactant B. Reactant A passes through sixth simple plate 550 via a plurality of Reactant A openings 552, as well as via opening 502. As described above, opening 502 no longer serves any function after simple plate 530 and can be eliminated from subsequent simple plates (unless an n-fold internally parallelized variable width reactor is desired, where n is greater than one).

Reactant A openings 552 correspond to the twenty variable width openings 542 of simple plate 540, and openings 552 similarly vary in width in the a generally linear progression. As with the previously described stacked plate reactors, the purpose of variable width opening 542 and openings 552 is to position a flow of Reactant A with respect to a similar flow of Reactant B to facilitate formation of a product. Reactant A and B are brought together in the variable width reactor, so that a laminar flow condition exists between Reactants A and B (to enhance mixing, thus enhancing product quality). Sixth simple plate 550 also includes heat transfer medium manifold openings 516 and 518, and product opening 509.

Seventh simple plate 560 of FIG. 57 incorporates a distributor for Reactant B that is defined by a plurality of variable width openings 564. In a manner similar to that in which the flow path of Reactant A is split in FIG. 55 (simple plate 540), Reactant B enters 20 variable width openings 564, each of which has a different width. The widest variable width opening 564 is disposed closest to the origin of the fluid introduced into variable width openings 564, i.e., closest to opening 504. The variable width openings 564 decrease in size in a generally linear progression, such that the narrowest opening is disposed the farthest away from opening 504. As noted above, as the openings narrow in width, a velocity of the fluid flowing in fluid channels defined by the openings (and solid portions of adjacent simple plates) increases, so that the residence times of fluid flowing through variable width openings 564 are substantially equal. Note that the widths of the openings are preferably a function of a viscosity of the fluid that is directed through the fluid channels corresponding to the variable width openings. Thus, if there is a significant difference in the viscosities of Reactants A and B, the actual widths of corresponding openings in variable width openings 542 and variable width openings 564 may not be identical.

Reactant A passes through seventh simple plate 560 via the plurality of Reactant A openings 552, and optionally, through opening 502, which as noted above, is not required in this embodiment. Just as opening 502 for Reactant A is not required in seventh simple plate 560, neither is Reactant B opening 504. Seventh simple plate 560 also includes heat transfer medium manifold openings 516 and 518, and product opening 509.

FIG. 58 provides details of the eighth layer of the variable width reactor, showing an eighth simple plate 570. Reactant A passes through eighth simple plate 570 via the plurality of Reactant A openings 552, and Reactant B passes through eighth simple plate 570 via a plurality of Reactant B openings 574. The relative positions of openings 552 and 574 ensure that flows of Reactants A and B are properly positioned so that when introduced into mixing and reaction channels defined by openings in a subsequent plate, a laminar flow condition between Reactants A and B is achieved in the individual mixing and reaction channels. Openings 552 and 574 are of varying widths, corresponding to the general linear progression of variable width openings 542 and 564. Eighth simple plate 570 also includes heat transfer medium manifold openings 516 and 518, and product opening 509. Finally, simple plate 570 optionally includes Reactant A opening 502 and Reactant B opening 504 (neither of which are required, as noted above).

Ninth simple plate 580 of FIG. 59 incorporates a second heat exchanger defined by openings 586, through which heat transfer medium flows. As will become more clear with respect to FIG. 64, the second heat exchanger thermally conditions Reactant B, before Reactant B is combined with Reactant A in mixing and reaction channels of simple plate 600, as will be described in more detail below. The heat exchanger defined by openings 586 also provides thermal conditioning to the mixing and reaction channels defined by openings on simple plate 600. The heat transfer medium flows in the fluid passages defined by openings 586 in a direction substantially orthogonal to that of the flow of Reactant B in fluid channels defined by variable width opening 564 of simple plate 560. Also, a portion of the heat transfer medium continues to flow through subsequent simple plates, where fluid channels 586 overlap heat transfer medium openings in adjacent simple plates. Reactant A passes through ninth simple plate 580 via the plurality of Reactant A openings 552, while Reactant B passes through ninth simple plate 580 via the plurality of Reactant B openings 574. Ninth simple plate 580 also includes heat transfer medium manifold openings 516 and 518, and product opening 509. Finally, simple plate 580 optionally includes Reactant A opening 502 and Reactant B opening 504 (neither of which are required in this embodiment, as noted above).

FIG. 60 illustrates the tenth layer of the variable width reactor, showing a tenth simple plate 590. Reactant A passes through tenth simple plate 590 via the plurality of Reactant A openings 552, and Reactant B passes through tenth simple plate 590 via the plurality of Reactant B openings 574. Tenth simple plate 590 further includes heat transfer medium manifold openings 516 and 518, product opening 509, and optional Reactant A opening 502 and Reactant B opening 504 (openings 502 and 504 are not required in this embodiment).

Eleventh simple plate 600 of FIG. 61 incorporates a plurality of variable width openings 605 that define a plurality of mixing and reaction channels, which are the only mixing and reaction channels in the illustrated reactor, although as noted above, Reactant A opening 502 and Reactant B opening 504 could be used to feed reaction channels in subsequent reaction units. It should be emphasized that the positions of openings 605 relative to openings 552 (Reactant A) and openings 574 (Reactant B) ensure that a laminar flow relationship exists between Reactants A and B in each mixing and reaction channel. Due to the positions of openings 552 (see simple plate 590), Reactant A enters the mixing and reaction fluid channels defined by openings 605 first, and is disposed on the bottom portion of the mixing and reaction fluid channels. The positions of openings 574 (see simple plate 590) cause Reactant B to enter the mixing and reaction fluid channels defined by openings 605 last, so that Reactant B is stacked on top of Reactant A.

Variable width openings 605 follow the same general linear progression and orientation as variable width openings 542 and variable width openings 564. The widest variable width opening 605 is disposed closest to Reactant A opening 502 (and Reactant B opening 504), with the narrowest opening disposed farthest away, so that residence times of fluid flowing through variable width openings 605 are substantially equal. Preferred widths for variable width openings 605 are indicated below, based on a reaction in which the viscosity of the product is not substantially greater than the viscosities of the reactants. Because the widths of the openings are a function of the viscosity of the fluid flowing through the fluid channels corresponding to the openings, some variable width reactors will include variable width openings 542, variable width openings 564, and variable width openings 605 that have different widths for corresponding openings, because the respective widths are selected based upon the specific viscosities of the corresponding reactants and products. Eleventh simple plate 600 further includes heat transfer medium manifold openings 516 and 518, product opening 509, optional Reactant A opening 502 (not required) and optional Reactant B opening 504 (not required).

FIG. 62 illustrates details of the twelfth layer of the variable width reactor, showing a twelfth simple plate 610, which includes a product collection openings 609. The product collection opening defines a product collection channel used to collect the product formed in the mixing and reaction channels defined by openings 605 in the prior simple plate. While in the bifurcated reactor of FIGS. 29–47, the product exited through a bottom simple plate, in this embodiment of the variable width reactor, the product is directed back through the prior simple plates to exit the variable width reactor via the top simple plate (which is why product opening 509 is included in simple plates 500–600). It should be noted, however, that the variable width reactor can readily be modified to direct the product out of the reactor via the bottom simple plate. Twelfth simple plate 610 further includes heat transfer medium manifold openings 516 and 518, and optional Reactant A opening 502 and Reactant B opening 504 (openings 502 and 504 not being required).

The thirteenth layer of the variable width reactor is the final or bottom layer. FIG. 63 illustrates a thirteenth simple plate 620, which includes no openings, and seals the bottom of the variable width reactor. In the variable width reactor, the thickness of both the top simple plate 500 and the bottom simple plate 620 are significantly greater than the thicknesses of the intermediate simple plates. The greater thickness provides both more structural integrity and rigidity, as well as helping to thermally isolate the inner layers of the variable width reactor from the outside environment.

FIG. 64 is an exploded isometric view of the variable width reactor illustrating the thirteen layers described in regards to FIGS. 51–63. Simple plates 500–620 are shown stacked in order so that the relative positions of each simple plate to each other is evident. Note that simple plates 520 and 580 include openings defining the first and second heat exchangers, respectively. Simple plates 540 and 560 include variable width openings that define reactant distributors for Reactant A and B, respectively, splitting a single reaction fluid path into twenty reaction fluid paths. Simple plate 600 includes the plurality of variable width mixing and reaction channels, while simple plate 610 includes the product collector, which combines the twenty different variable width mixing and reaction channels into a single product fluid path.

The dimensional thickness of each simple plate are similar to those described above in regard to the n-fold internally parallelized reactor, as follows:

| | |
|---|---|
| Top simple plate 500: | 3.0 mm; |
| Simple plates 510–610: | 0.3 mm; and |
| Bottom simple plate 620: | 3.0 mm. |

An inspection of FIG. 64 will assist in understanding the purpose and function of the heat exchangers defined by simple plates 520 and 580. The first heat exchanger, defined by openings 526 in simple plate 520, thermally conditions Reactant A flowing through the variable width openings of simple plate 540. Heat transfer occurs through a solid portion of simple plate 510, however since top simple plate 500 is immediately adjacent to simple plate 510, this heat transfer does not thermally condition any fluid flowing through the variable width reactor. The second heat exchanger, defined by openings 586 in simple plate 580, thermally conditions both Reactant B flowing through the variable width openings of simple plate 560, and the mixed Reactants A and B flowing through the variable width mixing and reaction channels defined by openings 605 in simple plate 600.

Note that the illustrated variable width reactor includes only two heat exchangers, and thus, both the mixed Reactants A and B flowing through the mixing and reaction channels defined by openings 605 in simple plate 600 are not "sandwiched" between heat exchangers, as were the mixing and reaction channels of the n-fold internally parallelized and bifurcated reactors described above. If desired, a third heat exchanger (similar to simple plates 520 and 580 with appropriate openings for the product) can be included in the stack of simple plates, disposed between simple plates 600 and 610. The variable width openings defining the reactant distributors and the mixing and reaction channels are preferably optimized for the individual viscosity of specific reactants and products. By controlling the residence times of the parallel flow channels, as well as by controlling temperature conditions, a high quality product can be obtained.

As noted above, the manner in which the width of the fluid channel varies across an array of parallel fluid channels is a function of the viscosity of a fluid that will flow through these channels. All arrays of parallel fluid channels having variable widths are preferably the same for a given reactor, to enhance the flow of fluids throughout the reactor (i.e., avoiding differences in the residence times of the fluid flowing through the different channels caused by differences in the pressure drop of the fluid at the inlet of each fluid channel). In a preferred embodiment, the relative widths of the channels are as follows:

| | |
|---|---|
| Opening/Channel #1 (widest and nearest the inlet) | 2.387 Units; |
| Opening/Channel #2 | 2.358 units |
| Opening/Channel #3 | 2.318 Units; |
| Opening/Channel #4 | 2.274 Units; |
| Opening/Channel #5 | 2.227 Units; |
| Opening/Channel #6 | 2.176 Units; |
| Opening/Channel #7 | 2.124 Units; |
| Opening/Channel #8 | 2.069 Units; |
| Opening/Channel #9 | 2.013 Units; |
| Opening/Channel #10 | 1.955 Units; |
| Opening/Channel #11 | 1.896 Units; |
| Opening/Channel #12 | 1.835 Units; |
| Opening/Channel #13 | 1.773 Units; |
| Opening/Channel #14 | 1.710 Units; |
| Opening/Channel #15 | 1.646 Units; |
| Opening/Channel #16 | 1.581 Units; |
| Opening/Channel #17 | 1.515 Units; |

-continued

| | |
|---|---|
| Opening/Channel #18 | 1.448 Units; |
| Opening/Channel #19 and | 1.380 Units; |
| Opening/Channel #20 (narrowest & farthest from inlet) | 1.311 Units; |

Fluid Path and Reactor Modeling

In most cases a homogeneous flow distribution (i.e., equipartition) over the reaction channels can be achieved by providing reactant and product fluid channels of sufficient width (or cross sectional size) so as to minimize pressure drops throughout the reactor. This strategy works well with reactants and products of constant viscosity. However, there are reactions where such a strategy is no longer effective. For example, in a chemical reaction that yields a product whose viscosity is 1000 times greater than the viscosity of the reactants, it is useful to vary the widths of the reaction channels to enhance the residence time distribution of the fluids in the reactor, as in the variable width reactor described above. The following model has been employed to determine how the openings defining fluid channel widths should vary.

The following model can be applied in several ways. If a reaction is known to have a significantly more (or less) viscous product, as compared to the reactants employed to produce that product, the following model can be used to optimize the fluid channels dimensions in a reactor specifically designed for that reaction. Rather than producing a custom reactor design for each reaction whose product has a different viscosity, it may be more beneficial to pre-model reactors designed to equipartition flow rates based on incremental changes in the viscosity of the product relative to the reactants. For example, eyeglass lenses are generally custom ground, whereas contact lenses are generally produced in incremental lots, and then the contact lens that most closely matches the desired degree of correction is selected from the lot. In much the same manner, a plurality of different reactors can be produced, each reactor having fluid paths that are optimized for different degrees of viscosity changes, between the product and reactants. It is contemplated that designs optimized for viscosity changes of several orders of magnitude behave relative insensitive to minor variations of the underlying viscosity change, therefore, redesign of fluid channels will not be required. However, reactor designs might be optimized for viscosity changes (of the product relative to the reactant) that represent two, three, and four orders of magnitude, both increasing and decreasing. Then, for a specific reaction, the reactor most closely suited for the specific change in viscosity can be selected. If desired, reactors can be optimized for changes in viscosity that represent incremental orders of magnitude, or a single order of magnitude.

The following parameters must be provided:
thickness of the layers or simple plates (i.e., channel heights);
length and width of the layers (i.e., size of the simple plates);
number of channels desired (e.g., if 20 channels are used, $N_O$=20); and
width of the "ribs" or solid sections that are between the channels.

The variable width of the fluid channels is a complex function of the viscosity change in the course of reaction. The concept of a resistor network can be applied due to the analogy of an electrical current to the laminar flow of fluids through a microreactor. Unlike electrons in a conductor, however, the fluids that flow through a reactor undergo chemical and physical changes that alter their physical characteristics, effectively changing the "resistance" of the reactor to the flow of the fluids. For example, two relatively non-viscous chemicals might react to form a highly viscous product having a substantial resistance to flow, causing higher pressure drop where it flows. Even without a structural change in the reactor, the pressure gradient will change where the product is formed. Thus, properly designing the sizes of openings forming fluid paths within the reactor requires knowledge of the viscosities of the materials flowing through each part of the reactor. In general, the more viscous the product is compared to the reactant(s), the larger the dimensions of the product outlet opening ought to be, compared to the reactant inlet openings and reaction channels. Also, the openings comprising the variable width product channels must be sized to achieve a sufficient flow equipartition and residence time distribution. A mathematical model useful to calculate fluid path dimensions is provided below. The channel height is defined by plate thickness. Based on a specific plate thickness and size, the opening (or channel) width and the number of channels per plate can be determined.

To maximize the product quality that can be achieved using micro-reactor technology, it is critically important to precisely control parameters such as temperature conditions and flow rates of reactants, which determine the residence times of fluids throughout the reactor unit, and particularly after the reactants are mixed and begin to react to form a product. For reactors operating with parallel reaction channels, it is important to ensure flow equipartition between parallel channels. Note that this is true for identical channels, whereas for channels with varying width the mean fluidic velocity has to be kept constant in order to achieve the same residence time in each channel. As the processing capacity of a single reactor unit usually is limited by design, higher feed rates can often only be achieved by the parallelizing of identical microreactor units. In this case, the problem of flow equipartition extends from within the reactor unit to the entire reactor assembly as a whole. Feeding the microreactor units from a common educt reservoir and collecting the product into a common tank, as shown in FIG. 65, introduces different distances between the reactor units and the system components. A deviation from flow equipartition can result in different fluid dynamics in each reactor unit, which can negatively effect product quality (i.e., by causing the formation of undesirable by-products, or incomplete reaction of the reactants), and may even cause clogging of fluid channels due to insufficient fluid velocity and subsequent sedimentation. With respect to the fluid dynamics of a heat transfer medium, poor flow distribution between heat exchanger units results in less than optimal temperature control which can also lead to a reduction in product quality. Finally, a deviation from equipartition leads to reducing the capacity of the reactor, mixer, or heat exchanger units.

The following model, which simulates fluid flows in a reactor, is useful to determine optimal fluid path geometries. The underlying fluidic network shown in FIG. 65 can accommodate anything from a single tube reactor unit, up to a system of nested, parallel reactors. The model is based upon a set of arbitrary reactor units, driven in parallel, fluidly connected by channels between reaction units of the same shape, size, and length. In microreactors, the dimensions of the fluid channels are rather small, which causes small Reynolds numbers. Thus, it is reasonable to assume that laminar flow, which has a generally linear relationship between pressure drop and flow rate, prevails in the fluid channels. For example, for reactors and fluid channels having a circular cross section, the Hagen-Poiseuille equation is applicable. A corresponding equation for fluid paths having a rectangular circular cross section can also be employed.

Referring once again to the analogy with electrical resistance, the flow of fluid in a reactor can be modeled based on a model of a corresponding electric resistor network, as shown in FIG. 66. Each fluid channel conveying reactants or the product mixture is represented by a constant resistor $R_A$ or $R_B$, while the resistance of individual microreactor units are represented by resistors $R_M$. The resistance of this resistor network can be determined with the help of Kirchhoff's laws. It is known that a resistor network can be described completely by a set of N linear equations that describe loops within the network.

In order to apply Kirchhoff's laws, the corresponding flow resistances must be calculated. In the case of microreactors, as laminar flow conditions are prevalent for rectangular or cylindrical channels, their pressure drop $\Delta p$ amounts to:

$$\Delta p = K \cdot \frac{\eta \cdot u \cdot L}{\min(b, h)^2}.$$

where $\eta$ denotes to the dynamic viscosity, u to the mean fluidic velocity, L to the channel length, b to the channel width, and h to its vertical dimension. The constant K depends on the aspect ratio $\alpha = b/h$ of the channel:

$$K = K(\alpha); \text{ to ensure that } \alpha \leq 1, \text{ make } \alpha = e^{-|ln(b/h)|}.$$

Hartnett and Kostic (Advances in Heat Transfer, Vol. 19, 247, 1989) published the following correlation for $K(\alpha)$:

$$K = 12 \cdot (\alpha+1)^2 \cdot (1-1,3553\alpha+1,9467\alpha^2-1,7012\alpha^3+0,9564\alpha^4+0,2537\alpha^5).$$

Together with the velocity and volume flow in a rectangular channel, $\dot{V} = u \cdot A = u \cdot b \cdot h$, it follows:

$$\Delta p = K(\alpha) \cdot \frac{\eta \cdot L}{\min(b, h)^2 \cdot b \cdot h} \cdot \dot{V}.$$

A relationship analogous to $$R = \frac{U}{I},$$

where R is the flow resistance, may be defined by:

$$R(b, h, L, \eta) = \frac{\Delta p}{\dot{V}}$$
$$= K(\alpha) \cdot \frac{\eta \cdot L}{(\min(b, h))^2 \cdot b \cdot h}$$
$$= \frac{K(\alpha)}{\min(b, h)^2 \cdot b \cdot h} \cdot \int_0^L \eta \cdot dl$$

Thus, the flow resistance of cylindrical or rectangular channels can be determined from the geometry of the fluid path L, b, h and the viscosity of the fluid η. Therefore, in the case of varying viscosity the channel is subdivided in a series of cuts with virtually constant viscosity and corresponding partial flow resistances or the viscosity change is integrated over the whole channel length L. The required flow resistance can be calculated using the procedure presented below, and because the flow resistance decreases monotonically with the channel width b, it can be determined in a definite manner.

To develop the required flow resistance, consider a system of N reaction channels (the sample configuration has 2N−2 nodes):

$$K_1, K_2, \ldots, K_{N-1} \ \& \ K'_2, K'_3, \ldots, K'_N,$$

where the hyphenated nodes denote those nodes in the product line beginning with $K_1$ as the virtual node between the first $R_M$ and the first $R_B$, and the non-hyphenated nodes denoting the nodes in the inlet line in the same order. Thus, the two nodes $K_1$ and $K'_N$ can be skipped. From them, 2N−3 linearly independent flow equations can be deduced, where the following flows can be defined by the two nodes of the line or channel of each flow:

$I_{K_j K_{j+1}}$ For $j = 1$,

... N − 2 Associated with the reactant supply fluid path;

$I_{K'_j K'_{j+1}}$ For $j = 1, \ldots N - 1$ Associated with the product fluid path;

$I_{K_1 K'_1} = I_{K'_1 K'_2} = I_1$ Through the first part of the product line;

$I_{K_j K'_j} = I_j$ For $j = 2, \ldots N - 1$ Through the $j^{th}$ reaction channel;

$I_{K_{N-1} K'_n} = I_N$ Through the most downstream part of the supply line;

$I$ Total flow.

These equations specify 3N−3 flows, but only N can be chosen arbitrarily, e.g., $I_1, \ldots I_N$.

The following flow equations can be formulated:

$K_1$: $I - I_{K'_1 K'_2} - I_{K_1 K_2} = 0$ $K_i$: $I_{K_{i-1} K_{di\ 1}} - I_{K_{K'1}} - I_{K_1 K_{i+1}} = 0$

For i=2, ... N−2

$K_{N-1}$: $I_{K_{N-1} K_{N-1}} - I_{K_{N-1} K'_{N-1}} - I_{K_{N-1} K_N} = 0$ $K'_2$: $I_{K'_1 K'_2} + I_{K_2 K'_2} - I_{K'_2 K'_3} = 0$ $K'_i$: $I_{K'_{i-1} K'_i} + I_{K_i K'_1} - I_{K'_1 K'_{i+1}} = 0$

For i=3, ... N−1.

The flow equation for $K_N = K'_N$ can be left due to linear independence.

With $I_1, \ldots I_N$ as free parameter, these equations are:

$K'_i I_{K'_{i-1} K'_i} + I_i - I_{K'_i K'_{i+1}} = 0 \Rightarrow I_{K'_{i-1} K'_{i+1}} = I_{K'_{i-1} K'_i} + I_i$ For $i = 3$,

... N − 1

$K'_2 I_{K'_1 K'_2} + I_2 - I_{K'_2 K'_3} = 0 \Rightarrow I_{K'_2 K'_3} = I_1 + I_2$ It follows: $I_{K'_i K'_{i+1}} = \sum_{j=1}^{i} I_j$ For $i = 2, \ldots N - 1$ $K_i \ I_{K_{i-1} K_i} - I_i - I_{K_i K_{i+1}} = 0 \Rightarrow I_{K_{i-1} K_i} = I_i + I_{K_i K_{i+1}}$ For $i = 2$, -continued

... N − 2

$K_N I_{K_{N-2} K_{N-1}} - I_{N-1} - I_{K_{N-1} K_N} = 0 \Rightarrow I_{K_{N-2} K_{N-1}} = I_{N-1} + I_N$ Resulting in: $I_{K_{i-1} K_i} = \sum_{j=N}^{i} I_j = \sum_{j=i}^{N} I_j$ For $i = 2, \ldots N - 1$ $K_1 \ I - I_1 - I_{K_1 K_2} = 0 \Rightarrow I = I_1 - I_{K_1 K_2} = \sum_{j=1}^{N} I_j$ In steady state, the pressure drop via each path through the network must be the same. Therefore, assume the pressure drop (which corresponds to a voltage drop in an electrical network) from $K_1$ through one of the reaction channels to the outlet node $K_N$ is defined as:

Over $R_1$: Path: $K_1 \to K'_2 \to \ldots K'_N$ $$U = (R_1 + R_B) \cdot I_{K_1 K'_2} + \sum_{l=2}^{N-1} R_B I_{K'_l K'_{l+1}}$$

$$= R_1 I_1 + R_B \sum_{l=1}^{N-1} \sum_{j=1}^{l} I_j.$$

Over $R_N$: Path: $K_1 \to \ldots K_{N-1} \to K_N$ $$U = (R_A + R_N) \cdot I_{K_{N-1} K_N} + \sum_{l=2}^{N-1} R_A I_{K_{l-1} K_l}$$

$$= R_N I_N + R_A \sum_{l=2}^{N} \sum_{j=l}^{N} I_j.$$

Over $R_i$: Path: $K_1 \to \ldots K_i \to K'_i \to \ldots K'_N$ For $i = 2$,

... N − 1

$$U = \sum_{l=2}^{i} R_A I_{K_{l-1} K_l} + R_i I_{K_i K'_i} + \sum_{l=i}^{N-1} R_B I_{K'_l K'_{l+1}}$$

$$= R_A \sum_{l=2}^{i} \sum_{j=l}^{N} I_j + R_i I_i + R_B \sum_{l=i}^{N-1} \sum_{j=1}^{l} I_j.$$

There are N equations for $R_1, \ldots, R_N$ provided that $I_1, \ldots, I_N$ or $I, I_1, \ldots I_{N-1}$ are given. (Remark: if the R's are known, the unknown can instead be the flows $I_j$). The double sums can be simplified as follows:

$$\sum_{l=1}^{N-1} \sum_{j=1}^{l} I_j = \sum_{l=1}^{N-1} (N - l) \cdot I_l;$$

$$\sum_{l=2}^{N} \sum_{j=l}^{N} I_j = \sum_{l=1}^{N-1} l \cdot I_{l+1};$$

$$\sum_{l=i}^{N-1} \sum_{j=l}^{l} I_j = \sum_{l=1}^{N-1} \min(N - i, N - l) \cdot I_l;$$

$$\sum_{l=2}^{i} \sum_{j=l}^{N} I_j = \sum_{l=1}^{N-1} \min(l, i - 1) \cdot I_{l+1}.$$

Using these simplifications, the equations become:

Over $R_1$: $\quad U = R_1 I_1 + R_B \sum_{l=1}^{N-1} (N-l) \cdot I_l.$

Over $R_i$: $\quad U = R_A \sum_{l=1}^{N-1} \min(l, i-1) \cdot I_{l+1} + R_i I_i + R_B \sum_{l=1}^{N-1} \min(N-i, N-l) \cdot I_l$ Over $R_N$: $\quad U = R_N I_N + R_A \sum_{l=1}^{N-1} l \cdot I_{l+1}.$ In matrix notation with $\vec{U} = (U, \ldots, U)^T$, $\vec{I} = (I_1, \ldots, I_N)^T$, $\vec{R} = (R_1, \ldots, R_N)^T$; these equations can be transformed to:

$$\vec{U} = (R_A \cdot A + R_B \cdot B) \cdot \vec{I} + \vec{R} \cdot E_N \cdot \vec{I}$$
$$= (R_A \cdot A + R_B \cdot B + \vec{R} \cdot E_N) \cdot \vec{I};$$

with
$A = (a_{i,l})_{i=1,N;\ l=1,N}$
$B = (b_{i,l})_{i=1,N;\ l=1,N}$
$E_N$=Idem factor of dimension N
The parameters are:

$$a_{i,l} = \begin{cases} \min(l-1, i-1) & \text{for } i=2,\ldots,N;\ l=2,\ldots,N \\ 0 & \text{otherwise} \end{cases}$$

$$b_{i,l} = \begin{cases} \min(N-i, N-l) & \text{for } i=1,\ldots,N-1;\ l=1,\ldots,N-1 \\ 0 & \text{otherwise} \end{cases}$$

These matrices are as follows:

$$A = \begin{pmatrix} 0 & 0 & 0 & \ldots & 0 & 0 & 0 & \ldots & 0 & 0 \\ 0 & 1 & 1 & \ldots & 1 & 1 & 1 & \ldots & 1 & 1 \\ 0 & 1 & 2 & \ldots & 2 & 2 & 2 & \ldots & 2 & 2 \\ \vdots & \vdots & \vdots & \ddots & \vdots & \vdots & \vdots & \ldots & \vdots & \vdots \\ 0 & 1 & 2 & \ldots & i-2 & i-2 & i-2 & \ldots & i-2 & i-2 \\ 0 & 1 & 2 & \ldots & i-2 & i-1 & i-1 & \ldots & i-1 & i-1 \\ 0 & 1 & 2 & \ldots & i-2 & i-1 & i & \ldots & i & i \\ \vdots & \vdots & \vdots & \ldots & \vdots & \vdots & \vdots & \ddots & \vdots & \vdots \\ 0 & 1 & 2 & \ldots & i-2 & i-1 & i & \ldots & N-2 & N-2 \\ 0 & 1 & 2 & \ldots & i-2 & i-1 & i & \ldots & N-2 & N-1 \end{pmatrix}$$

For the special case where the reactant channels and the product channel have the same flow resistances $R_A = R_B = R_S$, and the addition of matrix A and matrix B results in matrix S:

$$s_{i,l} = a_{i,l} + b_{i,l} = N - 1 - |i - l|;$$

$$S = \begin{pmatrix} N-1 & N-2 & N-3 & \ldots & 2 & 1 & 0 \\ N-2 & N-1 & N-2 & \ldots & 3 & 2 & 1 \\ N-3 & N-2 & N-1 & \ldots & 4 & 3 & 2 \\ \vdots & \vdots & \vdots & \ddots & \vdots & \vdots & \vdots \\ 2 & 3 & 4 & \ldots & N-1 & N-2 & N-3 \\ 1 & 2 & 3 & \ldots & N-2 & N-1 & N-2 \\ 0 & 1 & 2 & \ldots & N-3 & N-2 & N-1 \end{pmatrix}$$

$$B = \begin{pmatrix} N-1 & N-2 & \ldots & N-i & N-i-1 & N-i-2 & \ldots & 2 & 1 & 0 \\ N-2 & N-2 & \ldots & N-i & N-i-1 & N-i-2 & \ldots & 2 & 1 & 0 \\ \vdots & \vdots & \ddots & \vdots & \vdots & \vdots & \ldots & \vdots & \vdots & \vdots \\ N-i & N-i & \ldots & N-i & N-i-1 & N-i-2 & \ldots & 2 & 1 & 0 \\ N-i-1 & N-i-1 & \ldots & N-i-1 & N-i-1 & N-i-2 & \ldots & 2 & 1 & 0 \\ N-i-2 & N-i-2 & \ldots & N-i-2 & N-i-2 & N-i-2 & \ldots & 2 & 1 & 0 \\ \vdots & \vdots & \ldots & \vdots & \vdots & \vdots & \ddots & \vdots & \vdots & \vdots \\ 2 & 2 & \ldots & 2 & 2 & 2 & \ldots & 2 & 1 & 0 \\ 1 & 1 & \ldots & 1 & 1 & 1 & \ldots & 1 & 1 & 0 \\ 0 & 0 & \ldots & 0 & 0 & 0 & \ldots & 0 & 0 & 0 \end{pmatrix}$$

With the abbreviation $$\vec{p} = (\rho_1, \ldots \rho_N) = \left(\frac{R_1}{R_S}, \ldots, \frac{R_N}{R_S}\right),$$

the equation system is $$\vec{U} = R_S \cdot (S + \vec{\rho} \cdot I_N) \cdot \vec{I}.$$

A requirement, often encountered in engineering, is that each reaction channel should have the same flow $$I_i = \text{const.} = \frac{1}{N} \cdot I.$$

The applicable set of equations are then as follows:

$$\text{Over } R_1: U = \frac{1}{N}\left(R_1 + R_B \cdot \frac{(N-1)N}{2}\right) \cdot I.$$

$$\text{Over } R_N: U = (R_A + R_N) \cdot I_{K_{N-1}K_N} + \sum_{l=2}^{N-1} R_A I_{K_{l-1}K_l}$$

$$= R_N I_N + R_A \sum_{i=2}^{N} \sum_{j=1}^{N} I_j.$$

$$\text{Over } R_i: U =$$

$$\frac{1}{N}\left(R_A \cdot \left(N(i-1) - \frac{(i-1)i}{2}\right) + R_i + R_B \cdot \left(\frac{(N-1)N}{2} - \frac{(i-1)i}{2}\right)\right) \cdot I.$$

If U is provided, $R_i$ can be determined from this set of equations by using appropriate numeric matrix solvers (e.g., LR- or QR-matrix decomposition).

It is contemplated that internally parallelized fluid channels optimized for a change in viscosity of a product relative to the reactants will be useful for a range of different viscosities. For example, if channels are optimized for a viscosity change of $\Delta \log \eta = +2$, such channels will also be useful for viscosity changes between $+1.5 < \Delta \log \eta < +2.5$. However, when a reaction results in a product whose viscosity is less than the viscosity of the reactant mixture, then the dimensions of the parallel mixing and reaction channels would need to be recalculated.

While internally parallelized reactors, bifurcated reactors, and variable width reactors have been discussed more or less independently, there is no reason that the concepts included in these embodiments cannot be combined into a single reactor. Note that the quality of a chemical product produced in an internally parallelized chemical plant as described above is a function of the residence time distribution throughout the whole system. Optimal product quality results when flow equipartition exists. The residence time distribution is determined by the "network" pressure drops (see FIG. 66) that occur in the reactant fluid paths, each individual reaction unit, and in the product fluid paths. In the embodiments discussed above, the pressure drops related to the reactant fluid paths and the product fluid paths are determined by the size of the openings in each plate that defines those paths. However, there are additional possibilities for manipulating the pressure drop in these parts of an internally parallelized chemical plant. For example, means could be introduced into the reactant paths or the product paths for reducing the volumes of the paths, and hence, increasing pressure drops related to the paths. Such means could also include an additional fluid path that would enable a solvent to be introduced into the product fluid path to reduce a viscosity of the reaction mixture/product and hence, decrease pressure drops related to the product fluid path.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A stacked plate reactor for reacting one chemical reactant with at least one other chemical reactant to form a chemical product, said stacked plate reactor comprising a plurality of simple plates, stacked in layers, each simple plate having at least one opening that extends therethrough, an opening in each simple plate overlapping at least one other opening in an adjacent simple plate, said simple plates, when thus stacked in layers, defining:
   (a) a fluid path for each different chemical reactant;
   (b) a fluid path for a chemical product; and
   (c) a plurality of individual reaction units providing internal parallelization of fluid flow through the stacked plate reactor, thereby increasing a quantity of chemical product that can be produced by said stacked plate reactor per unit time, each reaction unit including:
      (i) a mixing and reaction chamber;
      (ii) a reactant fluid path for each reactant, each reactant fluid path being in fluid communication with said mixing and reaction chamber, and
      (iii) a bypass fluid path for each reactant, each bypass fluid path being in fluid communication with a different individual reaction unit, such that a reactant flowing in a bypass fluid path in a reaction unit does not also flow into a mixing and reaction chamber in said reaction unit.

2. The stacked plate reactor of claim 1, further comprising at least one additional plate having no openings, said at least one additional plate being disposed to seal at least one of a top, a bottom, and a side of the stacked plate reactor.

3. The stacked plate reactor of claim 1, wherein a plurality of individual reaction units are irreversibly joined together to form a reactor stack.

4. The stacked plate reactor of claim 3, wherein a plurality of individual reactor stacks are reversibly joined together to form a chemical plant.

5. The stacked plate reactor of claim 1, further comprising means for equalizing a residence time distribution within said stacked plate reactor.

6. The stacked plate reactor of claim 5, wherein said means for equalizing the residence time distribution within said stacked plate reactor comprises a bifurcated opening in at least one of the plurality of simple plates, said bifurcated opening defining at least one of a reactant fluid path and a product fluid path.

7. The stacked plate reactor of claim 5, wherein said means for equalizing a residence time distribution within said stacked plate reactor comprises an array of openings in at least one of the plurality of simple plates, said array of openings defining at least one of a plurality of reactant fluid paths, a plurality of mixing and reaction chambers, and a plurality of product fluid paths, said array of openings comprising openings having widths that vary across said array.

8. The stacked plate reactor of claim 7, wherein a widest opening in said array is disposed furthest from an opening that enables a fluid to exit from said array.

9. The stacked plate reactor of claim 7, wherein a widest opening in said array is disposed closest to an opening that enables a fluid to exit from said array.

10. The stacked plate reactor of claim 8, wherein the widths of said array vary as a function of the change of the viscosity of a fluid to be introduced into said array.

11. A stacked plate reactor for reacting one chemical reactant with at least one other chemical reactant to form a chemical product, said stacked plate reactor comprising a plurality of simple plates, stacked in layers, each simple plate having at least one opening that extends therethrough, an opening in each simple plate overlapping at least one other opening in an adjacent simple plate, thereby forming:
(a) a fluid path for each different chemical reactant,
(b) a processing volume in fluid communication with each fluid path for each different chemical reactant;
(c) a fluid path for a chemical product in fluid communication with the processing volume;
(d) a fluid path for a heat transfer medium;
(e) a heat exchanger in fluid communication with the fluid path for the heat transfer medium and disposed so as to moderate a temperature of at least one of a chemical reactant, the processing volume, and the fluid path for the chemical product; and
(f) a plurality of serially connected reaction units providing internal parallelization of fluid flow through the stacked plate reactor, thereby increasing a quantity of chemical product that can be produced by said stacked plate reactor per unit time, each reaction unit including:
(i) a processing volume;
(ii) a reactant fluid path for each reactant, each reactant fluid path being in fluid communication with a processing volume; and
(iii) a bypass fluid path for each reactant in fluid communication with any subsequent reaction unit, but not in fluid communication with the processing volume of a current reaction unit.

12. The stacked plate reactor of claim 11, further comprising at least one additional plate having no openings, said at least one additional plate being disposed to seal at least one of a top, a bottom, and a side of the stacked plate reactor.

13. The stacked plate reactor of claim 11, wherein said simple plates comprise a material selected from the group consisting of crystalline wafers, ceramics, glasses, polymers, composite materials, and metals.

14. The stacked plate reactor of claim 11, wherein said simple plates are fabricated from a stainless steel.

15. The stacked plate reactor of claim 11, wherein each serially-connected reaction unit comprises:
(a) a first heat exchanger for modifying a temperature of a first chemical reactant; and
(b) a second heat exchanger for modifying a temperature of at least one of a second chemical reactant and of the processing volume.

16. The stacked plate reactor of claim 15, wherein a heat exchanger is shared between adjacent serially-connected reaction units.

17. The stacked plate reactor of claim 11, wherein the processing volume of each reaction unit is sandwiched between a pair of heat exchangers.

18. The stacked plate reactor of claim 11, wherein a plurality of individual reaction units are irreversibly joined together to form a reactor stack.

19. The stacked plate reactor of claim 11, wherein a plurality of individual reactor stacks are reversibly joined together to form a chemical plant.

20. The stacked plate reactor of claim 11, wherein each subsequent serially-connected reaction unit is coupled to a subsequent reaction unit such that a first simple plate in a subsequent reaction unit is stacked adjacent to a last simple plate of a preceding reaction unit.

21. The stacked plate reactor of claim 11, wherein the processing volume fluid paths for each reactant are disposed so that laminated flow is established between each reactant flowing in the processing volume.

22. The stacked plate reactor of claim 11, wherein each subsequent serially-connected reaction unit is coupled to a subsequent reaction unit such that a first simple plate of a subsequent reaction unit also represents the last simple plate of a preceding reaction unit.

23. The stacked plate reactor of claim 11, wherein the processing volume fluid paths for each reactant are disposed so that laminated flow is established between each reactant flowing in the processing volume.

24. The stacked plate reactor of claim 11, wherein the processing volume comprises a plurality of individual mixing and reaction chambers.

25. The stacked plate reactor of claim 11, further comprising a plurality of fluid channels in the heat exchanger that extend substantially orthogonal to a plurality of fluid channels for directing a flow of at least one of a chemical reactant and a chemical product, where a temperature of said one of the chemical product and the chemical reactant is modified by heat transfer relative to the heat transfer medium that is flowing through the heat exchanger, thereby enhancing the quality of a product that is produced in the stacked plate reactor.

26. The stacked plate reactor of claim 11, further comprising fluid paths for each chemical reactant that is disposed so as to establish laminated flow in the processing volume, thereby enhancing the quality of the product that is produced in the stacked plate reactor.

27. The stacked plate reactor of claim 11, further comprising a processing volume simple plate disposed immediately adjacent to a simple plate having an opening defining the processing volume, said processing volume simple plate having a first opening associated with a first fluid path for a first chemical reagent, and a second opening associated with a second fluid path for a second chemical reagent, said first opening and said second opening being aligned with the opening defining the processing volume, such that a first reactant is caused to enter the processing volume, followed by a second reactant in a manner that establishes laminated flow of the first reactant and the second reactant in the processing volume, thereby enhancing the quality of a product that is produced in the stacked plate reactor.

28. The stacked plate reactor of claim 11, further comprising means for equalizing a residence time distribution of a fluid flowing within said reactor.

29. The stacked plate reactor of claim 28, wherein said means for equalizing a residence time distribution within said reactor comprises an opening in at least one simple plate, said opening having a bifurcated shape, the bifurcated shape causing a fluid to split into a bifurcated fluid channel having a plurality of branches.

30. The stacked plate reactor of claim 29, wherein each chemical reactant flows through a different bifurcated fluid channel, a stem of each bifurcated fluid channel being in fluid communication with a respective chemical reactant inlet, and the branches of each bifurcated fluid channel being in fluid communication with the processing volume.

31. The stacked plate reactor of claim 29, wherein the processing volume comprises a plurality of mixing and reaction chambers, such that one branch from each of the bifurcated fluid channels is in fluid communication with each of the plurality of mixing and reaction chambers.

32. The stacked plate reactor of claim 31, wherein the processing volume comprises a plurality of mixing and reaction chambers, further comprising a bifurcated product collection channel having a plurality of branches, a stem of the bifurcated product collection channel being in fluid communication with a chemical product outlet, and each branch of the bifurcated product collection channel being in fluid communication with a different one of the plurality of mixing and reaction chambers.

33. The stacked plate reactor of claim 31, wherein a bifurcated fluid channel is included for each chemical reactant and a bifurcated product collection channel is included to collect a product.

34. The stacked plate reactor of claim 31, wherein the heat exchanger comprises a first heat exchanger for modifying a temperature of a first chemical reactant, further comprising:
   (a) a second heat exchanger for modifying a temperature of at least one of a second chemical reactants and the processing volume;
   (b) a third heat exchanger for modifying a temperature of at least one of the processing volumes and a product collection channel; and
   (c) a fourth heat exchanger for modifying a temperature of the product collection channel.

35. The stacked plate reactor of claim 28, wherein said means for equalizing a residence time distribution within said reactor comprises a bifurcated fluid path having a plurality of branches.

36. The stacked plate reactor of claim 35, wherein said bifurcated fluid path is achieved by a bifurcated shaped opening in at least one simple plate, such that the bifurcated fluid path is oriented substantially parallel to an orientation of the simple plates.

37. The stacked plate reactor of claim 35, wherein said bifurcated fluid path is achieved by aligning openings in a plurality of adjacent simple plates, such that the bifurcated fluid path is oriented substantially orthogonally to an orientation of the simple plates.

38. The stacked plate reactor of claim 35, wherein said bifurcated fluid path is achieved by a combination of a bifurcated shaped opening in at least one simple plate, and by aligning openings in a plurality of adjacent simple plates.

39. The stacked plate reactor of claim 31, further comprising:
   (a) a first outer simple plate having openings defining a fluid inlet for each different chemical reactant, a fluid inlet for the heat transfer medium, and a fluid outlet for the heat transfer medium; and
   (b) a second outer simple plate having an opening defining the chemical product outlet.

40. The stacked plate reactor of claim 31, wherein the processing volume comprises a plurality of parallel mixing and reaction chambers that are disposed between a pair of heat exchangers.

41. The stacked plate reactor of claim 28, wherein said means for equalizing a residence time distribution of a fluid comprises a plurality of openings having different widths disposed in at least one simple plate, the different widths being selected to provide a substantially even flow equipartition for a fluid flowing through a plurality of different width fluid channels defined by the plurality of openings having different widths.

42. The stacked plate reactor of claim 11, further comprising a plurality of elongate openings in a simple plate that define the heat exchanger, the simple plate being no thicker than about two millimeters, thereby enhancing an efficiency with which the heat exchanger functions to increase a quality of a product produced in said reactor.

43. The stacked plate reactor of claim 11, further comprising at least one plug having a size and shape corresponding to a non-required fluid path defined by aligned openings in said plurality of simple plates, said at least one plug sealing the aligned openings defining said non-required fluid path, thereby eliminating a dead volume in said stacked plate reactor.

44. The stacked plate reactor of claim 11, wherein the stack of simple plates are removably held together with an applied compressive force.

45. The stacked plate reactor of claim 11, further comprising a housing that applies a compressive force against a top simple plate and a bottom simple plate.

46. The stacked plate reactor of claim 11, wherein a mean surface roughness of the simple plates is less than about two micrometers, and the simple plates are substantially free of scratches.

47. The stacked plate reactor of claim 11, wherein the simple plates are held together with an applied compressive force, developing a pressure of at least about 300 Newtons per square millimeter.

48. A simple plate chemical reactor for processing at least two reactants to form a desired chemical product, comprising:
   (a) a first outer simple plate comprising a fluid inlet for each different chemical reactant, a fluid outlet for a chemical product, a fluid inlet for a heat transfer medium, and a fluid outlet for a heat transfer medium;
   (b) a plurality of internal simple plates defining a plurality of serially-connected reaction units, each reaction unit being in fluid communication with said first outer simple plate, each reaction unit comprising a stack of simple plates, stacked in layers, each simple plate having at least one opening that extends therethrough, an opening in each simple plate overlapping at least one other opening in an adjacent simple plate, thereby forming:
      (i) a plurality of heat exchangers for modifying a temperature of at least one of a chemical reactant and a chemical product;
      (ii) at least one mixing and reaction chamber and
      (iii) a bypass fluid path for each reactant, such that a portion of each reactant is diverted from the at least one mixing and reaction chamber of a present reaction unit, and is thus available to be directed to at least one mixing and reaction chamber of a subsequent reaction unit; and
   (c) a second outer plate disposed such that the plurality of internal simple plates are stacked between the first outer, simple plate and the second outer plate.

49. A simple plate chemical reactor for processing at least two reactants to form a desired chemical product, comprising:
   (a) a first outer simple plate comprising a fluid inlet for each different chemical reactant, a fluid outlet for a chemical product, a fluid inlet for a heat transfer medium, and a fluid outlet for a heat transfer medium;

(b) a plurality of internal simple plates defining a plurality of serially-connected reaction units, each reaction unit being in fluid communication with said first simple plate, each reaction unit comprising a stack of simple plates, stacked in layers, each simple plate having at least one opening that extends therethrough, an opening in each simple plate overlapping at least one other opening in an adjacent simple plate, thereby forming:
  (i) a plurality of heat exchangers for modifying a temperature of at least one of a chemical reactant and a chemical product,
  (ii) a processing volume;
  (iii) a processing fluid path for each reactant, each processing fluid path being in fluid communication with a corresponding reactant fluid inlet and the processing volume;
  (iv) a product collection fluid path in fluid communication with the product outlet and the processing volume;
  (v) a reactant bypass fluid path for each reactant, each reactant bypass fluid path bypassing the processing volume of a present reaction unit, and being in fluid communication with a different reaction unit; and
  (vi) a product bypass fluid path for the reaction product, each product bypass fluid path bypassing the processing volume of a present reaction unit, and being in fluid communication with a different reaction unit; and
(c) a second outer plate disposed such that the plurality of internal simple plates are stacked between the first outer; simple plate and the second outer plate.

50. The chemical reactor of claim 49, wherein the simple plates having different configurations are stacked to fabricate the reactor.

51. The chemical reactor of claim 49, wherein said second outer plate and said first outer simple plate are identical in configuration, further comprising a plurality of plugs to seal each opening in said second outer plate.

52. The chemical reactor of claim 51, further comprising a second simple plate disposed between said first outer simple plate and a first reaction unit, said second simple plate having an opening associated with a product fluid passage.

53. The stacked plate reactor of claim 49, further comprising means for enhancing a fluid distribution within said reactor.

54. The chemical reactor of claim 53, wherein said means for enhancing the fluid distribution within the reactor comprises an opening having a bifurcated shape formed in at least one simple plate, for distributing a fluid into a bifurcated channel having a plurality of branches.

55. The chemical reactor of claim 54, further comprising a bifurcated fluid channel for each chemical reactant, a stem of each bifurcated fluid channel being in fluid communication with a respective chemical reactant inlet, and branches of each bifurcated fluid channel being in fluid communication with the processing volume.

56. The chemical reactor of claim 54, further comprising a bifurcated product collection channel having a plurality of branches, a stem of the bifurcated product collection channel being in fluid communication with the chemical product outlet, and branches of said bifurcated product collection channel being in fluid communication with the processing volume.

57. The chemical reactor of claim 54, wherein each reaction unit includes a bifurcated fluid channel and a bifurcated product collection channel.

58. The chemical reactor of claim 53, wherein said means for enhancing a fluid distribution within the reactor comprises at least one simple plate in which a plurality of openings having different widths are formed, said different widths being selected to provide a substantially even flow equipartition for a fluid flowing in a plurality of different width fluid channels defined by said plurality of openings.

59. The chemical reactor of claim 58, wherein each of the plurality of openings having different widths are disposed in a parallel array, ordered in increasing widths from a narrowest opening to a widest opening, thereby defining a parallel array of different width fluid channels.

60. The chemical reactor of claim 58, wherein an incremental increase in the widths of the fluid channels of said array is a function of the viscosity change of a fluid that will flow through the different width fluid channels of said array, so as to equalize a residence time distribution of the fluid within said array.

61. The chemical reactor of claim 53, wherein said means for enhancing a fluid distribution within the reactor comprises at least one simple plate in which a plurality of openings having different lengths are formed, said different lengths being selected to provide a substantially equivalent even flow equipartition for a fluid flowing in a plurality of different width fluid channels defined by said plurality of openings.

62. A simple plate chemical reactor for processing at least two reactants to form a desired chemical product, comprising:
  (a) a first outer simple plate and a second outer simple plate, said first and second outer plates together including a fluid inlet for each chemical reactant, a product outlet, a fluid inlet for a heat transfer medium, and a fluid outlet for the heat transfer medium;
  (b) a plurality of simple plates disposed between the first and the second outer simple plates, each simple plate having at least one opening that extends therethrough, an opening in each simple plate overlapping at least one other opening in an adjacent simple plate, thereby forming:
    (i) a plurality of heat exchangers for modifying a temperature of at least one of a chemical reactant and a chemical product;
    (ii) at least one fluid path for each chemical reactant;
    (iii) at least one mixing and reaction channel; and
    (iv) at least one of:
      (1) at least one bifurcated fluid channel configured to enhance a fluid distribution within the reactor, wherein the at least one bifurcated fluid channel comprises an opening in at least one simple plate; and
      (2) a plurality of openings having different widths formed in at least one simple plate, said different widths having been selected to provide a substantially even flow equipartition for a fluid flowing in a plurality of fluid channels defined by the plurality of openings having different widths, wherein each of the plurality of openings having different widths in a single simple plate comprise a parallel array, ordered from a narrowest opening, incrementally increasing to a widest opening, defining a parallel array of the plurality of fluid channels having different widths.

63. The simple plate chemical reactor of claim 62, wherein the product outlet is disposed in said first outer simple plate.

64. The simple plate chemical reactor of claim 62, wherein the product outlet is disposed in said second outer plate.

65. The simple plate chemical reactor of claim 62, further comprising a plurality of openings in a simple plate defining a heat exchanger, and a plurality of openings in an adjacent simple plate defining at least one of a fluid path for a chemical reactant and a mixing and reaction channel, such that the plurality of openings in the simple plate defining the heat exchanger are substantially orthogonal to the plurality of openings in said adjacent simple plate.

66. The simple plate chemical reactor of claim 62, further comprising means for enabling diffusion mixing to occur between at least a first reactant and a second reactant within the simple plate chemical reactor.

67. The simple plate chemical reactor of claim 66, wherein said means for enabling diffusion mixing to occur comprises an upper reaction channel simple plate disposed adjacent to a simple plate having an opening defining a mixing and reaction channel, said upper reaction channel simple plate having a first opening associated with a first fluid path for a first chemical reagent, and a second opening associated with a second fluid path for a second chemical reagent, said first opening and said second opening being aligned with the opening defining a mixing and reaction channel, such that a first reactant is caused to enter the mixing and reaction channel first, followed by a second reactant, establishing laminated flow between the first reactant and the second reactant in the mixing and reactant channel.

68. The simple plate chemical reactor of claim 62, wherein the at least one bifurcated fluid channel comprises a different bifurcated fluid channel for each chemical reactant, each different bifurcated fluid channel having a stem and a plurality of branches, the stem of each bifurcated fluid channel being in fluid communication with a respective chemical reactant inlet, and branches of each bifurcated fluid channel being in fluid communication with a mixing and reaction channel.

69. The simple plate chemical reactor of claim 62, wherein the at least one bifurcated fluid channel comprises a bifurcated product collection channel, the stem of the bifurcated product collection channel being in fluid communication with the product outlet, and the branches of said bifurcated product collection channel being in fluid communication with a mixing and reaction channel.

70. The simple plate chemical reactor of claim 62, wherein a bifurcated fluid channel is included for each chemical reactant and one bifurcated fluid channel comprises a bifurcated product collection channel.

71. The simple plate chemical reactor of claim 62, wherein said plurality of heat exchangers comprise:
(a) a first heat exchanger for modifying a temperature of a first chemical reactant;
(b) a second heat exchanger for modifying a temperature of at least one of a second chemical reactant and a mixing and reaction channel;
(c) a third heat exchanger for modifying a temperature of at least one of said mixing and reaction channel and a product collection channel; and
(d) a fourth heat exchanger for modifying a temperature of said product collection channel.

72. The simple plate chemical reactor of claim 62, wherein a widest fluid channel in said parallel array of fluid channels is disposed further to a fluid outlet opening than any other fluid channel in said parallel array.

73. The simple plate chemical reactor of claim 72, wherein each chemical reactant is directed into a different parallel array of fluid channels having different widths, each different parallel array of fluid channels being disposed in a different simple plate.

74. The simple plate chemical reactor of claim 72, wherein the parallel array of fluid channels having different widths comprises a mixing and reaction channel.

75. The simple plate chemical reactor of claim 62, further comprising means for providing internal parallelization of said simple plate chemical reactor, to achieve increased throughput.

76. The simple plate chemical reactor of claim 75, wherein contiguous sets of the simple plates comprise a plurality of serially-connected reaction units, and wherein said means for providing internal parallelization comprise a plurality of openings in different contiguous sets of the simple plates, which when aligned form, for each one of said serially-connected reaction units:
(a) a reaction unit fluid path in fluid communication with processing volumes in that reaction unit; and
(b) a bypass fluid path that bypasses all processing volumes in that reaction unit; and is in fluid communication with any subsequent reaction unit.

77. The simple plate chemical reactor of claim 76, wherein each serially-connected reaction unit comprises:
(a) a first heat exchanger for modifying a temperature of a first chemical reactant;
(b) a second heat exchanger for modifying a temperature of at least one of a second chemical reactant and a mixing and reaction channel, said mixing and reaction channel being operative to:
(i) establish a laminated flow between a first chemical reactant and a second chemical reactant;
(ii) mix the first chemical reactant and the second chemical reactant together via diffusion mixing; and
(iii) provide sufficient residence time for initiating a chemical reaction between the first chemical reactant and the second chemical reactant; and
(c) a third heat exchanger for modifying a temperature of said mixing and reaction channel.

78. The simple plate chemical reactor of claim 76, wherein the first heat exchanger of each serially-connected reaction unit disposed downstream of a different serially-connected reaction unit also comprises the third heat exchanger of the reaction unit disposed immediately upstream.

79. The simple plate chemical reactor of claim 76, wherein a plurality of said serially-connected reaction units are irreversibly joined together to form a reactor stack.

80. The simple plate chemical reactor of claim 79 wherein a plurality of individual reactor stacks are reversibly joined together to form a chemical plant.

81. A stacked plate reactor for reacting one chemical reactant with at least one other chemical reactant to form a chemical product, said stacked plate reactor comprising:
(a) a plurality of simple plates, stacked in layers, each simple plate having a plurality of openings that extend therethrough, such that when the plurality of simple plates are stacked in layers to achieve the stacked plate reactor, openings in each simple plate overlap openings in an adjacent simple plate, thereby forming:
(i) a fluid path for each different chemical reactant;
(ii) a fluid path for a chemical product;
(iii) a fluid path for a heat transfer medium;
(iv) a heat exchanger coupled in fluid communication with the fluid path for the heat transfer medium; and (v) means for manipulating a flow of fluid in said stacked plate reactor to achieve a desired result; and (b) at least one additional plate having no openings, said at least one additional plate being disposed to seal at least one of a top, a bottom, and a side of the stacked plate reactor.

82. A stacked plate reactor for reacting one chemical reactant with at least one other chemical reactant to form a chemical product, said stacked plate reactor comprising a plurality of simple plates, stacked in layers, each simple plate having a plurality of openings that extend therethrough, such that when the plurality of simple plates are stacked in layers to achieve the stacked plate reactor, openings in each simple plate overlap openings in an adjacent simple plate, thereby defining:
 (a) a fluid path for each different chemical reactant;
 (b) a fluid path for a chemical product;
 (c) a fluid path for a heat transfer medium;
 (d) a heat exchanger coupled in fluid communication with the fluid path for the heat transfer medium; and
 (e) means for providing internal parallelization of fluid flow through the stacked plate reactor, thereby increasing a quantity of chemical product that can be produced by said stacked plate reactor per unit time, such internal parallelization being characterized by achieving at least two parallel fluid flows in different layers of the stacked plate reactor that are not in fluid communication with each other.

83. A stacked plate reactor for reacting one chemical reactant with at least one other chemical reactant to form a chemical product, said stacked plate reactor comprising a plurality of simple plates, stacked in layers, each simple plate having a plurality of openings that extend therethrough, such that when the plurality of simple plates are stacked in layers to achieve the stacked plate reactor, openings in each simple plate overlap openings in an adjacent simple plate, thereby defining:
 (a) a fluid path for each different chemical reactant;
 (b) a processing volume in fluid communication with each fluid path for each different chemical reactant;
 (c) a fluid path for a chemical product in fluid communication with the processing volume;
 (d) a fluid path for a heat transfer medium; and
 (e) a heat exchanger in fluid communication with the fluid path for the heat transfer medium and disposed so as to moderate a temperature of at least one of a chemical reactant, the processing volume, and the fluid path for the chemical product, the heat exchanger comprising a plurality of heat exchanger fluid channels that extend substantially orthogonal to a plurality of fluid channels for directing a flow of at least one of a chemical reactant and a chemical product, such that the plurality of heat exchanger fluid channels are not in fluid communication with the plurality of fluid channels for directing a flow of at least one of the chemical reactant and the chemical product, and where a temperature of said one of the chemical product and the chemical reactant is modified by heat transfer relative to the heat transfer medium that is flowing through the heat exchanger.

84. A stacked plate reactor for reacting one chemical reactant with at least one other chemical reactant to form a chemical product, said stacked plate reactor comprising a plurality of simple plates, stacked in layers, each simple plate having a plurality of openings that extend therethrough, such that when the plurality of simple plates are stacked in layers to achieve the stacked plate reactor, openings in each simple plate overlap openings in an adjacent simple plate, thereby forming:
 (a) a fluid path for each different chemical reactant;
 (b) a first reaction unit defined by a plurality of openings in the simple plates, said plurality of openings being aligned to form, for each different chemical reactant:
  (i) a reaction unit fluid path in fluid communication with a processing volume in said first reaction unit, and
  (ii) a bypass fluid path that bypasses the processing volume in the first reaction unit and is in fluid communication with any subsequent reaction unit; and
 (c) a last reaction unit defined by the plurality of openings in the simple plate, said plurality of openings being aligned to form, for each different chemical reactant, a reaction unit fluid path in fluid communication with a processing volume in said last reaction unit,
 (d) a fluid path for a chemical product in fluid communication with each processing volume;
 (e) a fluid path for a heat transfer medium; and
 (f) a heat exchanger in fluid communication with the fluid path for the heat transfer medium and disposed so as to moderate a temperature of at least one of a chemical reactant, at least one processing volume, and the fluid path for the chemical product.

85. A stacked plate reactor for reacting one chemical reactant with at least one other chemical reactant to form a chemical product, said stacked plate reactor comprising a plurality of simple plates, stacked in layers, each simple plate having a plurality of openings that extend therethrough, such that when the plurality of simple plates are stacked in layers to achieve the stacked plate reactor, openings in each simple plate overlap openings in an adjacent simple plate, thereby defining:
 (a) a single fluid inlet for each chemical reactant;
 (b) a reactor fluid path for each chemical reactant, each reactor fluid path being in fluid communication with a processing volume in a first reaction unit;
 (c) a bypass fluid path for each chemical reactant, each bypass fluid path bypassing the processing volume in the first reaction unit, and being in fluid communication with any subsequent reaction unit; and
 (d) a single fluid outlet for the chemical product.

86. A stacked plate reactor for reacting one chemical reactant with at least one other chemical reactant to form a chemical product, said stacked plate reactor comprising a plurality of simple plates, stacked in layers, each simple plate having a plurality of openings that extend therethrough, such that when the plurality of simple plates are stacked in layers to achieve the stacked plate reactor, openings in each simple plate overlap openings in an adjacent simple plate, thereby forming:
 (a) a fluid path for each different chemical reactant;
 (b) a processing volume in fluid communication with each fluid path for each different chemical reactant;
 (c) a fluid path for a chemical product in fluid communication with the processing volume;
 (d) a plurality of openings having different widths disposed in at least one simple plate, the different widths being selected to provide a substantially even flow equipartition for a fluid flowing through a plurality of different width fluid channels defined by the plurality of openings having different widths, wherein each of the plurality of openings having different widths are disposed in a parallel array, said openings being ordered so as to decrease in size from a widest opening to a narrowest opening and defining a parallel array of the different width fluid channels;

(e) a fluid path for a heat transfer medium; and (f) a heat exchanger in fluid communication with the fluid path for the heat transfer medium and disposed so as to moderate a temperature of at least one of a chemical reactant, at least one processing volume, and the fluid path for the chemical product.

87. A simple plate chemical reactor for processing at least two reactants to form a desired chemical product, comprising:

(a) a first outer simple plate and a second outer simple plate, said first and second outer simple plates together including a fluid inlet for each chemical reactant, a product outlet, a fluid inlet for a heat transfer medium, and a fluid outlet for the heat transfer medium; and (b) a plurality of simple plates disposed between the first and the second outer simple plates, each simple plate having a plurality of openings that extend therethrough, such that when the plurality of simple plates are stacked in layers, openings in each simple plate overlap openings in an adjacent simple plate, thereby forming:

(i) a plurality of heat exchangers for modifying a temperature of at least one of a chemical reactant and a chemical product;

(ii) at least one fluid path for each chemical reactant;

(iii) at least one mixing and reaction channel; and (iv) at least one bifurcated fluid channel configured to enhance a fluid distribution within the reactor.

88. A simple plate chemical reactor for processing at least two reactants to form a desired chemical product, comprising:

(a) a first outer simple plate and a second outer simple plate, said first and second outer simple plates together including a fluid inlet for each chemical reactant, a product outlet, a fluid inlet for a heat transfer medium, and a fluid outlet for the heat transfer medium; and (b) a plurality of simple plates disposed between the first and the second outer simple plates, each simple plate having a plurality of openings that extend therethrough, such that when the plurality of simple plates are stacked in layers, openings in each simple plate overlap openings in an adjacent simple plate, thereby forming:

(i) a plurality of heat exchangers for modifying a temperature of at least one of a chemical reactant and a chemical product;

(ii) at least one fluid path for each chemical reactant;

(iii) at least one mixing and reaction channel; and (iv) a plurality of openings having different widths formed in at least one simple plate, said different widths having been selected to provide a substantially even flow equipartition for a fluid flowing in a plurality of fluid channels defined by the plurality of openings having different widths.

89. A simple plate chemical reactor for processing at least two reactants to form a desired chemical product, comprising:

(a) a first outer simple plate and a second outer simple plate, said first and second outer simple plates together including a fluid inlet for each chemical reactant, a product outlet, a fluid inlet for a heat transfer medium, and a fluid outlet for the heat transfer medium; and (b) a plurality of simple plates disposed between the first and the second outer simple plates, each simple plate having a plurality of openings that extend therethrough, such that when the plurality of simple plates are stacked in layers, openings in each simple plate overlap openings in an adjacent simple plate, thereby forming:

(i) a plurality of heat exchangers for modifying a temperature of at least one of a chemical reactant and a chemical product;

(ii) at least one fluid path for each chemical reactant;

(iii) at least one mixing and reaction channel; and (iv) a plurality of openings having different lengths formed in at least one simple plate, said different lengths having been selected to provide a substantially even flow equipartition for a fluid flowing in a plurality of fluid channels defined by the plurality of openings having different lengths.

90. A stacked plate reactor for reacting one chemical reactant with at least one other chemical reactant to form a chemical product, said stacked plate reactor comprising a plurality of simple plates stacked in layers, each simple plate having a plurality of openings that extend therethrough, openings in each simple plate overlapping openings in an adjacent simple plate, thereby forming:

(a) a fluid path for each different chemical reactant;

(b) a fluid path for a chemical product; and (c) at least one of:

(i) at least one bifurcated fluid channel configured to enhance a fluid distribution within the reactor;

(ii) a plurality of openings having different widths formed in at least one simple plate, said different widths having been selected to provide a substantially even flow equipartition for a fluid flowing in a plurality of fluid channels defined by the plurality of openings having different widths;

(iii) a plurality of openings having different lengths formed in at least one simple plate, said different lengths having been selected to provide a substantially even flow equipartition for a fluid flowing in a plurality of fluid channels defined by the plurality of openings having different lengths; and (iv) a plurality of individual reaction units providing internal parallelization of fluid flow through the stacked plate reactor, thereby increasing a quantity of chemical product that can be produced by said stacked plate reactor per unit time, each reaction unit including:

(1) a mixing and reaction chamber;

(2) a reactant fluid path for each reactant, each reactant fluid path being in fluid communication with said mixing and reaction chamber; and (3) a bypass fluid path for each reactant, each bypass fluid path being in fluid communication with a different individual reaction unit, such that a reactant flowing in a bypass fluid path in a reaction unit does not also flow into a mixing and reaction chamber in said reaction unit.

91. A stacked plate reactor for reacting one chemical reactant with at least one other chemical reactant to form a chemical product, said stacked plate reactor being assembled from a plurality of plates stacked in layers, said stacked plate reactor comprising:

(a) a fluid path for each different chemical reactant;

(b) a fluid path for a chemical product, and (c) at least one of:

(i) at least one bifurcated fluid channel configured to enhance a fluid distribution within the reactor;

(ii) a plurality of openings having different widths formed in at least one simple plate, said different widths having been selected to provide a substantially even flow equipartition for a fluid flowing in a plurality of fluid channels defined by the plurality of openings having different widths;

(iii) a plurality of openings having different lengths formed in at least one simple plate, said different lengths having been selected to provide a substantially even flow equipartition for a fluid flowing in a plurality of fluid channels defined by the plurality of openings having different lengths; and (iv) a plurality of individual reaction units providing internal parallelization of fluid flow through the stacked plate reactor, thereby increasing a quantity of chemical product that can be produced by said stacked plate reactor per unit time, each reaction unit including:
  (1) a mixing and reaction chamber;
  (2) a reactant fluid path for each reactant, each reactant fluid path being in fluid communication with said mixing and reaction chamber; and
  (3) a bypass fluid path for each reactant, each bypass fluid path being in fluid communication with a different individual reaction unit, such that a reactant flowing in a bypass fluid path in a reaction unit does not also flow into a mixing and reaction chamber in said reaction unit.

92. A stacked plate reactor for reacting one chemical reactant with at least one other chemical reactant to form a chemical product, said stacked plate reactor comprising a plurality of simple plates stacked in layers, each simple plate having a plurality of openings that extend therethrough, openings in each simple plate overlapping openings in an adjacent simple plate, thereby forming:
  (a) a fluid path for each different chemical reactant;
  (b) a fluid path for a chemical product; and
  (c) a heat transfer fluid path for a heat transfer medium, such that the heat transfer fluid path and the fluid paths for each different chemical reactant and the chemical product are not in fluid communication;
  (d) a heat exchanger coupled in fluid communication with the fluid path for the heat transfer medium; and
  (e) means for manipulating a flow of fluid in said stacked plate reactor to achieve a desired result,
  a heat transfer fluid path for a heat transfer medium, such that the heat transfer fluid path and the fluid paths for each different chemical reactant and the chemical product are not in fluid communication.

93. The stacked plate reactor of claim 86, wherein a widest fluid channel in said parallel array of different width fluid channels is disposed closer to a fluid inlet opening than any other fluid channel in said parallel array.

94. The stacked plate reactor of claim 86, wherein a widest fluid channel in said parallel array of different width fluid channels is disposed further to a fluid outlet opening than any other fluid channel in said parallel array.

95. The stacked plate reactor of claim 86, wherein each chemical reactant is directed into a different parallel array of different width fluid channels.

96. The stacked plate reactor of claim 86, wherein the processing volume comprises a parallel array of different width fluid channels, each different width fluid channel comprising an individual mixing and reaction chamber.

97. The stacked plate reactor of claim 86, wherein the widths of said fluid channels in the array are determined as a function of the viscosity change of a fluid to be introduced into said array.

98. The stacked plate reactor of claim 86, wherein the heat exchanger comprises a first heat exchanger for modifying a temperature of a first chemical reactant, and a second heat exchanger for modifying a temperature of at least one of a second chemical reactant and the processing volume.

99. The stacked plate reactor of claim 86, further comprising one of a top simple plate, a bottom simple plate, and a side simple plate, said one having openings defining a fluid inlet for each different chemical reactant, a fluid inlet for the heal transfer medium, a fluid outlet for the heat transfer medium, and a chemical product outlet.

* * * * *

UNITED STATES PATENT AND TRADEMARK OFFICE
CERTIFICATE OF CORRECTION

PATENT NO. : 7,241,423 B2
APPLICATION NO. : 09/991377
DATED : July 10, 2007
INVENTOR(S) : Golbig et al.

It is certified that error appears in the above-identified patent and that said Letters Patent is hereby corrected as shown below:

| | |
|---|---|
| Column 9, line 18 | after "equalize" delete "of" |
| Column 15, line 36 | after "example," insert --the-- |
| Column 20, line 43 | delete "2" (1st occurrence) insert therefor --2n-- (n as superscript) |
| Column 26, line 16 | after "of" insert --the-- |
| Column 27, line 63 | delete "a" (2nd occurrence) insert therefor --an-- |
| Column 29, line 66 | "reactions" should read --reaction-- |
| Column 32, line 26 | delete "10" insert therefor --110-- |
| Column 34, line 22 | after "that" insert --the-- |
| Column 36, line 47 | after "through" delete "the" |
| Column 37, line 8 | after "from" delete "with" |
| Column 37, line 61 | "continuing" should read --continue-- |
| Column 42, line 32 | "providing" should read --provided-- |
| Column 43, line 22 | after "such" delete "that" |
| Column 43, line 64 | after "on" delete "of" |
| Column 45, line 25 | "embodiment" should read --embodiments-- |
| Column 47, line 60 | "pate" should read --plate-- |
| Column 51, line 54 | "rector" should read --reactor-- |
| Column 52, line 15 | after "in" (2nd occurrence) delete "the" |
| Column 54, line 22 | "openings" should read --opening-- |
| Column 56, line 43 | "relative" should read --relatively-- |

UNITED STATES PATENT AND TRADEMARK OFFICE
CERTIFICATE OF CORRECTION

PATENT NO. : 7,241,423 B2
APPLICATION NO. : 09/991377
DATED : July 10, 2007
INVENTOR(S) : Golbig et al.

It is certified that error appears in the above-identified patent and that said Letters Patent is hereby corrected as shown below:

Column 59, line 42 " $K_l : I_{K_{l-1}K_d}1 - I_{K_{K'l}} - I_{K_l K_{l+1}} = 0$ " should read -- $K_l : I_{K_{l-1}K_l} - I_{K_l K'_l} - I_{K_l K_{l+1}} = 0$ --

Column 59, line 45 " $K_{N-1} : I_{K_{N-2}K_{N-1}} - I_{K_{N-1}K'_{N-1}} - I_{K_{N-1}K_N} = 0$ " should read

-- $K_{N-1} : I_{K_{N-2}K_{N-1}} - I_{K_{N-1}K'_{N-1}} - I_{K_{N-1}K_N} = 0$ --

Column 59, line 50 " $K'_l : I_{K'_{l-1}K'_l} + I_{K_l K'_l} - I_{K'_l K'_{l+1}} = 0$ " should read -- $K'_l : I_{K'_{l-1}K'_l} + I_{K_l K'_l} - I_{K'_l K'_{l+1}} = 0$ --

Column 59, line 58 " $K'_l I_{K'_{l-1}K'_l} + I_l - I_{K'_l K'_{l+1}} = 0 \Rightarrow I_{K'_l K'_{l+1}} = I_{K'_{l-1}K'_l} + I_l$ " should read -- $K'_l I_{K'_{l-1}K'_l} + I_l - I_{K'_l K'_{l+1}} = 0 \Rightarrow I_{K'_l K'_{l+1}} = I_{K'_{l-1}K'_l} + I_l$ --

Column 70, line 13 "claim 58" should read --claim 59--
(Claim 60, line 1)

Column 72, line 42 "claim 76" should read --claim 77--
(Claim 78, line 1)

Column 77, line 33 after "product;" delete "and"
(Claim 92, line 1)

UNITED STATES PATENT AND TRADEMARK OFFICE
CERTIFICATE OF CORRECTION

PATENT NO. : 7,241,423 B2
APPLICATION NO. : 09/991377
DATED : July 10, 2007
INVENTOR(S) : Golbig et al.

It is certified that error appears in the above-identified patent and that said Letters Patent is hereby corrected as shown below:

Column 78, line 35                  "heal" should read --heat--
(Claim 99, line 5)

Signed and Sealed this

Twenty-fifth Day of March, 2008

JON W. DUDAS
*Director of the United States Patent and Trademark Office*